US012577116B2

(12) United States Patent
Wang et al.

(10) Patent No.: US 12,577,116 B2
(45) Date of Patent: Mar. 17, 2026

(54) RARE EARTH-CONTAINING Y ZEOLITE, PREPARATION PROCESS THEREOF, AND CATALYTIC CRACKING CATALYST CONTAINING THE ZEOLITE

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Chengqiang Wang, Beijing (CN); Yibin Luo, Beijing (CN); Jinyu Zheng, Beijing (CN); Xingtian Shu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 740 days.

(21) Appl. No.: 17/626,059

(22) PCT Filed: Jul. 9, 2020

(86) PCT No.: PCT/CN2020/101048
§ 371 (c)(1),
(2) Date: Jan. 10, 2022

(87) PCT Pub. No.: WO2021/004502
PCT Pub. Date: Jan. 14, 2021

(65) Prior Publication Data
US 2022/0250924 A1 Aug. 11, 2022

(30) Foreign Application Priority Data

Jul. 9, 2019 (CN) .......................... 201910612784.6
Jul. 9, 2019 (CN) .......................... 201910612785.0
(Continued)

(51) Int. Cl.
*C01B 39/24* (2006.01)
*B01J 29/04* (2006.01)
(Continued)

(52) U.S. Cl.
CPC ............. *C01B 39/24* (2013.01); *B01J 29/041* (2013.01); *B01J 29/088* (2013.01); *B01J 35/51* (2024.01);
(Continued)

(58) Field of Classification Search
None
See application file for complete search history.

(56) References Cited

U.S. PATENT DOCUMENTS 3,402,996 A 9/1968 Maher et al.
5,248,642 A 9/1993 Kumar et al.
(Continued)

FOREIGN PATENT DOCUMENTS

CN 1026225 C 10/1994
CN 102806098 A 12/2012
(Continued)

OTHER PUBLICATIONS

Sato et al., Preparation and activity evaluation of Y zeolites with or without mesoporosity, Catalysis Letters, 1999 (Sato) (Year: 1999).*
(Continued)

*Primary Examiner* — Keling Zhang
(74) *Attorney, Agent, or Firm* — NKL Law; Allen Xue

(57) ABSTRACT
A rare earth-containing Y zeolite has at least two mesopore pore-size distributions at 2-3 nanometers and 3-4 nanome-
(Continued)

ters. A catalytic cracking catalyst contains the rare earth-containing Y zeolite. When used in the catalytic cracking of heavy oil, the catalytic cracking catalyst provided has excellent heavy oil conversion ability, higher gasoline yield, and lower coke selectivity.

19 Claims, 7 Drawing Sheets

(30) Foreign Application Priority Data

| | | | |
|---|---|---|---|
| Feb. 28, 2020 | (CN) | .......................... | 202010126354.6 |
| Feb. 28, 2020 | (CN) | .......................... | 202010126355.0 |

(51) Int. Cl.

| | |
|---|---|
| *B01J 29/08* | (2006.01) |
| *B01J 35/51* | (2024.01) |
| *B01J 35/70* | (2024.01) |
| B01J 35/30 | (2024.01) |
| C10G 11/05 | (2006.01) |
| C10G 47/02 | (2006.01) |

(52) U.S. Cl.
CPC ................ *B01J 35/70* (2024.01); *B01J 35/30* (2024.01); *B01J 2235/00* (2024.01); *B01J 2235/15* (2024.01); *C01P 2002/74* (2013.01); *C01P 2006/14* (2013.01); *C01P 2006/16* (2013.01); *C10G 11/05* (2013.01); *C10G 47/02* (2013.01)

(56) References Cited

U.S. PATENT DOCUMENTS

| | | | |
|---|---|---|---|
| 2010/0133145 A1 | 6/2010 | Wormsbecher et al. |
| 2018/0229223 A1 | 8/2018 | Sun et al. |

FOREIGN PATENT DOCUMENTS

| | | | |
|---|---|---|---|
| CN | 103055916 A | 4/2013 |
| CN | 103058217 A | 4/2013 |
| CN | 103508467 A | 1/2014 |
| CN | 106268919 A | 1/2017 |
| CN | 108264924 A | 7/2018 |
| CN | 108786901 A | 11/2018 |
| CN | 109305686 A | 2/2019 |
| RU | 2548362 C2 | 4/2015 |
| RU | 2617477 C2 | 4/2017 |

OTHER PUBLICATIONS

Garcia-Martinez et al., Mesostructured zeolite Y-high hydrothermal stability and superior FCC catalytic performance, Catal. Sci. Techno., 2012 (Year: 2012).*

Machine translation of Zheng et al., CN.103508467A (Year: 2014).*

Yu, Shanqing et al.; "Hyperpolarized 129Xe NMR Study on Y Zeolite Modified by Rare Earth Cations"; Acta Petrolei Sinica (Petroleum Processing Section), vol. 29, No. 5, 31; Oct. 31, 2013; ISSN: 1001-8719.

Qin, Yucai et al.; "Adsorption and Catalytic Conversion of Thiophene on Y-type Zeolites Modified by Rare Earth Metal Ions"; Journal of Fuel Chemistry and Technology; vol. 41, No. 7; Jul. 31, 2013; ISSN: 0253-2409.

Rees, Lovat V.C. et al.; "Szilard-Chalmers recoil of rare-earth cations in zeolite Y"; Zeolites; vol. 6, No. 4; Jul. 1986; pp. 234-250.

Zhuo, Mingkun; "Written Opinion for Application No. 11202200254X"; Intellectual Property Office of Singapore; Jun. 1, 2023; pp. 1-6.

\* cited by examiner

RARE EARTH-CONTAINING Y ZEOLITE, PREPARATION PROCESS THEREOF, AND CATALYTIC CRACKING CATALYST CONTAINING THE ZEOLITE

TECHNICAL FIELD

The present invention relates to a rare earth-containing Y zeolite and a preparation process thereof, and a catalytic cracking catalyst containing the zeolite.

BACKGROUND TECHNOLOGY

Catalytic cracking is the most important production technology in today's refineries. The catalytic cracking unit is used to convert heavy oil and residual oil into gasoline, diesel and light gas components.

In industry, a catalytic cracking unit must include two parts: reaction and high-temperature catalyst regeneration. Therefore, it is necessary for the catalyst to consider factors such as catalytic activity and selectivity. Compared with other types of zeolites, the Y zeolite is more used in cracking reactions. As the active component of the catalytic cracking catalyst, its main role in the catalytic cracking catalyst is responsible for the production of molecular products in the gasoline range.

Rare earth-exchanged rare earth Y zeolite is a highly active component of catalytic cracking catalyst.

The rare earth ions in the rare earth Y zeolite migrate from the super cage to the sodalite cage and form a polynuclear cation structure containing oxygen bridges, which increases the stability of the acid center of the zeolite under high temperature hydrothermal environment, and improves the cracking activity of the zeolite catalyst and the activity stability, thereby improving the heavy oil conversion activity and selectivity of the catalyst.

But when NaY zeolite is ion-exchanged with the aqueous solution of rare earth salt, it is difficult for the hydrated rare earth ions with a diameter of about 0.79 nm to enter the sodalite cage through the six-membered ring window of the Y zeolite (about 0.26 nm in diameter).

Therefore, during the preparation process of the rare earth Y zeolite, the hydration layer surrounding the rare earth ions must be removed by calcining, so that the rare earth ions can enter the sodalite cage or even the hexagonal prism. At the same time, the sodium ions in these cages also rely on the calcining process to migrate out to the super cage. In short, the result of calcining is to accelerate the intracrystalline exchange between solid ions, creating conditions for the exchange of zeolites with other cations such as $NH_4+$ and $RE3+$ in aqueous solution and reducing the $Na+$ content of zeolites (U.S. Pat. No. 3,402,996).

Therefore, how to promote the migration of rare earth ions and increase the occupancy rate of the rare earth ions on the cation position (in the sodalite cage) that can be locked will directly affect the performance of the rare earth Y zeolite and affect the activity stability of the catalyst having it as the active component.

In order to promote the migration of rare earth ions into the sodalite cage, the industry usually adopts high-temperature calcining or high-temperature hydrothermal calcining. However, the excessively high calcining temperature has more stringent requirements for the material of the industrial calcining furnace, and there is a tendency that the rare earth ions that have been locked in position return to the super cage (Zeolites, 6 (4), 235, 1986).

Current status of industrial calcining technology: the rare earth NaY (sodium oxide content 4.5-6.0%) zeolite filter cake obtained after the exchange of NaY and RE3+ needs to be calcined at a high temperature (550-580° C.) for the solid ion exchange, and then the aqueous solution exchange to remove sodium.

The current main problem is the necessity to further improve the current solid-state ion exchange degree.

Therefore, how to make as many rare earth ions as possible to migrate to the sodalite cage position under the limited calcining temperature to further improve the stability of the zeolite has become a major technical problem to be solved in the industry.

CN1026225C discloses a process for preparing the rare earth Y zeolite, which comprises ion-exchanging the NaY zeolite with RE3+ in an aqueous solution at 450-600° C. for one time, and then calcining in a 100% flowing steam for 1-3 hours.

CN103508467A discloses a rare earth Y zeolite and its preparation process, which comprises contacting a NaY zeolite with a rare earth salt solution or a mixed solution of an ammonium salt and a rare earth salt solution, filtering, washing with water, drying and calcining to obtain a rare earth NaY zeolite; then vigorously mixing and stirring it with water and contacting with an ammonium salt solution without filtering, then mixing with a rare earth salt solution and adjusting the pH value of the slurry with an alkaline liquid for the rare earth deposition, or vigorously mixing and stirring the rare earth NaY zeolite with water and contacting with a mixed solution of an ammonium salt and a rare earth salt solution, and adjusting the pH value of the slurry with an alkaline liquid for the rare earth deposition; and then filtering and drying and then calcining for the second time to obtain rare earth Y zeolite.

The process needs to go through two exchanging steps and two calcining steps together with the deposition of rare earths.

In the prior art, due to the limitation of the calcining process, in the rare earth Y zeolite at a limited calcining temperature, when the rare earth ions migrate to the position of the sodalite cage, some rare earth ions still exist in the super cage and fail to migrate to the sodalite cage in time. In this case, the hydrothermal stability of rare earth Y zeolite is limited, which in turn affects its heavy oil cracking conversion capacity in catalytic cracking catalysts.

SUMMARY OF THE INVENTION

The inventors of the present invention unexpectedly discovered on the basis of a large number of experiments: the hydrothermal calcining in the pressurized manner can obtain a rare earth-containing Y zeolite with unique mesoporous characteristics, and the rare earth-containing Y zeolite has higher activity stability and hydrothermal stability. Based on this, the present invention is formed.

The present invention provides a rare earth-containing Y zeolite, having at least two mesopore pore-size distributions at 2-3 nanometers and 3-4 nanometers. For example, the rare earth containing Y zeolite at least have three mesopore pore size distributions, respectively, those at 2-3 nm, 3-4 nm, and 10-30 nm.

The present invention also provides a catalytic cracking catalyst, which includes the above-mentioned rare earth-containing Y zeolite, and an inorganic oxide binder and/or natural minerals.

The present invention also provides a process for preparing rare earth-containing Y zeolite, which includes the step of hydrothermally calcining the rare-earth-containing NaY zeolite in an atmosphere condition where an external pressure is applied and water is externally added, the gauge pressure is 0.01 to 1.0 MPa and the atmosphere contains 1 to 100% water vapor, and the hydrothermal calcining treatment is carried out at a temperature of 300 to 800° C., preferably 400 to 600° C. The rare earth-containing NaY zeolite is obtained by contacting the NaY zeolite with a rare earth salt solution or a mixed solution of a rare earth salt solution and an ammonium salt.

The present invention also provides a process for preparing rare earth-containing Y zeolite, which includes: (1) partially ammonium-exchanging of a NaY zeolite with an ammonium salt to remove 10-80% sodium ions, filtering, washing, and drying to obtain a NH4NaY zeolite; (2) contacting the NH4NaY zeolite obtained in step (1) with a rare-earth salt solution or a mixed solution of rare-earth salt solution and ammonium salt, filtering, water washing, drying to obtain a rare earth-containing NaY zeolite; (3) hydrothermally calcining the rare-earth-containing NaY zeolite obtained in step (2) in an atmosphere condition where an external pressure is applied and an aqueous solution containing acidic substance or alkaline substance is externally added, or contacting the rare-earth-containing NaY zeolite obtained in step (2) with acidic substance or alkaline substance to obtain a rare earth-containing NaY zeolite containing acidic substance or alkaline substance, and then hydrothermally calcining it in an atmosphere condition where an external pressure is applied and water is externally added; for the atmosphere condition, the gauge pressure is 0.01-1 MPa and the atmosphere contains 1-100% water vapor, the temperature of hydrothermally calcining is 300-800° C., preferably 400-600° C.

The rare earth-containing Y zeolite provided by the present invention has higher hydrothermal structural stability and higher cracking activity stability, reduced coke selectivity, and has broad application prospects in the field of heavy oil catalysis.

The process for preparing the rare earth-containing Y zeolite provided by the present invention can promote the migration of rare-earth ions from super cages to sodalite cages and form special pore-size distribution characteristics. The process is simple and easy to operate, and the mesopores of Y zeolites are significantly increased. It can form a certain degree of zeolite mesopores, improve the accessibility, and increase the utilization rate of active centers. This process is a low-cost and low-emission new way to expand the pores of the zeolite crystals.

4

DETAILED DESCRIPTION

Rare Earth-Containing Y Zeolite

Figure 1:
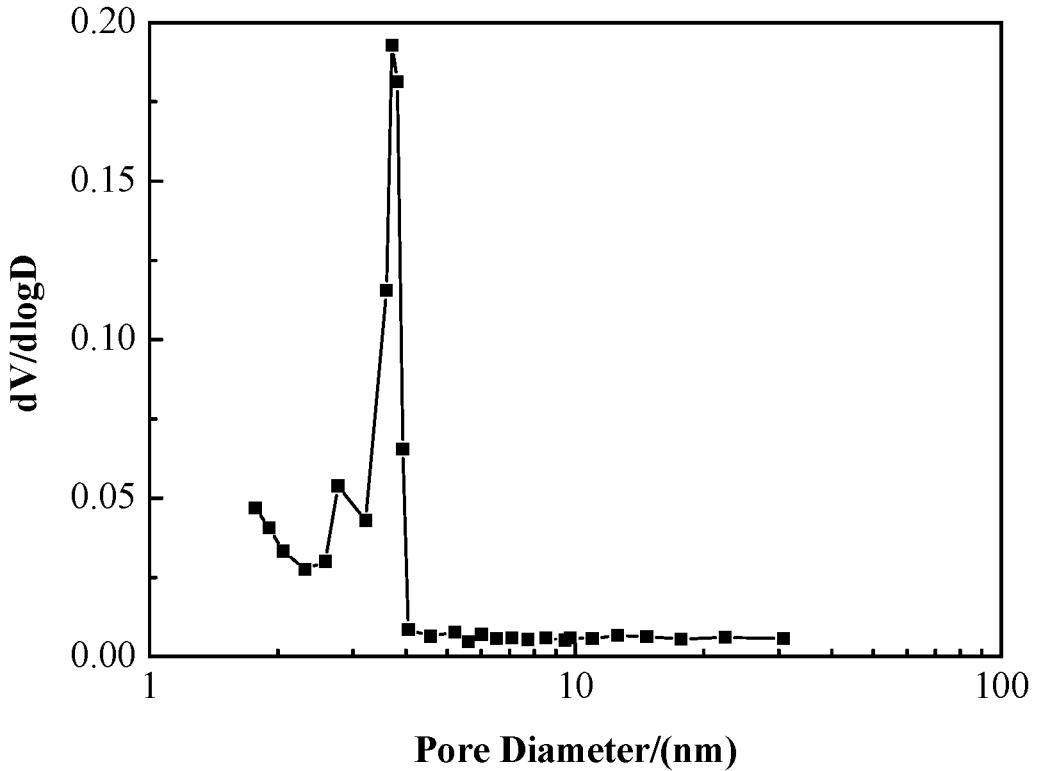
FIG. 1 is a pore size distribution curve of PAY-1 obtained from the BJH model calculation.

The present invention provides a rare earth-containing Y zeolite, having at least two mesopore pore-size distributions at 2-3 nanometers and 3-4 nanometers. For example, the rare earth containing Y zeolite at least have three mesopore pore size distributions, respectively, those at 2-3 nm, 3-4 nm, and 10-30 nm.

According to an embodiment of the present invention, in the BJH pore-size distribution curve, the ratio of the peak area for the pore-size distribution at 2-3 nanometers to the peak area for the pore-size distribution at 3-4 nanometers is ≥0.05, for example ≥0.1, or 0.1 to 0.4.

According to an embodiment of the present invention, the rare earth-containing Y zeolite of the present invention is characterized by at least having mesopore pore-size distributions at 2-3 nanometers, 3-4 nanometers, 10-30 nanometers. In the BJH pore size distribution graph, the ratio of the peak area for the pore-size distribution at 2-3 nanometers to the peak area of the total pores is greater than 0.1, and the ratio of the peak area for the pore-size distribution at 10-30 nanometers to the peak area of the total pores is greater than 0.2; for example, the ratio of the peak area for the pore-size distribution at 2-3 nanometers to the peak area of the total pores is greater than 0.12, the ratio of the peak area for the pore-size distribution at 10-30 nanometers to the peak area of the total pores is greater than 0.22; or, the ratio of the peak area for the pore-size distribution at 2-3 nanometers to the peak area of the total pores is greater than 0.15, the ratio of the peak area for the pore-size distribution at 10-30 nanometers to the peak area of the total pores is for example greater than 0.25; or, the ratio of the peak area for the pore-size distribution at 2-3 nanometers to the peak area of the total pores is 0.18-0.26, the ratio of the peak area for the pore-size distribution at 10-30 nanometers to the peak area of the total pores is 0.27-0.32; or the ratio of the peak area for the pore-size distribution at 2-3 nanometers to the peak area of the total pores is greater than 0.12, preferably greater than 0.15, more preferably 0.18-0.26, the ratio of the peak area for the pore-size distribution at 10-30 nanometers to the peak area of the total pores is greater than 0.22, preferably greater than 0.25, more preferably 0.27-0.32.

According to an embodiment of the present invention, the rare earth-containing Y zeolite of the present invention is characterized by at least having mesopore pore-size distributions at 2-3 nanometers, 3-4 nanometers, 10-30 nanometers. in the BJH pore size distribution graph, the ratio of the peak area for the pore-size distribution at 2-3 nanometers to the peak area of the total pores is greater than 0.1, the ratio of the peak area for the pore-size distribution at 10-30 nanometers to the peak area of the total pores is greater than 0.2; for example, the ratio of the peak area for the pore-size distribution at 2-3 nanometers to the peak area of the total pores is greater than 0.12, the ratio of the peak area for the pore-size distribution at 10-30 nanometers to the peak area of the total pores is greater than 0.22; or, the ratio of the peak area for the pore-size distribution at 2-3 nanometers to the peak area of the total pores is greater than 0.15, the ratio of the peak area for the pore-size distribution at 10-30 nanometers to the peak area of the total pores is for example greater than 0.25; Or, the ratio of the peak area for the pore-size distribution at 2-3 nanometers to the peak area of the total pores is 0.18-0.26, the ratio of the peak area for the pore-size distribution at 10-30 nanometers to the peak area of the total pores is 0.27-0.32; the ratio of the peak area for the pore-size distribution at 2-3 nanometers to the peak area for the pore-size distribution at 3-4 nanometers is ≥0.05, for example ≥0.1, or 0.1 to 0.4.

According to an embodiment of the present invention, the rare earth-containing Y zeolite of the present invention has a rare earth content of 1-20 wt %, for example, 2-18 wt %, or 8-15 wt % in terms of rare earth oxide, a unit cell constant of 2.440-2.470 nm, and a crystallinity of 30-60%. According to an embodiment of the present invention, the rare earth-containing Y zeolite of the present invention has a mesopore volume of greater than 0.03 cc/g, for example greater than 0.031 cc/g, or 0.031 cc/g to 0.037 cc/g or 0.031 cc/g to 0.057 cc/g. The mesoporous refers to pores having a pore size of 2-50 nm.

For the Y zeolite containing rare earth, in its X-ray diffraction pattern, the peak at $2\theta=11.8\pm0.1°$ can be used to characterize the distribution of rare earth in the sodalite cage, I1 represents its peak intensity; the peak at $2\theta=12.3\pm0.1°$ can be used to characterize the distribution of rare earths in super cages, I2 represents its peak intensity, and the ratio of I1 to I2 can be used to characterize the degree of migration of rare earth ions from super cages to sodalite cages. The higher the ratio, the better the migration degree, and vice versa.

If the rare earth-containing Y zeolite obtained by conventional atmospheric steam calcining is used, the ratio of the intensity I1 of the peak at $2\theta=11.8\pm0.1°$ to the intensity I2 of the peak at $2\theta=12.3\pm0.1°$ in the X-ray diffraction pattern is usually <4.

For the rare earth-containing Y zeolite, the ratio of the intensity I1 of the peak at $2\theta=11.8\pm0.1°$ to the intensity I2 of the peak at $2\theta=12.3\pm0.1°$ in the X-ray diffraction pattern can be >4.0, ≥4.0, >4.3, ≥4.8, ≥4.9, for example, 4.5-6.0, for example 4.8-6.0, or 4.8-7.0.

Catalyst

The present invention also provides a catalytic cracking catalyst, which includes the above-mentioned rare earth-containing Y zeolite, an inorganic oxide binder and/or a natural mineral.

According to an embodiment of the present invention, the catalytic cracking catalyst of the present invention, based on the dry weight, contains 20-60 wt/o of rare earth-containing Y zeolite, 10-30 wt % of inorganic oxide binder and 30-50 wt % of natural mineral.

According to an embodiment of the present invention, the above-mentioned rare earth-containing Y zeolite is used as the main cracking active component.

Inorganic oxide binders and natural minerals are those conventionally used in this field.

In the catalytic cracking catalyst of the present invention, the natural mineral includes at least one selected from kaolin, halloysite, montmorillonite, diatomite, attapulgite, sepiolite, keramite, hydrotalcite, bentonite and rectorite; the inorganic oxide binder or its precursor includes at least one selected from silica sol, alumina sol, peptized pseudo-boehmite, silica alumina sol and phosphorus-containing alumina sol.

The preparation process of the catalytic cracking catalyst of the present invention includes: mixing the raw materials used for preparing the catalytic cracking catalyst including rare earth-containing Y zeolite, natural minerals and inorganic oxide binders with water and then vigorously stirring and spray drying, wherein on a dry basis weight, the catalyst contains 20-60 wt % of rare earth-containing Y zeolite, 10-30 wt/o of inorganic oxide binder and 30-50 wt % of natural mineral.

6

Preparation Process of Rare Earth-Containing Y Zeolite

The first process for preparing the rare earth-containing Y zeolite according to the present invention comprises a step of hydrothermally calcining a rare earth-containing NaY zeolite in an atmosphere condition where an external pressure is applied and water is externally added, For the atmosphere condition, the gauge pressure is 0.01-1 MPa and the atmosphere contains 1-100% water vapor, the temperature of hydrothermally calcining is 300-800° C., preferably 400-600° C.

In the process of the present invention, the rare earth-containing NaY zeolite is obtained from step A of contacting a NaY zeolite with a rare-earth salt solution or a mixed solution of rare-earth salt solution and ammonium salt.

In step A, the rare-earth salt solution is selected from an aqueous chloride solution containing one or more of lanthanum, cerium, praseodymium, and neodymium ions; the ammonium salt is selected from ammonium chloride, ammonium nitrate, ammonium carbonate and ammonium bicarbonate or any mixture thereof.

In the process of the present invention, step A is preferably carried out at pH=3.0-5.0, at the water/zeolite weight ratio of 5-30, and at room temperature to 100° C.

After contacting in step A, it also includes conventional filtering, water washing, and drying, the purpose thereof is to remove chloride ions for example, prevent the subsequent calcining process from the corrosion to the equipment, and also play a role in partial sodium removal.

In the process of the present invention, the hydrothermal calcining treatment is carried out in an atmosphere condition where an external pressure is applied and water is externally added.

The atmosphere condition is obtained by externally applying the pressure and externally applying water, preferably the gauge pressure is 0.1-0.8 MPa, more preferably 0.3-0.6 MPa, preferably it contains 30-100% water vapor, more preferably 60-100% water vapor.

The externally applied pressure refers to applying a certain pressure from the outside during the process of hydrothermally calcining the material. For example, it can be carried out by introducing an inert gas from the outside to maintain a certain back pressure.

The amount of externally applied water is to meet the requirement that the atmosphere condition contains 1-100% water vapor.

The process of the present invention may also include the step of performing ammonium exchange after the step of hydrothermal calcining treatment.

The ammonium exchange is carried out at room temperature to 100° C. for at least 0.3 hours, wherein based on the dry basis of the zeolite, the weight ratio of the rare earth NaY zeolite to ammonium salt to water is 1:(0.05 to 0.5). (5 to 30).

The second process for preparing the above-mentioned rare earth-containing Y zeolite according to the present invention is characterized in that the preparation process comprises:

(1) partially ammonium-exchanging of a NaY zeolite with an ammonium salt to remove 10-80% sodium ions, filtering, washing, and drying to obtain a NH4NaY zeolite;

(2) contacting the NH4NaY zeolite obtained in step (1) with a rare-earth salt solution or a mixed solution of rare-earth salt solution and ammonium salt, filtering, water washing, drying to obtain a rare earth-containing NaY zeolite;

(3) hydrothermally calcining the rare earth-containing NaY zeolite obtained in step (2) in an atmosphere condition wherein an external pressure is applied and water is externally added, for the atmosphere condition, the gauge pressure is 0.01-1 MPa and the atmosphere contains 1-100% water vapor, the temperature of hydrothermally calcining is 300-800° C., preferably 400-600° C.

In the preparation process of the present invention, the ammonium salt in step (1) and step (2) is selected from ammonium chloride, ammonium nitrate, ammonium carbonate and ammonium bicarbonate or any mixture thereof.

In the preparation process of the present invention, in the step (1), the NaY zeolite is partially ammonium exchanged with the ammonium salt, and the purpose is to remove 10-80%, preferably 20-60% of sodium ions.

The process can comprise, for example, the NaY zeolite is exchanged with the ammonium salt solution at a NaY zeolite exchanging temperature from room temperature to 100° C. for at least 0.3 hours, wherein the weight ratio of water to zeolite is 5-30, and the weight ratio of ammonium salt thereto is 0.01 to 3.

In the preparation process of the present invention, in step (2), the rare-earth salt solution is selected from an aqueous chloride solution containing one or more of lanthanum, cerium, praseodymium, and neodymium ions.

In the preparation process of the present invention, in the step (2), contacting the NaY zeolite with a rare-earth salt solution or a mixed solution of rare-earth salt solution and ammonium salt comprises exchanging the NaY zeolite with the rare-earth salt solution or the mixed solution of ammonium salt and rare-earth salt solution at a slurry pH of 3.0-5.0, at the weight ratio of water/zeolite of 5-30, and at the exchanging temperature from room temperature to 100° C. for at least 0.3 hours.

After contacting in step (2), it also includes conventional filtering, water washing, and drying, the purpose thereof is to remove chloride ions for example, prevent the subsequent calcining process from the corrosion to the equipment, and also play a role in partial sodium removal.

In the preparation process of the present invention, in step (3) the hydrothermal calcining treatment is carried out in an atmosphere condition where an external pressure is applied and water is externally added.

The atmosphere condition is obtained by externally applying the pressure and externally applying water, preferably the gauge pressure is 0.1-0.8 MPa, more preferably 0.3-0.6 MPa, preferably it contains 30-100% water vapor, more preferably 60-100% water vapor.

The externally applied pressure refers to applying a certain pressure from the outside during the process of hydrothermally calcining the material. For example, it can be carried out by introducing an inert gas from the outside to maintain a certain back pressure.

The amount of externally applied water is to meet the requirement that the atmosphere condition contains 1-100% water vapor.

The preparation process of the present invention may also include step (4) of ammonium exchange after step (3).

The ammonium exchange in step (4) is carried out at room temperature to 100° C. for at least 0.3 hours, wherein based on the dry basis of the zeolite, the weight ratio of the rare earth NaY zeolite to ammonium salt to water is 1:(0.05 to 0.5):(5 to 30).

This preparation process of the present invention produces the rare earth-containing Y zeolite of the present invention with unique pore size distribution characteristic, for which there are at least mesoporous pore size distributions at 2-3 nanometers, 3-4 nanometers, and 10-30 nanometers, wherein the ratio of the peak area for the pore-size distribution at 2-3 nanometers to the peak area of the total pores is greater than 0.1, and the ratio of the peak area for the pore-size distribution at 10-30 nanometers to the peak area of the total pores is greater than 0.2.

The third process for preparing the rare earth-containing Y zeolite according to the present invention includes: the rare earth-containing NaY zeolite is hydrothermally calcined in an atmosphere condition where the external pressure is applied and an aqueous solution containing acidic substance or alkaline substance is externally added, and a product is recovered, for the atmosphere condition, the gauge pressure is 0.01-1 MPa and it contains 1-100% water vapor.

In the preparation process of the present invention, the rare earth-containing NaY zeolite is preferably obtained by contacting NaY zeolite with a rare-earth salt solution or a mixed solution of rare-earth salt solution and ammonium salt, and then filtering, water washing and drying.

The rare-earth salt solution is selected from an aqueous chloride solution containing one or more of lanthanum, cerium, praseodymium, and neodymium ions.

The ammonium salt is selected from ammonium chloride, ammonium nitrate, ammonium carbonate and ammonium bicarbonate or any mixture thereof.

Contacting the NaY zeolite with a rare-earth salt solution or a mixed solution of rare-earth salt solution and ammonium salt comprises exchanging the NaY zeolite with a rare-earth salt solution or a mixed solution of rare-earth salt solution and ammonium salt at a slurry pH of 3.0-5.0, at the weight ratio of water/zeolite of 5-30, and at the exchanging temperature from room temperature to 100° C. for at least 0.3 hours.

In the process of the present invention, the hydrothermal calcining treatment is carried out in an atmosphere condition where an external pressure is applied and water is externally added.

The atmosphere condition is obtained by externally applying the pressure and externally applying water, preferably the gauge pressure is 0.1-0.8 MPa, more preferably 0.3-0.6 MPa, preferably it contains 30-100% water vapor, more preferably 60-100% water vapor.

The externally applied pressure refers to applying a certain pressure from the outside during the process of hydrothermally calcining the material. For example, it can be carried out by introducing an inert gas from the outside to maintain a certain back pressure.

The amount of externally applied water is to meet the requirement that the atmosphere condition contains 1-100% water vapor.

The process of the present invention may also include the step of performing ammonium exchange thereafter.

The ammonium exchange is carried out at room temperature to 100° C. for at least 0.3 hours, wherein based on the dry basis of the zeolite, the weight ratio of the rare earth NaY zeolite to ammonium salt to water is 1:(0.05 to 0.5). (5 to 30).

The rare earth-containing NaY zeolite is calcined at a gauge pressure of 0.01-1 MPa in the 1-100% water vapor atmosphere and in presence of an acidic substance or an alkaline substance; preferably at 300-800° C. under 0.1-0.8 MPa in the 30-100% water vapor atmosphere for at least 0.1 hours, more preferably at 400-600° C. under 0.3-0.6 MPa in the 60-100% water vapor atmosphere for 1-3 hours.

The acidic substance includes ammonium chloride, ammonium sulfate, ammonium carbonate, ammonium bicarbonate, ammonium phosphate, ammonium dihydrogen phosphate, diammonium phosphate, hydrochloric acid, sulfuric acid, nitric acid or any mixture thereof, preferably ammonium carbonate, ammonium bicarbonate, ammonium phosphate, ammonium dihydrogen phosphate, diammonium phosphate, or any mixture thereof; the alkaline substance includes ammonia water, buffer solution of ammonia water and ammonium chloride, sodium hydroxide, sodium metalluminate, sodium carbonate, sodium bicarbonate or any mixture thereof; preferably ammonia water or buffer solution of ammonia water and ammonium chloride.

The preparation process of the present invention may further include subjecting the product, rare earth sodium Y zeolite to an ammonium salt aqueous solution exchange treatment, filtering, washing, and drying to obtain a rare earth-containing Y zeolite.

The exchange treatment is to exchange at room temperature to 100° C. for at least 0.3 hours, where the weight ratio of the rare earth sodium Y zeolite (calculated on the dry basis of the zeolite) to ammonium salt to water is 1:(0.05 to 0.5):(5 to 30).

The fourth process for preparing the rare earth-containing Y zeolite according to the present invention includes: the rare earth-containing NaY zeolite is contacted with an acidic substance or an alkaline substance to produce an acidic substance or alkaline substance-containing rare earth-containing NaY zeolite, which is hydrothermally calcined in an atmosphere condition where an external pressure is applied and water is externally added, for the atmosphere condition, the gauge pressure is 0.01-1 MPa and it contains 1-100% water vapor.

In the preparation process of the present invention, the rare earth-containing NaY zeolite is preferably obtained by a step A of contacting NaY zeolite with a rare-earth salt solution or a mixed solution of rare-earth salt solution and ammonium salt, and then filtering, water washing and drying.

Step A: the rare-earth salt solution is selected from an aqueous chloride solution containing one or more of lanthanum, cerium, praseodymium, and neodymium ions.

Step A: the ammonium salt is selected from ammonium chloride, ammonium nitrate, ammonium carbonate and ammonium bicarbonate or any mixture thereof.

Step A: contacting the NaY zeolite with a rare-earth salt solution or a mixed solution of rare-earth salt solution and ammonium salt usually comprises exchanging the NaY zeolite with the rare-earth salt solution or the mixed solution of ammonium salt and rare-earth salt solution at a slurry pH of 3.0-5.0, at the weight ratio of water/zeolite of 5-30, and at the exchanging temperature from room temperature to 100° C. for at least 0.3 hours.

In the preparation process of the present invention, the rare earth-containing NaY zeolite is modified by acidic substances or alkaline substances. The acidic substance includes ammonium chloride, ammonium sulfate, ammonium carbonate, ammonium bicarbonate, ammonium phosphate, ammonium dihydrogen phosphate, diammonium phosphate, hydrochloric acid, sulfuric acid, nitric acid or any mixture thereof; the alkaline substance includes ammonia water, buffer solution of ammonia water and ammonium chloride, sodium hydroxide, sodium metalluminate, sodium carbonate, sodium bicarbonate or any mixture thereof; said contacting with acidic substance or alkaline substance can be any conventional manner such as impregnation or loading.

In the preparation process of the present invention, the hydrothermal calcining treatment is carried out in an atmosphere condition where an external pressure is applied and water is externally added.

The atmosphere condition is obtained by externally applying the pressure and externally applying water, preferably the gauge pressure is 0.1-0.8 MPa, more preferably 0.3-0.6 MPa, preferably it contains 30-100% water vapor, more preferably 60-100% water vapor.

The amount of externally applied water is to meet the requirement that the atmosphere condition contains 1-100% water vapor.

The hydrothermal calcining temperature is 300-800° C., preferably 400-600° C.; the calcining time is at least 0.1 hours, preferably 0.5 to 3 hours.

The fifth process for preparing a rare earth-containing Y zeolite according to the present invention comprises:

(1) partially ammonium-exchanging of a NaY zeolite with an ammonium salt to remove 10-80% sodium ions, filtering, washing, and drying to obtain a NH4NaY zeolite;

(2) contacting the NH4NaY zeolite obtained in step (1) with a rare-earth salt solution or a mixed solution of rare-earth salt solution and ammonium salt, filtering, water washing, drying to obtain a rare earth-containing NaY zeolite;

(3) hydrothermally calcining the rare earth-containing NaY zeolite obtained in step (2) in an atmosphere condition where an external pressure is applied and an aqueous solution containing acidic substance or alkaline substance is externally added, or contacting the rare earth-containing NaY zeolite obtained in step (2) with acidic substance or alkaline substance to obtain a rare earth-containing NaY zeolite containing acidic substance or alkaline substance, and then hydrothermally calcining it in an atmosphere condition where an external pressure is applied and water is externally added; For the atmosphere condition, the gauge pressure is 0.01 to 1 MPa (for example 0.1 to 0.8 MPa, or 0.3 to 0.6 MPa) and the atmosphere contains 1-100% (for example 30-100%, or 60 to 100%) water vapor, the temperature of hydrothermal calcining is 300 to 800° C., preferably 400 to 600.

In the preparation process of the present invention, the ammonium salt in step (1) and step (2) is selected from ammonium chloride, ammonium nitrate, ammonium carbonate and ammonium bicarbonate or any mixture thereof.

In the preparation process of the present invention, in the step (1), the NaY zeolite is partially ammonium exchanged with the ammonium salt, and the purpose is to remove 10-80%, preferably 20-60% of sodium ions.

The process can comprise, for example, the NaY zeolite is exchanged with the ammonium salt solution at a NaY zeolite exchanging temperature from room temperature to 100° C. for at least 0.3 hours, wherein the weight ratio of water to zeolite is 5-30, and the weight ratio of ammonium salt thereto is 0.01 to 3.

In the preparation process of the present invention, in step (2), the rare-earth salt solution is selected from an aqueous chloride solution containing one or more of lanthanum, cerium, praseodymium, and neodymium ions.

In the preparation process of the present invention, in the step (2), contacting the NaY zeolite with a rare-earth salt solution or a mixed solution of rare-earth salt solution and ammonium salt comprises exchanging the NaY zeolite with the rare-earth salt solution or the mixed solution of ammonium salt and rare-earth salt solution at a slurry pH of 3.0-5.0, at the weight ratio of water/zeolite of 5-30, and at the exchanging temperature from room temperature to 100° C. for at least 0.3 hours.

After contacting in step (2), it also includes conventional filtering, water washing, and drying, the purpose thereof is to remove chloride ions for example, prevent the subsequent calcining process from the corrosion to the equipment, and also play a role in partial sodium removal.

In the preparation process of the present invention, in step (3) the hydrothermal calcining treatment is carried out in an atmosphere condition where an external pressure is applied and water is externally added.

The acidic substance may include but not limited to ammonium chloride, ammonium sulfate, ammonium carbonate, ammonium bicarbonate, ammonium phosphate, ammonium dihydrogen phosphate, diammonium phosphate, hydrochloric acid, sulfuric acid, nitric acid or any mixture thereof, preferably ammonium carbonate, ammonium bicarbonate, ammonium phosphate, ammonium dihydrogen phosphate, diammonium phosphate, and any mixture thereof; the alkaline substance can include but not limited to ammonia water, buffer solution of ammonia water and ammonium chloride, sodium hydroxide, sodium metalluminate, sodium carbonate, sodium bicarbonate or any mixture thereof, preferably ammonia water or buffer solution of ammonia water and ammonium chloride.

The atmosphere condition is obtained by externally applying the pressure and externally applying water, preferably the gauge pressure is 0.1-0.8 MPa, more preferably 0.3-0.6 MPa, preferably it contains 30-100% water vapor, more preferably 60-100% water vapor.

The externally applied pressure refers to applying a certain pressure from the outside during the process of hydrothermally calcining the material. For example, it can be carried out by introducing an inert gas from the outside to maintain a certain back pressure.

The amount of water in the acidic substance or alkaline substance-containing aqueous solution externally added is to meet the requirement that the atmosphere condition contains 1-100% water vapor.

The preparation process of the present invention may also include step (4) of ammonium exchange after step (3).

The ammonium exchange in step (4) is carried out at room temperature to 100° C. for at least 0.3 hours, wherein based on the dry basis of the zeolite, the weight ratio of the rare earth NaY zeolite to ammonium salt to water is 1:(0.05 to 0.5):(5 to 30).

This preparation process of the present invention produces the rare earth-containing Y zeolite of the present invention with unique pore size distribution characteristic, for which there are at least mesoporous pore size distributions at 2-3 nanometers, 3-4 nanometers, and 10-30 nanometers, wherein the ratio of the peak area for the pore-size distribution at 2-3 nanometers to the peak area of the total pores is greater than 0.1, and the ratio of the peak area for the pore-size distribution at 10-30 nanometers to the peak area of the total pores is greater than 0.2. Moreover, in the BJH pore-size distribution curve, the ratio of the peak area for the pore-size distribution at 2-3 nanometers to the peak area for the pore-size distribution at 3-4 nanometers was ≥0.05, for example ≥0.1, or 0.1-0.4.

The process for preparing the rare earth-containing Y zeolite provided by the present invention can comprise calcining only once, and preferably comprises calcining only once.

The present invention also provides the following technical solutions:

A1. A rare earth-containing Y zeolite, having at least two mesopore pore-size distributions at 2-3 nanometers and 3-4 nanometers.

A2. The zeolite of Solution A1, in its BJH pore-size distribution curve, the ratio of the peak area for the pore-size distribution at 2-3 nanometers to the peak area for the pore-size distribution at 3-4 nanometers is ≥0.05, preferably ≥0.1, more preferably 0.1 to 0.4.

A3. The zeolite of Solution A1, which has a rare-earth content as rare-earth oxide of 2-18 wt %, preferably 8-15 wt %, a unit cell constant of 2.440-2.470 nm, and a crystallinity of 30-60%.

A4. The zeolite of Solution A1, wherein the ratio of the intensity I1 of the peak at $2\theta=11.8\pm0.1°$ to the intensity I2 of the peak at $2\theta=12.3\pm0.1°$ in the X-ray diffraction pattern ≥4.0, preferably 4.5-6.0.

A5. The process of any of Solutions A1-4, which is characterized in that it comprises the step of hydrothermally calcining the rare earth-containing NaY zeolite in an atmosphere condition where an external pressure is applied and water is externally added, for the atmosphere condition, the gauge pressure is 0.01 to 1.0 MPa and the atmosphere contains 1-100% water vapor.

A6. The process of Solution A5, the rare earth-containing NaY zeolite is obtained from step A of contacting a NaY zeolite with a rare-earth salt solution or a mixed solution of rare-earth salt solution and ammonium salt.

A7. The process of Solution A6, wherein the rare-earth salt solution is selected from an aqueous chloride solution containing one or more of lanthanum, cerium, praseodymium, and neodymium ions.

A8. The process of Solution A6, wherein the ammonium salt is selected from ammonium chloride, ammonium nitrate, ammonium carbonate and ammonium bicarbonate or any mixture thereof.

A9. The process of Solution A6, wherein, step A is carried out at pH=3.0-5.0, at the water/zeolite weight ratio of 5-30, and at room temperature to 100° C.

A10. The process of Solution A5, wherein for the atmosphere condition, the gauge pressure is preferably 0.1 to 0.8 MPa, more preferably 0.3 to 0.6 MPa, and the atmosphere contains 30% to 100% water vapor, preferably 60 to 100% water vapor.

A11. The process of Solution A5, wherein the step of hydrothermal calcining is performed at 300-800° C., preferably 400-600° C.

B1. A rare earth-containing Y zeolite, which is characterized in that there are at least mesoporous pore size distributions at 2-3 nanometers, 3-4 nanometers, and 10-30 nanometers, wherein in the BJH pore size distribution spectrum, the ratio of the peak area for the pore-size distribution at 2-3 nanometers to the peak area of the total pores is greater than 0.1, and the ratio of the peak area for the pore-size distribution at 10-30 nanometers to the peak area of the total pores is greater than 0.2.

B2. The zeolite of Solution B1, wherein the ratio of the peak area for the pore-size distribution at 2-3 nanometers to the peak area of the total pores is greater than 0.12, preferably greater than 0.15, more preferably 0.18-0.26, the ratio of the peak area for the pore-size distribution at 10-30 nanometers to the peak area of the total pores is greater than 0.22, preferably greater than 0.25, more preferably 0.27-0.32.

B3. The zeolite of Solution B1, wherein the rare earth content as rare earth oxide is 2-18 wt %, preferably 8-15 wt %, the unit cell constant is 2.440-2.470 nm, and the crystallinity degree is 30-60%.

B4. The zeolite of Solution B1, wherein the ratio of the intensity I1 of the peak at $2\theta=11.8\pm0.1°$ to the intensity I2 of the peak at $2\theta=12.3\pm0.1$ in the X-ray diffraction pattern is greater than 4.0, preferably greater than 4.3, more preferably 4.8-6.0.

B5. A process for preparing a rare earth-containing Y zeolite, comprising the following steps:
(1) partially ammonium-exchanging of a NaY zeolite with an ammonium salt to remove 10-80% sodium ions, filtering, washing, and drying to obtain a NH4NaY zeolite;
(2) contacting the NH4NaY zeolite obtained in step (1) with a rare-earth salt solution or a mixed solution of rare-earth salt solution and ammonium salt, filtering, water washing, drying to obtain a rare earth-containing NaY zeolite;
(3) hydrothermally calcining the rare earth-containing NaY zeolite obtained in step (2) in an atmosphere condition wherein an external pressure is applied and water is externally added, for the atmosphere condition, the gauge pressure is 0.01 to 1 MPa and the atmosphere contains 1-100% water vapor.

B6. The process of Solution B5, wherein in step (1) and in step (2) the ammonium salt is selected from ammonium chloride, ammonium nitrate, ammonium carbonate and ammonium bicarbonate or any mixture thereof.

B7. The process of Solution B5, wherein in step (2) the rare-earth salt solution is an aqueous chloride solution containing one or more of lanthanum, cerium, praseodymium, and neodymium ions.

B8. The process of Solution B5, wherein in step (2) the NaY zeolite is exchanged with a rare-earth salt solution or a mixed solution of rare-earth salt solution and ammonium salt at a slurry pH of 3.0-5.0, at the weight ratio of water/zeolite of 5-30, and at the exchanging temperature from room temperature to 100° C. for at least 0.3 hours.

B9. The process of Solution B5, wherein in step (3) for the atmosphere condition, the gauge pressure is 0.1 to 0.8 MPa, preferably 0.3 to 0.6 MPa, and the atmosphere contains 30% to 100% water vapor, preferably 60 to 100% water vapor.

B10. The process of Solution B5, wherein in step (3) the hydrothermal calcining is performed at 300-800° C., preferably 400-600° C.

C1. A process for preparing a rare earth-containing Y zeolite, which comprises hydrothermally calcining a rare earth-containing NaY zeolite in an atmosphere condition where an external pressure is applied and an acidic substance or alkaline substance-containing aqueous solution is externally added; and recovering the product, for the atmosphere condition, the gauge pressure is 0.01 to 1 MPa and the atmosphere contains 1-100% water vapor.

C2. The process of Solution C1, wherein the rare earth-containing NaY zeolite is obtained by contacting NaY zeolite with a rare-earth salt solution or a mixed solution of rare-earth salt solution and ammonium salt, and then filtering, water washing and drying.

C3. The process of Solution C2, wherein the rare-earth salt solution is an aqueous chloride solution containing one or more of lanthanum, cerium, praseodymium, and neodymium ions.

C4. The process of Solution C2, wherein the ammonium salt is selected from ammonium chloride, ammonium nitrate, ammonium carbonate and ammonium bicarbonate or any mixture thereof.

C5. The process of Solution C2, wherein contacting the NaY zeolite with a rare-earth salt solution or a mixed solution of rare-earth salt solution and ammonium salt comprises exchanging the NaY zeolite with the rare-earth salt solution or the mixed solution of ammonium salt and rare-earth salt solution at a slurry pH of 3.0-5.0, at the weight ratio of water/zeolite of 5-30, and at the exchanging temperature from room temperature to 100° C. for at least 0.3 hours.

C6. The process of Solution C1 or C2, wherein the acidic substance includes ammonium chloride, ammonium sulfate, ammonium carbonate, ammonium bicarbonate, ammonium carbonate, ammonium phosphate, ammonium dihydrogen phosphate, diammonium phosphate, hydrochloric acid, sulfuric acid, nitric acid or any mixture thereof.

C7. The process of Solution C1, wherein the alkaline substance includes ammonia water, buffer solution of ammonia water and ammonium chloride, sodium hydroxide, sodium carbonate, sodium bicarbonate or any mixture thereof.

C8. The process of Solution C1, wherein for the atmosphere condition, the gauge pressure is preferably 0.1 to 0.8 MPa, more preferably the gauge pressure is 0.3 to 0.6 MPa, the temperature of hydrothermal calcining is 300 to 800° C., preferably 400 to 600° C.

C9. The process of Solution C1, wherein the atmosphere condition contains 30 to 100% water vapor, preferably 60 to 100% water vapor.

C10. Rare earth-containing Y zeolite obtained by any of the processes of solutions C1-C9.

C11. The zeolite of Solution C10, which has at least two mesopore pore size distributions at 2-3 nanometers and 3-4 nanometers, and its mesopore volume is greater than 0.03 cc/g.

C12. The zeolite of Solution C10, wherein the mesopore volume is 0.031 cc/g to 0.037 cc/g.

C13. The zeolite of Solution C10, wherein the ratio of the intensity I1 of the peak at $2\theta=11.8\pm0.1°$ to the intensity I2 of the peak at $2\theta=12.3\pm0.1°$ in the X-ray diffraction pattern is $\geq4.0$, preferably 4.5-6.0.

C14. The zeolite of Solution C10, which has a rare-earth content as rare-earth oxide of 2-18 wt %, preferably 8-15 wt %, a unit cell constant of 2.440-2.470 nm, and a crystallinity of 30-60%.

D1. A modification process of Y zeolite, which comprises hydrothermally calcining an alkaline substance-containing rare earth-containing NaY zeolite obtained by contacting a rare earth-containing NaY zeolite with an alkaline substance in an atmosphere condition where an external pressure is applied and water is externally added, for the atmosphere condition, the gauge pressure is 0.01 to 1 MPa and the atmosphere contains 1-100% water vapor.

D2. The process of Solution D1, wherein the rare earth-containing NaY zeolite is obtained by step A of contacting NaY zeolite with a rare-earth salt solution or a mixed solution of rare-earth salt solution and ammonium salt, and then filtering, water washing and drying.

D3. The process of Solution D2, wherein in step A the rare-earth salt solution is an aqueous chloride solution containing one or more of lanthanum, cerium, praseodymium, and neodymium.

D4. The process of Solution D2, wherein in step A the ammonium salt is selected from ammonium chloride, ammonium nitrate, ammonium carbonate and ammonium bicarbonate or any mixture thereof.

D5. The process of Solution D2, wherein step A is carried out at pH=3.0-5.0, at the water/zeolite weight ratio of 5-30, and at room temperature to 100° C.

D6. The process of Solution D1, wherein the alkaline substance is selected from ammonia water, buffer solution of ammonia water and ammonium chloride, sodium hydroxide, sodium carbonate, sodium bicarbonate and any mixture thereof.

D7. The process of Solution D1, wherein for the atmosphere condition, the gauge pressure is 0.1 to 0.8 MPa, preferably 0.3 to 0.6 MPa, the temperature of hydrothermal calcining is 300 to 800° C., preferably 400 to 600° C.

D8. The process of Solution D1 or D7, wherein the atmosphere condition contains 30 to 100% water vapor, preferably 60 to 100% water vapor.

D9. Rare earth-containing Y zeolite obtained by any of the processes of Solutions D1-D8.

D10. The zeolite of Solution D9, which has at least two mesopore pore size distributions at 2-3 nanometers and 3-4 nanometers, and its mesopore volume is greater than or equal to 0.031 cc/q.

D11. The zeolite of Solution D9, wherein the mesopore volume is 0.031 cc/g to 0.057 cc/g.

D12. The zeolite of Solution D9, wherein the ratio of the intensity I1 of the peak at $2\theta=11.8\pm0.1°$ to the intensity I2 of the peak at $2\theta=12.3\pm0.1°$ in the X-ray diffraction pattern is 24.0; preferably 4.5-6.0.

D13. The zeolite of Solution D9, having a rare-earth content as rare-earth oxide of 2-18 wt %, preferably 8-15 wt/o, a unit cell constant of 2.440-2.470 nm, and a crystallinity of 30-60%.

E1. A catalytic cracking catalyst containing inorganic oxide binder, natural mineral and rare earth-containing Y zeolite, characterized in that the rare-earth-containing Y zeolite has at least two mesopore pore-size distributions at 2-3 nanometers and at 3-4 nanometers.

E2. The catalyst of Solution E1, wherein, on a dry basis, it contains 10-30 wt % of inorganic oxide binder, 30-50 wt % of natural mineral and 20-60 wt % of rare earth-containing Y zeolite.

E3. The catalyst of Solution E1, wherein for the rare earth-containing Y zeolite, in the BJH pore-size distribution curve, the ratio of the peak area for the pore-size distribution at 2-3 nanometers to the peak area for the pore-size distribution at 3-4 nanometers is $\geq0.05$, preferably $\geq0.1$, more preferably 0.1 to 0.4.

E4. The catalyst of Solution E1, wherein the rare earth-containing Y zeolite has a rare-earth content as rare-earth oxide of 1-20 wt %, preferably 8-15 wt %, a unit cell constant of 2.440-2.470 nm, a crystallinity of 30-60%.

E5. The catalyst of Solution E1, wherein for said rare earth-containing Y zeolite, the ratio of the intensity I1 of the peak at $2\theta=11.8\pm0.1°$ to the intensity I2 of the peak at $2\theta=12.3\pm0.1°$ in the X-ray diffraction pattern is $\geq4.0$, preferably 4.5-6.0.

E6. The catalyst of any of Solutions E1-E5, wherein the rare earth-containing Y zeolite is obtained from a step that includes hydrothermally calcining a rare earth-containing NaY zeolite in an atmosphere condition where an external pressure is applied and water is externally added, for the atmosphere condition, the gauge pressure is 0.01 to 1.0 MPa and the atmosphere contains 1-100% water vapor.

E7. The catalyst of Solution E6, wherein the rare earth-containing NaY zeolite is obtained from step A of contacting a NaY zeolite with a rare-earth salt solution or a mixed solution of rare-earth salt solution and ammonium salt; preferably, the step A is carried out at pH=3.0-5.0, at the water/zeolite weight ratio of 5-30, and at room temperature to 100° C.

E8. The catalyst of Solution E7, wherein the rare-earth salt solution is an aqueous chloride solution containing one or more of lanthanum, cerium, praseodymium, and neodymium ions; the ammonium salt is selected from ammonium chloride, ammonium nitrate, ammonium carbonate and ammonium bicarbonate or any mixture thereof.

E9. The catalyst of Solution E6, wherein for the atmosphere condition, the gauge pressure is preferably 0.1 to 0.8 MPa, more preferably 0.3 to 0.6 MPa, the atmosphere contains 30% to 100% water vapor, preferably 60 to 100% water vapor: the step of hydrothermal calcining is carried out at 300 to 800° C., preferably 400 to 600° C.

E10. The catalyst of Solution E1, Wherein, the natural mineral is at least one selected from kaolin, halloysite, montmorillonite, diatomite, attapulgite, sepiolite, keramite, hydrotalcite, bentonite and rectorite, the inorganic oxide binder is at least one selected from silica sol, alumina sol, peptized pseudo-boehmite, silica alumina sol and phosphorus-containing alumina sol.

F1. A catalytic cracking catalyst containing rare earth-containing Y zeolite, which contains rare earth-containing Y zeolite, inorganic oxide binder and natural mineral, which is characterized in that the rare earth-containing Y zeolite at least has mesopore pore-size distributions at 2-3 nanometers, at 3-4 nanometers, at 10-30 nanometer, in the BJH pore size distribution curve, the ratio of the peak area for the pore-size distribution at 2-3 nanometers to the peak area of the total pores is greater than 0.1, the ratio of the peak area for the pore-size distribution at 10-30 nanometers to the peak area of the total pores is greater than 0.2.

F2. The catalyst of Solution F1, wherein based on the dry weight, it contains 20-60 wt % of rare earth-containing Y zeolite, 10-30 wt % of inorganic oxide binder and 30-50 wt % of natural mineral.

F3. The catalyst of Solution F1, wherein for the rare earth-containing Y zeolite, the ratio of the peak area for the pore-size distribution at 2-3 nanometers to the peak area of the total pores is greater than 0.12, preferably greater than 0.15, more preferably 0.18-0.26, and the ratio of the peak area for the pore-size distribution at 10-30 nanometers to the peak area of the total pores is greater than 0.22, preferably greater than 0.25, more preferably 0.27-0.32.

F4. The catalyst of Solution F1, wherein the rare earth-containing Y zeolite has a rare-earth content as rare-earth oxide of 1-20 wt %, preferably 8-15 wt %, a unit cell constant of 2.440-2.470 nm, a crystallinity of 30-60%.

F5. The catalyst of Solution F1, wherein the rare earth-containing Y zeolite is characterized in that the ratio of the intensity I1 of the peak at $2\theta=11.80.1°$ to the intensity I2 of the peak at $2\theta=12.3\pm0.1°$ in the X-ray diffraction pattern Is greater than 4.0, preferably greater than 4.3, more preferably 4.8-6.0.

F6. The catalyst of Solution F1, wherein the rare earth-containing Y zeolite is obtained by a process including the following steps:

(1) partially ammonium-exchanging of a NaY zeolite with an ammonium salt to remove 10-80% sodium ions, filtering, washing, and drying to obtain a NH4NaY zeolite;

(2) contacting the NH4NaY zeolite obtained in step (1) with a rare-earth salt solution or a mixed solution of rare-earth salt solution and ammonium salt, filtering, water washing, drying to obtain a rare earth-containing NaY zeolite;

(3) hydrothermally calcining the rare earth-containing NaY zeolite obtained in step (2) in an atmosphere condition wherein an external pressure is applied and water is externally added, for the atmosphere condition, the gauge pressure is 0.01 to 1 MPa and the atmosphere contains 1-100% water vapor.

F7. The catalyst of Solution F6, wherein in step (1) and in step (2) the ammonium salt is selected from ammonium chloride, ammonium nitrate, ammonium carbonate and ammonium bicarbonate or any mixture thereof; in step (2) the rare-earth salt solution is an aqueous chloride solution of rare earth ions containing one or more of lanthanum, cerium, praseodymium, and neodymium ions.

F8. The catalyst of Solution F6, wherein the contacting in step (2) is the exchanging at a slurry pH of 3.0-5.0, at the weight ratio of water/zeolite of 5-30, and at the exchanging temperature from room temperature to 100° C. for at least 0.3 hours.

F9. The catalyst of Solution F6, wherein in step (3) for the atmosphere condition, the gauge pressure is preferably 0.1 to 0.8 MPa, more preferably 0.3 to 0.6 MPa, the atmosphere contains 30% to 100% water vapor, preferably 60 to 100% water vapor; in step (3) the hydrothermal calcining is carried out at 300-800° C., preferably 400-600° C.

F10. The catalyst of Solution F1, wherein the natural mineral is at least one selected from kaolin, halloysite, montmorillonite, diatomite, attapulgite, sepiolite, keramite, hydrotalcite, bentonite and rectorite; the inorganic oxide binder is at least one selected from silica sol, alumina sol, peptized pseudo-boehmite, silica alumina sol and phosphorus-containing alumina sol.

G1. A cracking catalyst containing rare earth-containing Y zeolite, inorganic oxide binder, and natural mineral, characterized in that the rare-earth-containing Y zeolite has at least two mesopore pore-size distributions at 2-3 nanometers and at 3-4 nanometers, and its mesopore volume is greater than 0.03 cc/g.

G2. The cracking catalyst of Solution G1, based on the dry weight, containing 20-60 wt % of rare earth-containing Y zeolite, 10-30 wt % of inorganic oxide binder and 30-50 wt % of natural mineral.

G3. The cracking catalyst of Solution G1, wherein the mesopore volume is greater than 0.031 cc/g.

G4. The cracking catalyst of Solution G1, wherein the mesopore volume is 0.031 cc/g to 0.057 cc/g.

G5. The cracking catalyst of Solution G1, wherein the rare earth-containing Y zeolite is characterized in that the ratio of the intensity I1 of the peak at $2\theta=11.8\pm0.1°$ to the intensity I2 of the peak at $2\theta=12.3\pm0.1°$ in the X-ray diffraction pattern is $\geq4.0$, preferably 4.5-6.0.

G6. The cracking catalyst of Solution G1, wherein the rare earth-containing Y zeolite is obtained in the process I of hydrothermally calcining a rare earth-containing NaY zeolite in an atmosphere condition where an external pressure is applied and an acidic substance or alkaline substance-containing aqueous solution is externally added; or the rare earth-containing Y zeolite is obtained in the process II of contacting a rare earth-containing NaY zeolite with an alkaline substance to produce an alkaline substance-containing rare earth-containing NaY zeolite, and then hydrothermally calcining it in an atmosphere condition where an external pressure is applied and water is externally added; for the atmosphere condition, the gauge pressure is 0.01 to 1 MPa and the atmosphere contains 1-100% water vapor.

G7. The cracking catalyst of Solution G6, wherein the rare earth-containing NaY zeolite is obtained by contacting NaY zeolite with a rare-earth salt solution or a mixed solution of rare-earth salt solution and ammonium salt, and then filtering, water washing and drying.

G8. The cracking catalyst of Solution G6, wherein the rare-earth salt solution is an aqueous chloride solution containing one or more of lanthanum, cerium, praseodymium, and neodymium ions, the ammonium salt is selected from ammonium chloride, ammonium nitrate, ammonium carbonate and ammonium bicarbonate or any mixture thereof.

G9. The cracking catalyst of Solution G6, wherein the acidic substance is selected from ammonium chloride, ammonium sulfate, ammonium carbonate, ammonium bicarbonate, ammonium carbonate, ammonium phosphate, ammonium dihydrogen phosphate, diammonium phosphate, hydrochloric acid, sulfuric acid, nitric acid, and any mixture thereof.

G10. The cracking catalyst of Solution G6, wherein the alkaline substance includes one or more of ammonia water, buffer solution of ammonia water and ammonium chloride, sodium hydroxide, sodium carbonate, sodium bicarbonate and any mixture thereof.

G11. The cracking catalyst of Solution G6, wherein for the atmosphere condition, the gauge pressure is preferably 0.1 to 0.8 MPa, more preferably 0.3 to 0.6 MPa, the temperature of hydrothermal calcining is 300-800° C., preferably 400-600° C.

G12. The cracking catalyst of Solution G6, wherein the atmosphere condition contains 30 to 100% water vapor, preferably 60 to 100% water vapor.

G13. The cracking catalyst of Solution G1, wherein the inorganic oxide binder is at least one selected from silica sol, alumina sol, peptized pseudo-boehmite, silica alumina sol and phosphorus-containing alumina sol; the natural mineral is at least one selected from kaolin, halloysite, montmorillonite, diatomite, attapulgite, sepiolite, keramite, hydrotalcite, bentonite and rectorite.

H1. A rare earth-containing Y zeolite, having at least two mesopore pore-size distributions at 2-3 nanometers and 3-4 nanometers, wherein The mesopore volume of the zeolite is greater than 0.03 cc/g, and/or The zeolite has a ratio of the intensity I1 of the peak at $2\theta=11.8\pm0.1°$ to the intensity I2 of the peak at $2\theta=12.3\pm0.1°$ in the X-ray diffraction pattern of $\geq4.0$.

H2. The zeolite of Solution H1, wherein In the BJH pore-size distribution curve of the molecular sieve, the ratio of the peak area for the pore-size distribution at 2-3 nanometers to the peak area for the pore-size distribution at 3-4 nanometers is $\geq0.05$, preferably $\geq0.1$, more preferably 0.1 to 0.4.

H3. The zeolite according to any of the previous Solutions, which has a rare-earth content as rare-earth oxide of 2-18 wt %, preferably 8-15 wt %, a unit cell constant of 2.440-2.470 nm, and a crystallinity of 30-60%.

H4. The zeolite according to any of the previous Solutions, wherein the ratio of the intensity I1 of the peak at $2\theta=11.8\pm0.1°$ to the intensity I2 of the peak at $2\theta=12.3\pm0.1°$ in the X-ray diffraction pattern is $\geq4.0$, preferably 4.5-6.0, for example $\geq4.8$, or 4.9-7.0.

H5. The zeolite according to any of the previous Solutions, wherein in the BJH pore-size distribution curve of the molecular sieve, a mesopore pore-size distribution at 10-30 nanometers is present, wherein the ratio of the peak area for the pore-size distribution at 2-3 nanometers to the peak area of the total pores is greater than 0.1, for example, greater than 0.12, greater than 0.15, more preferably 0.18-0.26.

the ratio of the peak area for the pore-size distribution at 10-30 nanometers to the peak area of the total pores is greater than 0.2, for example, greater than 0.22, greater than 0.25, more preferably 0.27-0.32.

H6. The zeolite according to any of the previous Solutions, wherein the mesopore volume of the molecular sieve is 0.031 cc/g to 0.057 cc/g.

H7. A process for preparing the rare earth-containing Y zeolite according to any of solutions H1-H6, wherein the rare earth-containing Y zeolite is obtained by hydrothermally calcining a rare earth-containing NaY zeolite in an atmosphere condition where an external pressure is applied and an acidic substance or alkaline substance-containing aqueous solution is externally added; or the rare earth-containing Y zeolite is obtained by contacting a rare earth-containing NaY zeolite with an acidic substance or an alkaline substance to produce an acidic substance or alkaline substance-containing rare earth-containing NaY zeolite, and then hydrothermally calcining it in an atmosphere condition where an external pressure is applied and water is externally added; for the atmosphere condition, the gauge pressure is 0.01 to 1.0 MPa, for example 0.1 to 0.8 MPa, preferably 0.3 to 0.6 MPa, and the atmosphere contains 1-100% water vapor, for example 30% to 100% water vapor, preferably 60 to 100% water vapor.

H8. The process of Solution H7, wherein the rare earth-containing NaY zeolite is obtained from step A of contacting a NaY zeolite with a rare-earth salt solution or a mixed solution of rare-earth salt solution and ammonium salt.

H9. The process of Solution H7, wherein the rare earth-containing NaY zeolite is obtained through the following steps (1) and (2):

(1) partially ammonium-exchanging of a NaY zeolite with an ammonium salt to remove 10-80% sodium ions, filtering, washing, and drying to obtain a NH4NaY zeolite;

(2) contacting the NH4NaY zeolite obtained in step (1) with a rare-earth salt solution or a mixed solution of rare-earth salt solution and ammonium salt, and then filtering, water washing and drying to produce the rare earth-containing NaY zeolite.

H10. The process according to any of Solutions H7-H9, wherein

The rare-earth salt solution is selected from an aqueous chloride solution containing one or more of lanthanum, cerium, praseodymium, and neodymium ions.

H11. The process according to any of Solutions H7-H10, wherein

The ammonium salt is selected from ammonium chloride, ammonium nitrate, ammonium carbonate and ammonium bicarbonate or any mixture thereof.

H12. The process according to any of Solutions H7-H11, wherein step A or step (2) is carried out at pH=3.0 to 5.0, at the weight ratio of water/zeolite of 5 to 30, and at room temperature to 100° C., optionally, the exchanging time is at least 0.3 hours.

H13. The process according to any of Solutions H7-H12, wherein for the atmosphere condition, the gauge pressure is preferably 0.1 to 0.8 MPa, more preferably 0.3 to 0.6 MPa, and the atmosphere contains 30% to 100% water vapor, preferably 60 to 100% water vapor.

H14. The process according to any of Solutions H7-H13, wherein the step of hydrothermal calcining is performed at 300-800° C., preferably 400-600° C.

H15. The process according to any of solutions H7-H14, wherein the atmosphere condition of the water is an atmosphere condition of an aqueous solution containing an acidic substance or an alkaline substance, the acidic substance is selected from ammonium chloride, ammonium sulfate, ammonium carbonate, ammonium bicarbonate, ammonium phosphate, ammonium dihydrogen phosphate, diammonium phosphate, hydrochloric acid, sulfuric acid, nitric acid, and any mixture thereof; the alkaline substance includes one or more of ammonia water, buffer solution of ammonia water and ammonium chloride, sodium hydroxide, sodium metalluminate, sodium carbonate, sodium bicarbonate, or any mixture thereof.

H16. The process according to any of solutions H7-H15, wherein the mass concentration of the aqueous solution containing the acidic substance or the alkaline substance is 0.1-20%.

H17. A catalytic cracking catalyst, wherein the catalytic cracking catalyst contains 20-60 wt % of the rare earth-containing Y zeolite according to any of solutions H1-H6, 10-30 wt % of inorganic oxide binder and 30-50 wt % of natural mineral.

H18. The catalytic cracking catalyst according to solution H17, wherein said natural mineral is at least one selected from kaolin, halloysite, montmorillonite, diatomite, attapulgite, sepiolite, keramite, hydrotalcite, bentonite and rectorite, and the inorganic oxide binder is at least one selected from silica sol, alumina sol, peptized pseudo-boehmite, silica alumina sol and phosphorus-containing alumina sol.

M1. A rare earth-containing Y zeolite, having at least two mesopore pore-size distributions at 2-3 nanometers and 3-4 nanometers.

M2. The zeolite of solution M1, wherein in the BJH pore-size distribution curve of the molecular sieve, the ratio of the peak area for the pore-size distribution at 2-3 nanometers to the peak area for the pore-size distribution at 3-4 nanometers is ≥0.05, preferably ≥0.1, more preferably 0.1 to 0.4.

M3. The zeolite according to any of the previous Solutions, which has a rare-earth content as rare-earth oxide of 2-18 wt %, preferably 8-15 wt %, a unit cell constant of 2.440-2.470 nm, and a crystallinity of 30-60%.

M4. The zeolite according to any of the previous Solutions, wherein the ratio of the intensity I1 of the peak at $2\theta=11.8\pm0.1°$ to the intensity I2 of the peak at $2\theta=12.3\pm0.1°$ in the X-ray diffraction pattern is 4.0, preferably 4.5-6.0, for example ≥4.8, or 4.9-7.0.

M5. The zeolite according to any of the previous Solutions, wherein in the BJH pore-size distribution curve of the molecular sieve, a mesopore pore-size distribution at 10-30 nanometers is present, wherein the ratio of the peak area for the pore-size distribution at 2-3 nanometers to the peak area of the total pores is greater than 0.1, for example, greater than 0.12, greater than 0.15, more preferably 0.18-0.26.

the ratio of the peak area for the pore-size distribution at 10-30 nanometers to the peak area of the total pores is greater than 0.2, for example, greater than 0.22, greater than 0.25, more preferably 0.27-0.32.

M6. The zeolite according to any of the previous Solutions, wherein the mesopore volume of the molecular sieve is greater than 0.03 cc/g, for example, 0.031 cc/g to 0.037 cc/g or 0.031 cc/g to 0.057 cc/g.

M7. A process for preparing the rare earth-containing Y zeolites according to any of solutions M1-M6, which comprises a step of hydrothermally calcining the rare earth-containing NaY zeolite in an atmosphere condition where an external pressure is applied and water is externally added, for the atmosphere condition, the gauge pressure is 0.01-1.0 MPa, for example 0.1-0.8 MPa, preferably 0.3-0.6 MPa, and the atmosphere contains 1-100% water vapor, for example 30%-100% water vapor, preferably 60-100% water vapor.

M8. The process according to solution M7, wherein said rare earth-containing NaY zeolite is obtained from step A of contacting a NaY zeolite with a rare-earth salt solution or a mixed solution of rare-earth salt solution and ammonium salt.

M9. The process according to Solution M7, wherein the rare earth-containing NaY zeolite is obtained through the following steps (1) and (2):

(1) partially ammonium-exchanging of a NaY zeolite with an ammonium salt to remove 10-80% sodium ions, filtering, washing, and drying to obtain a NH4NaY zeolite;

(2) contacting the NH4NaY zeolite obtained in step (1) with a rare-earth salt solution or a mixed solution of rare-earth salt solution and ammonium salt, and then filtering, water washing and drying to produce the rare earth-containing NaY zeolite.

M10. The process according to any of solutions M7-M9, wherein the atmosphere condition of the water is an atmosphere condition of pure water or an atmosphere condition of an aqueous solution containing an acidic substance or an alkaline substance.

M11. The process according to any of Solutions M7-M10, wherein the rare-earth salt solution is an aqueous chloride solution containing one or more of lanthanum, cerium, praseodymium, and neodymium ions; The ammonium salt is selected from ammonium chloride, ammonium nitrate, ammonium carbonate and ammonium bicarbonate or any mixture thereof.

M12. The process according to any of Solutions M7-M11, wherein step A or step (2) is carried out at pH=3.0 to 5.0, at the weight ratio of water/zeolite of 5 to 30, and at room temperature to 100° C., optionally, the exchanging time is at least 0.3 hours.

M13. The process according to any of Solutions M7-M12, wherein for the atmosphere condition, the gauge pressure is preferably 0.1 to 0.8 MPa, more preferably 0.3 to 0.6 MPa, and the atmosphere contains 30% to 100% water vapor, preferably 60 to 100% water vapor.

M14. The process according to any of Solutions M7-M13, wherein the step of hydrothermal calcining is performed at 300-800° C., preferably 400-600° C.

M15. The process according to any of Solutions M7-M14, wherein the atmosphere condition of the water is an atmosphere condition of an aqueous solution containing an acidic substance or an alkaline substance, the acidic substance is selected from ammonium chloride, ammonium sulfate, ammonium carbonate, ammonium bicarbonate, ammonium phosphate, ammonium dihydrogen phosphate, diammonium phosphate, hydrochloric acid, sulfuric acid, nitric acid, and any mixture thereof, the alkaline substance includes one or more of ammonia water, buffer solution of ammonia water and ammonium chloride, sodium hydroxide, sodium metalluminate, sodium carbonate, sodium bicarbonate, or any mixture thereof.

M16. The process according to any of solutions M10-M15, wherein the mass concentration of the aqueous solution containing the acidic substance or the alkaline substance is 0.1-20%.

M17. A catalytic cracking catalyst, wherein the catalytic cracking catalyst contains 20-60 wt % of the rare earth-containing Y zeolite according to any of solutions M1-M6, 10-30 wt % of inorganic oxide binder and 30-50 wt % of natural mineral.

M18. The catalytic cracking catalyst according to solution M17, wherein said natural mineral is at least one selected from kaolin, halloysite, montmorillonite, diatomite, attapulgite, sepiolite, keramite, hydrotalcite, bentonite and rectorite, and the inorganic oxide binder is at least one selected from silica sol, alumina sol, peptized pseudo-boehmite, silica alumina sol and phosphorus-containing alumina sol.

The process for preparing the rare earth-containing Y zeolite provided by the present invention can promote the migration of rare-earth ions from super cages to sodalite cages and form special pore-size distribution characteristics. The process is simple and easy to operate, and the mesopores of Y zeolites are significantly increased. It can form a certain degree of zeolite mesopores, improve the accessibility, and increase the utilization rate of active centers. This process is a low-cost and low-emission new way to expand the pores of the zeolite crystals.

As shown in the examples provided later, the process for preparing the rare earth-containing Y zeolite provided by the present invention can provide the rare-earth-containing Y-type zeolite with unique pore size distribution characteristics, that is, there are at least two mesoporous nano-pore size distributions at 2-3 nanometers and at 3-4 nanometers, its mesopore volume is greater than 0.03 cc/g, e.g., 0.031 cc/g to 0.037 cc/g, even up to 0.057 cc/g, and a hysteresis loop having a larger area can be provided, its rare earth content is 8-15 wt % in terms of rare earth oxide, the unit cell constant is 2.440 to 2.470 nm, and the crystallinity is 30 to 60%.

The rare earth-containing Y-zeolite provided by the present invention has higher hydrothermal structural stability and higher cracking activity stability, reduced coke selectivity, and has broad application prospects in the field of heavy oil catalysis.

EXAMPLES

The present invention will be further described below in conjunction with specific examples, but the present invention is not limited thereby.

In each of examples and comparative examples, the unit cell constant and the crystallinity of the RE-containing Y zeolite product of the present invention were determined by X-ray diffraction (XRD); the XRF analysis of the chemical composition of the product was performed on a 3013 type X-ray fluorescence spectrometer of Rigaku Industrial Corporation, Japan; and the BJH pore-size distribution curve of the product was obtained by low-temperature nitrogen absorption-desorption measurement.

Example A1

Example A1 illustrated the preparation of the RE-containing Y zeolite of the present invention, and the RE-containing Y zeolite could be used in preparing the catalytic cracking catalyst.

100 g of a NaY zeolite (Changling Division of Sinopec Catalyst Company, Loss on Ignition: 74.1 wt %, crystallinity: 89.3%, the same below) and 1800 g of deionized water were vigorously mixed and stirred, and 20 mL of a rare earth chloride salt solution with a concentration of 357 g $RE_2O_3$/L and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an external pressure was applied and water was added, then the pressurized hydrothermal calcining treatment was performed at 500° C. under the gauge pressure of 0.3 MPa in the 100% water vapor atmosphere for 2.0 hours to obtain a sample of RE-containing Y zeolite, named as PAY-1.

In the chemical composition of PAY-1, the content of rare earth oxide was 10.1 wt %.

FIG. 1 is a pore size distribution curve of PAY-1 obtained from the BJH model calculation.

As can be seen from the pore size distribution curve, at least 2 kinds of mesoporous pore size distributions exist, which are respectively at 2-3 nm and 3-4 nm; the peak area ratio of the two is 0.15.

Figure 2:
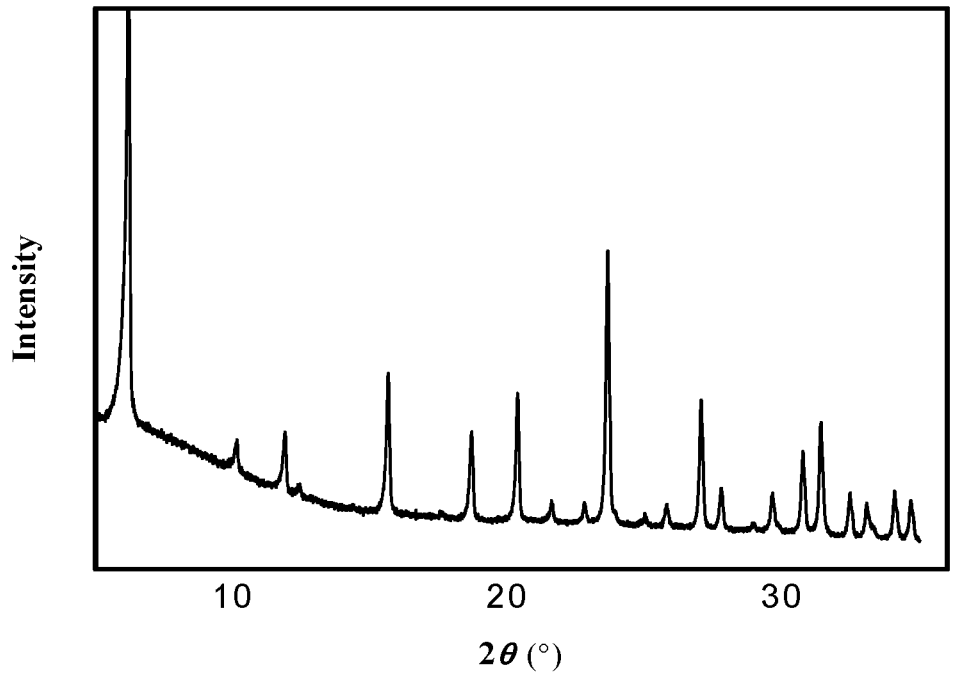
FIG. 2 is an X-ray diffraction (XRD) spectrum of PAY-1.

FIG. 2 is an XRD spectrum of PAY-1, which shows that the PAY-1 zeolite has a pure-phase FAU crystal structure and no impure crystal is formed.

The XRD spectrum showed the ratio of the intensity I1 of the peak at $2\theta=11.8\pm0.1°$ to the intensity I2 of the peak at $2\theta=12.3\pm0.1°$ was 5.6.

The unit cell and crystallinity data were shown in the tables below.

Comparative Example A1

Comparative Example A1 illustrated a comparative sample of a RE-containing Y zeolite obtained by hydrothermally calcining at normal pressure.

It was identical to the process of Example A1 except for the calcining conditions: normal pressure (gauge pressure: 0 MPa).

The obtained RE-containing Y zeolite comparative sample was named as DAY-1.

In the chemical composition of DAY-1, the content of rare earth oxide was 10.1 wt %.

Figure 3:
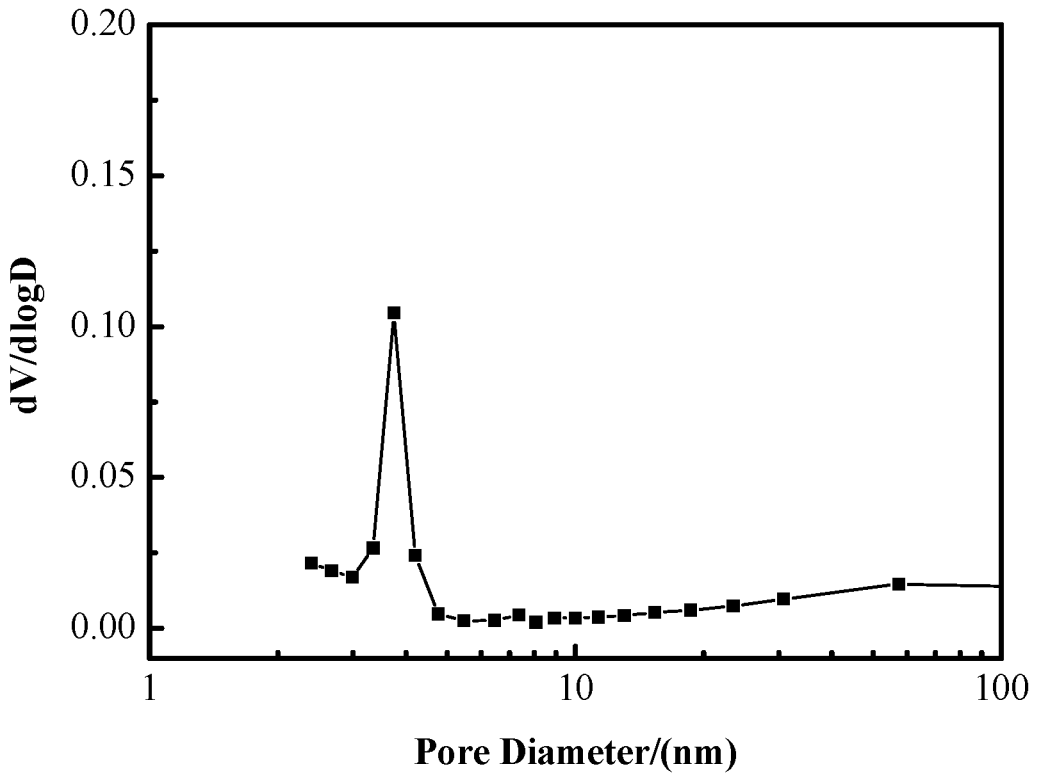
FIG. 3 is a pore size distribution curve of DAY-1 obtained from the BJH model calculation.

FIG. 3 showed the pore size distribution curve of DAY-1 obtained according to the BJH model calculation.

It could be seen from the pore size distribution curve that there was mainly one mesoporous pore size distribution, that is, there was one mesoporous pore size distribution at 3-4 nanometers, but there was no other mesoporous pore size distribution at 2-3 nanometers.

Therefore, in the BJH pore-size distribution curve, the ratio of the peak area for the pore-size distribution at 2-3 nanometers to the peak area for the pore-size distribution at 3-4 nanometers was 0.

DAY-1 had an XRD pattern, which had the similar characteristics as the XRD pattern of PAY-1. The XRD spectrum showed the ratio of the intensity I1 of the peak at $2\theta=11.8\pm0.1°$ to the intensity I2 of the peak at $2\theta=12.3\pm0.1°$ was 3.4.

The unit cell and crystallinity data were shown in the tables below.

Example A2

Example A2 illustrated the preparation of the RE-containing Y zeolite of the present invention, and the RE-containing Y zeolite could be used in preparing the catalytic cracking catalyst.

100 g of a NaY zeolite and 1000 g of deionized water were vigorously mixed and stirred, and 16 mL of a rare earth chloride salt solution with a concentration of 357 g RE2O3/L and 8 g of an ammonium chloride solid were added. The mixture was uniformly stirred and warmed to 60° C. The slurry was adjusted with a dilute hydrochloric acid to a pH of 4.0, and stirred for 1.5 hour at the constant temperature.

After filtering, water washing and drying, an external pressure was applied and water was added, then the pressurized hydrothermal calcining treatment was performed at 430° C. under the gauge pressure of 0.8 MPa in the 50% water vapor atmosphere for 0.5 hours to obtain a sample of RE-containing Y zeolite, named as PAY-2.

In the chemical composition of PAY-2, the content of rare earth oxide was 8.2 wt %.

The BJH pore size distribution curve and the XRD spectrum of PAY-2 had similar characteristics to the BJH pore size distribution curve and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.3.

The XRD spectrum showed the ratio of the intensity I1 of the peak at $2\theta=11.8\pm0.1°$ to the intensity I2 of the peak at $2\theta=12.3\pm0.1°$ was 4.3.

The unit cell and crystallinity data were shown in the tables below.

Comparative Example A2

Comparative Example A2 illustrated a comparative sample of a RE-containing Y zeolite obtained by hydrothermally calcining at normal pressure.

It was identical to the process of Example A2 except for the calcining conditions: normal pressure (gauge pressure: 0 MPa).

The obtained RE-containing Y zeolite comparative sample was named as DAY-2.

In the chemical composition of DAY-2, the content of rare earth oxide was 8.2 wt %.

The BJH pore size distribution curve and the XRD spectrum of DAY-2 had similar characteristics to the BJH pore size distribution curve of DAY-1 and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.

The XRD spectrum showed the ratio of the intensity I1 of the peak at $2\theta=11.8\pm0.1°$ to the intensity I2 of the peak at $2\theta=12.3\pm0.1°$ was 2.8.

The unit cell and crystallinity data were shown in the tables below.

Example A3

Example A3 illustrated the preparation of the RE-containing Y zeolite of the present invention, and the RE-containing Y zeolite could be used in preparing the catalytic cracking catalyst.

100 g of a NaY zeolite and 2200 g of deionized water were vigorously mixed and stirred, and 24 mL of a rare earth chloride salt solution with a concentration of 357 g RE2O3/L was added. The mixture was uniformly stirred and warmed to 70° C. The slurry was adjusted with a dilute hydrochloric acid to a pH of 3.5, and stirred for 1.0 hour at the constant temperature.

After filtering, water washing and drying, an external pressure was applied and water was added, then the pressurized hydrothermal calcining treatment was performed at 520° C. under the gauge pressure of 0.4 MPa in the 100% water vapor atmosphere for 1.5 hours to obtain a sample of RE-containing Y zeolite, named as PAY-3.

In the chemical composition of PAY-3, the content of rare earth oxide was 11.4 wt %.

The BJH pore size distribution curve and the XRD spectrum of PAY-3 had similar characteristics to the BJH pore size distribution curve and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.25.

The XRD spectrum showed the ratio of the intensity I1 of the peak at $2\theta=11.8\pm0.1°$ to the intensity I2 of the peak at $2\theta=12.3\pm0.1°$ was 5.2.

The unit cell and crystallinity data were shown in the tables below.

Comparative Example A3

Comparative Example A3 illustrated a comparative sample of a RE-containing Y zeolite obtained by hydrothermally calcining at normal pressure.

It was identical to the process of Example A3 except for the calcining conditions: normal pressure (gauge pressure: 0 MPa).

The obtained RE-containing Y zeolite comparative sample was named as DAY-3.

In the chemical composition of DAY-3, the content of rare earth oxide was 11.4 wt %.

The BJH pore size distribution curve and the XRD spectrum of DAY-3 had similar characteristics to the BJH pore size distribution curve of DAY-1 and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.

The XRD spectrum showed the ratio of the intensity I1 of the peak at $2\theta=11.8\pm0.1°$ to the intensity I2 of the peak at $2\theta=12.3\pm0.1°$ was 3.7.

The unit cell and crystallinity data were shown in the tables below.

Example A4

Example A4 illustrated the preparation of the RE-containing Y zeolite of the present invention, and the RE-containing Y zeolite could be used in preparing the catalytic cracking catalyst.

100 g of a NaY zeolite and 2800 g of deionized water were vigorously mixed and stirred, and 28 mL of a rare earth chloride salt solution with a concentration of 357 g RE2O3/L was added. The mixture was uniformly stirred and warmed to 80° C. The slurry was adjusted with a dilute hydrochloric acid to a pH of 3.8, and stirred for 1.0 hour at the constant temperature.

After filtering, water washing and drying, an external pressure was applied and water was added, then the pressurized hydrothermal calcining treatment was performed at 580° C. under the gauge pressure of 0.5 MPa in the 100% water vapor atmosphere for 2.0 hours to obtain a sample of RE-containing Y zeolite, named as PAY-4.

In the chemical composition of PAY-4, the content of rare earth oxide was 12.6 wt %.

The BJH pore size distribution curve and the XRD spectrum of PAY-4 had similar characteristics to the BJH pore size distribution curve and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.22.

The XRD spectrum showed the ratio of the intensity I1 of the peak at $2\theta=11.8\pm0.1°$ to the intensity I2 of the peak at $2\theta=12.3\pm0.1°$ was 4.9.

The unit cell and crystallinity data were shown in the tables below.

Comparative Example A4

Comparative Example A4 illustrated a comparative sample of a RE-containing Y zeolite obtained by hydrothermally calcining at normal pressure.

It was identical to the process of Example A4 except for the calcining conditions: normal pressure (gauge pressure: 0 MPa).

The obtained RE-containing Y zeolite comparative sample was named as DAY-4.

In the chemical composition of DAY-4, the content of rare earth oxide was 12.6 wt %.

The BJH pore size distribution curve and the XRD spectrum of DAY-4 had similar characteristics to the BJH pore size distribution curve of DAY-1 and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.

The XRD spectrum showed the ratio of the intensity I1 of the peak at $2\theta=11.8\pm0.1°$ to the intensity I2 of the peak at $2\theta=12.3\pm0.1°$ was 3.9.

The unit cell and crystallinity data were shown in the tables below.

Example A5

Example A5 illustrated the preparation of the RE-containing Y zeolite of the present invention, and the RE-containing Y zeolite could be used in preparing the catalytic cracking catalyst.

100 g of a NaY zeolite and 2000 g of deionized water were vigorously mixed and stirred, and 32 mL of a rare earth chloride salt solution with a concentration of 357 g RE2O3/L was added. The mixture was uniformly stirred and warmed to 70° C. The slurry was adjusted with a dilute hydrochloric acid to a pH of 4.0, and stirred for 1.0 hour at the constant temperature.

After filtering, water washing and drying, an external pressure was applied and water was added, then the pressurized hydrothermal calcining treatment was performed at 550° C. under the gauge pressure of 0.4 MPa in the 100% water vapor atmosphere for 1.5 hours to obtain a sample of RE-containing Y zeolit, named as PAY-5.

In the chemical composition of PAY-5, the content of rare earth oxide was 13.4 wt %.

The BJH pore size distribution curve and the XRD spectrum of PAY-5 had similar characteristics to the BJH pore size distribution curve and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.23.

The XRD spectrum showed the ratio of the intensity I1 of the peak at $2\theta=11.8\pm0.1°$ to the intensity I2 of the peak at $2\theta=12.3\pm0.1°$ was 5.1.

The unit cell and crystallinity data were shown in the tables below.

Comparative Example A5

Comparative Example A5 illustrated a comparative sample of a RE-containing Y zeolite obtained by hydrothermally calcining at normal pressure.

It was identical to the process of Example A5 except for the calcining conditions: normal pressure (gauge pressure: 0 MPa).

The obtained RE-containing Y zeolite comparative sample was named as DAY-5.

In the chemical composition of DAY-5, the content of rare earth oxide was 13.4 wt %.

The BJH pore size distribution curve and the XRD spectrum of DAY-5 had similar characteristics to the BJH pore size distribution curve of DAY-1 and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.

The XRD spectrum showed the ratio of the intensity I1 of the peak at $2\theta=11.8\pm0.1°$ to the intensity I2 of the peak at $2\theta=12.3\pm0.1°$ was 4.3.

The unit cell and crystallinity data were shown in the tables below.

Example A6

Example A6 illustrated the preparation of the RE-containing Y zeolite of the present invention, and the RE-containing Y zeolite could be used in preparing the catalytic cracking catalyst.

100 g of a NaY zeolite and 1800 g of deionized water were vigorously mixed and stirred, and 20 mL of a rare earth chloride salt solution with a concentration of 357 g RE2O3/L and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an external pressure was applied and water was added, then the pressurized hydrothermal calcining treatment was performed at 430° C. under the gauge pressure of 0.6 MPa in the 100% water vapor atmosphere for 2.0 hours to obtain a sample of RE-containing Y zeolite, named as PAY-6.

In the chemical composition of PAY-6, the content of rare earth oxide was 10.0 wt %.

The BJH pore size distribution curve and the XRD spectrum of PAY-6 had similar characteristics to the BJH pore size distribution curve and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.20.

The XRD spectrum showed the ratio of the intensity I1 of the peak at $2\theta=11.8\pm0.1°$ to the intensity I2 of the peak at $2\theta=12.3\pm0.1°$ was 4.7.

The unit cell and crystallinity data were shown in the tables below.

Comparative Example A6

Comparative Example A6 illustrated a comparative sample of a RE-containing Y zeolite obtained by hydrothermally calcining at normal pressure.

It was identical to the process of Example A6 except for the calcining conditions: normal pressure (gauge pressure: 0 MPa).

The obtained RE-containing Y zeolite comparative sample was named as DAY-6.

In the chemical composition of DAY-6, the content of rare earth oxide was 10.0 wt %.

The BJH pore size distribution curve and the XRD spectrum of DAY-6 had similar characteristics to the BJH pore size distribution curve of DAY-1 and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.

The XRD spectrum showed the ratio of the intensity I1 of the peak at $2\theta=11.8\pm0.1°$ to the intensity I2 of the peak at $2\theta=12.3\pm0.1°$ was 2.7.

The unit cell and crystallinity data were shown in the tables below.

Example A7

Example A7 illustrated the preparation of the RE-containing Y zeolite of the present invention, and the RE-containing Y zeolite could be used in preparing the catalytic cracking catalyst.

100 g of a NaY zeolite and 1800 g of deionized water were vigorously mixed and stirred, and 20 mL of a rare earth chloride salt solution with a concentration of 357 g RE2O3/L and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an external pressure was applied and water was added, then the pressurized hydrothermal calcining treatment was performed at 400° C. under the gauge pressure of 0.8 MPa in the 100% water vapor atmosphere for 2.0 hours to obtain a sample of RE-containing Y zeolite, named as PAY-7.

In the chemical composition of PAY-7, the content of rare earth oxide was 9.8 wt %.

The BJH pore size distribution curve and the XRD spectrum of PAY-7 had similar characteristics to the BJH pore size distribution curve and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.11.

The XRD spectrum showed the ratio of the intensity I1 of the peak at $2\theta=11.8\pm0.1°$ to the intensity I2 of the peak at $2\theta=12.3\pm0.1°$ was 4.1.

The unit cell and crystallinity data were shown in the tables below.

Comparative Example A7

Comparative Example A7 illustrated a comparative sample of a RE-containing Y zeolite obtained by hydrothermally calcining at normal pressure.

It was identical to the process of Example A3 except for the calcining conditions: normal pressure (gauge pressure: 0 MPa).

The obtained RE-containing Y zeolite comparative sample was named as DAY-7.

In the chemical composition of DAY-7, the content of rare earth oxide was 9.8 wt %.

The BJH pore size distribution curve and the XRD spectrum of DAY-7 had similar characteristics to the BJH pore size distribution curve of DAY-1 and the XRD spectrum of PAY-1 respectively.

In the BJH pore-size distribution curve, the ratio of the peak area for the pore-size distribution at 2-3 nanometers to the peak area for the pore-size distribution at 3-4 nanometers was 0.

The XRD spectrum showed the ratio of the intensity I1 of the peak at $2\theta=11.8\pm0.1°$ to the intensity I2 of the peak at $2\theta=12.3\pm0.1°$ was 3.2.

The unit cell and crystallinity data were shown in the tables below.

Test Example A1

Test example D1 illustrated the hydrothermal stability test of the RE-containing Y zeolite sample(s).

The RE-containing Y zeolite samples PAY-1 to PAY-7 of Example A1 to Example A7, and the comparative samples DAY-1 to DAY-7 of Comparative Examples D1 to Comparative Example D7 were mixed and exchanged with ammonium chloride solution respectively to reduce the Na2O % to less than 0.3 wt %, filtered and dried to obtain fresh samples.

Fresh sample(s) were hydrothermally aged at 800° C. under 100% water vapor for 17 hours to obtain the aged sample(s).

The unit cell and crystallinity data of fresh samples and aged samples were shown in the tables below.

100 g of a NaY zeolite and 1800 g of deionized water were vigorously mixed and stirred, and 10 g of an ammonium chloride solid was added. The mixture was uniformly stirred and warmed to 70° C., and stirred for 2.0 hour at the constant temperature. After filtering, water washing and drying, 20 mL of a rare earth chloride salt solution with a concentration of 357 g RE2O3/L and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an external pressure was applied and water was added, then the pressurized hydrothermal calcining treatment was performed at 500° C. under the gauge pressure of 0.3 MPa in the 100% water vapor atmosphere for 2.0 hours to obtain a sample of RE-containing Y zeolite, named as PDY-1.

In the chemical composition of PDY-1, the content of rare earth oxide was 10.1 wt %.

Figure 4:
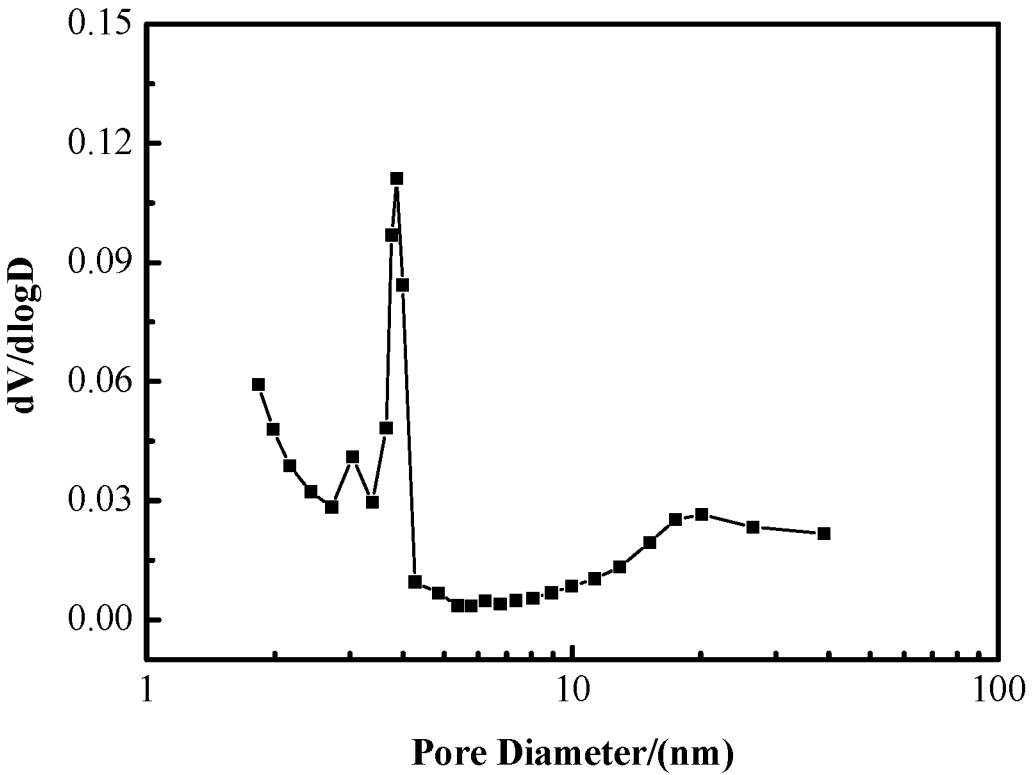
FIG. 4 is a pore size distribution curve of PDY-1 obtained from the BJH model calculation.

FIG. 4 showed the pore size distribution curve of PDY-1 obtained according to the BJH model calculation. There were at least three mesopore pore-size distributions, respectively, three prominent mesopore distributions at 2-3 nm, 3-4 nm, and 10-30 nm.

For PDY-1, the ratio of the peak area for the pore-size distribution at 2-3 nanometers to the peak area of the total pores was 0.25, and the ratio of the peak area for the pore-size distribution at 10-30 nanometers to the peak area of the total pores was 0.3.

PDY-1 had an XRD pattern, which had the similar characteristics as the XRD pattern of PAY-1. For PDY-1, the XRD spectrum showed the ratio of the intensity I1 of the peak at $2\theta=11.8\pm0.1°$ to the intensity I2 of the peak at $2\theta=12.3\pm0.1°$ was 5.8.

The unit cell and crystallinity data were shown in the tables below.

| | Fresh Samples | | Aged Samples | | | Fresh Samples | | Aged Samples | |
|---|---|---|---|---|---|---|---|---|---|
| Samples | Unit Cell, nm | Crystallinity/ %(w) | Unit Cell, nm | Crystallinity/ %(w) | Samples | Unit Cell, nm | Crystallinity/ %(w) | Unit Cell, nm | Crystallinity/ %(w) |
| PAY-1 | 2.465 | 54.2 | 2.435 | 22.4 | DAY-1 | 2.464 | 42.6 | 2.429 | 16.3 |
| PAY-2 | 2.464 | 48.1 | 2.431 | 19.7 | DAY-2 | 2.463 | 43.7 | 2.428 | 15.9 |
| PAY-3 | 2.464 | 47.6 | 2.433 | 20.1 | DAY-3 | 2.463 | 41.7 | 2.431 | 18.7 |
| PAY-4 | 2.464 | 45.1 | 2.434 | 20.5 | DAY-4 | 2.462 | 40.9 | 2.431 | 18.3 |
| PAY-5 | 2.464 | 44.2 | 2.433 | 20.7 | DAY-5 | 2.463 | 39.6 | 2.431 | 17.8 |
| PAY-6 | 2.465 | 52.7 | 2.431 | 19.2 | DAY-6 | 2.463 | 43.2 | 2.428 | 17.8 |
| PAY-7 | 2.465 | 54.8 | 2.434 | 19 | DAY-7 | 2.462 | 39.9 | 2.431 | 16.9 |

The rare earth-containing Y zeolites adopted by the present invention still had higher crystallinity after being hydrothermally aged for 17 hours at 800° C. in the 100% water vapor, and the crystallinity was obviously higher than that of the comparative sample, which showed that compared with calcining at the normal-pressure in the water vapor, the rare earth-containing Y-Zeolite, after being treated at an increased pressure in the water vapor condition had higher hydrothermal stability, and the hydrothermal stability was obviously improved.

Example D1

Example D1 illustrated the preparation of the RE-containing Y zeolite of the present invention, and the RE-containing Y zeolite could be used in preparing the catalytic cracking catalyst.

Comparative Example D1

Comparative Example D1 illustrated a comparative sample of RE-containing Y zeolite obtained by partial ammonium exchanging and calcining at atmospheric pressure.

It was identical to the process of Example D1 except for the calcining conditions: normal pressure (gauge pressure: 0 MPa).

The obtained RE-containing Y zeolite comparative sample was named as DDY-1.

In the chemical composition of DDY-1, the content of rare earth oxide was 10.1 wt/o.

Figure 5:
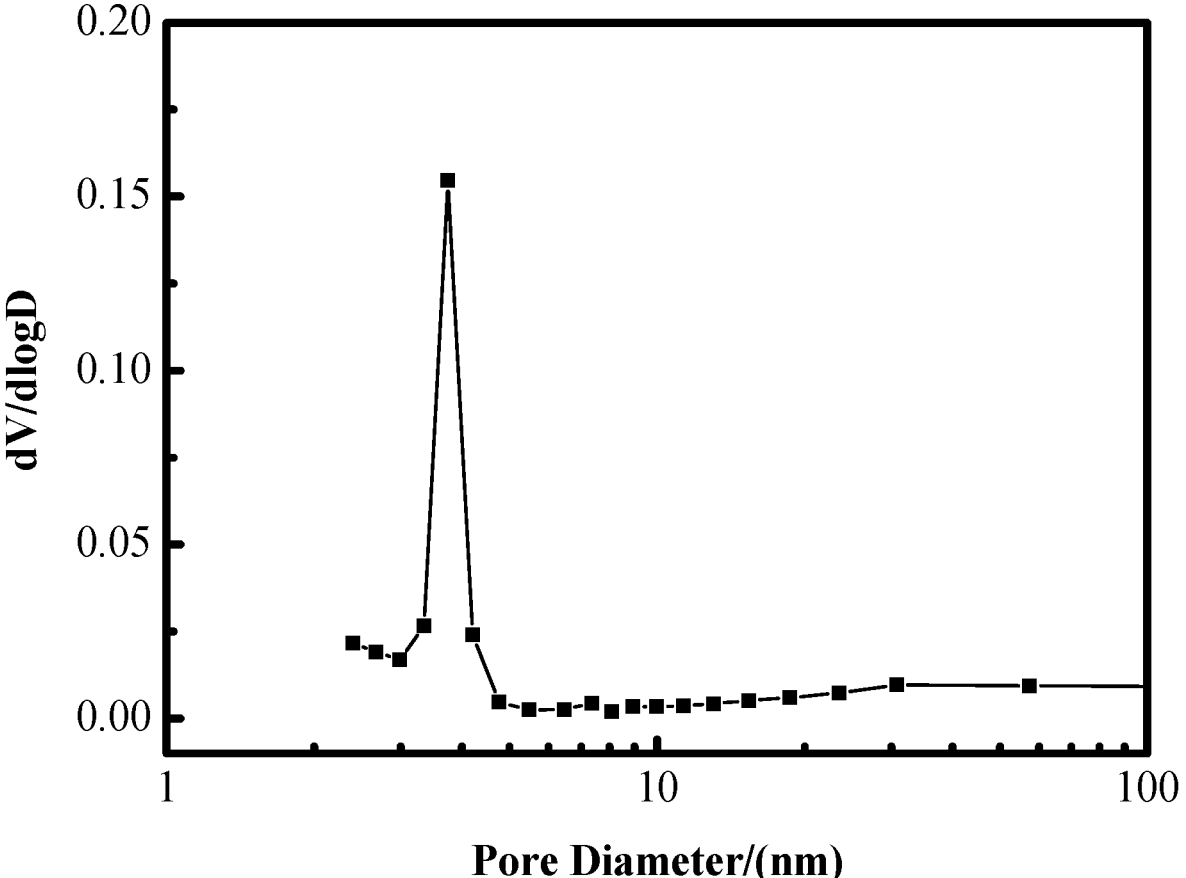
FIG. 5 is a pore size distribution curve of DDY-1 obtained from the BJH model calculation.

FIG. 5 showed the pore size distribution curve of DDY-1 obtained according to the BJH model calculation.

It could be seen from the pore size distribution curve that there was mainly one mesoporous pore size distribution, that is, there was one mesoporous pore size distribution at 3-4 nanometers, but there was no other mesoporous pore-size distribution at 2-3 nanometers and 10-30 nanometers. For DDY-1, the ratio of the peak area for the pore-size distribution at 2-3 nanometers to the peak area of the total pores was 0, and the ratio of the peak area for the pore-size distribution at 10-30 nanometers to the peak area of the total pores was 0.

DDY-1 had an XRD pattern, which had the similar characteristics as the XRD pattern of PAY-1. For DDY-1, the XRD spectrum showed the ratio of the intensity I1 of the peak at $2\theta=11.8\pm0.1$ to the intensity I2 of the peak at $2\theta=12.3\pm0.10$ was 3.5.

The unit cell and crystallinity data were shown in the tables below.

Example D2

Example D2 illustrated the preparation of the RE-containing Y zeolite of the present invention, and the RE-containing Y zeolite could be used in preparing the catalytic cracking catalyst.

100 g of a NaY zeolite and 1000 g of deionized water were vigorously mixed and stirred, and 5 g of an ammonium sulfate solid was added. The mixture was uniformly stirred and warmed to 80° C., and stirred for 2.0 hour at the constant temperature. After filtering, water washing and drying, 16 mL of a rare earth chloride salt solution with a concentration of 357 g RE2O3/L and 8 g of an ammonium chloride solid were added. The mixture was uniformly stirred and warmed to 60° C. The slurry was adjusted with a dilute hydrochloric acid to a pH of 4.0, and stirred for 1.5 hour at the constant temperature.

After filtering, water washing and drying, an external pressure was applied and water was added, then the pressurized hydrothermal calcining treatment was performed at 430° C. under the gauge pressure of 0.8 MPa in the 50% water vapor atmosphere for 0.5 hours to obtain a sample of RE-containing Y zeolite, named as PDY-2.

In the chemical composition of PDY-2, the content of rare earth oxide was 8.2 wt %.

The BJH pore size distribution curve of PDY-2 had similar characteristics to the BJH pore size distribution curve of PDY-1.

For PDY-2, the ratio of the peak area for the pore-size distribution at 2-3 nanometers to the peak area of the total pores was 0.12, the ratio of the peak area for the pore-size distribution at 10-30 nanometers to the peak area of the total pores was 0.25.

PDY-2 had an XRD pattern, which had the similar characteristics as the XRD pattern of PAY-1. For PDY-2, the XRD spectrum showed the ratio of the intensity I1 of the peak at $2\theta=11.8\pm0.1°$ to the intensity I2 of the peak at $2\theta=12.3\pm0.1°$ was 4.4.

The unit cell and crystallinity data were shown in the tables below.

Comparative Example D2

Comparative Example D2 illustrated a comparative sample of RE-containing Y zeolite obtained by partial ammonium exchanging and calcining at atmospheric pressure.

It was identical to the process of Example D2 except for the calcining conditions: normal pressure (gauge pressure: 0 MPa).

The obtained RE-containing Y zeolite comparative sample was named as DDY-2.

In the chemical composition of DDY-2, the content of rare earth oxide was 8.2 wt %.

The BJH pore size distribution curve of DDY-2 had similar characteristics to the BJH pore-size distribution curve of DDY-1.

DDY-2 the ratio of the peak area for the pore-size distribution at 2-3 nanometers to the peak area of the total pores was 0, the ratio of the peak area for the pore-size distribution at 10-30 nanometers to the peak area of the total pores was 0.

DDY-2 had an XRD pattern, which had the similar characteristics as the XRD pattern of PAY-1. For DDY-2, the XRD spectrum showed the ratio of the intensity I1 of the peak at $2\theta=11.8\pm0.1$ to the intensity I2 of the peak at $2\theta=12.3\pm0.1°$ was 3.2.

The unit cell and crystallinity data were shown in the tables below.

Example D3

Example D3 illustrated the preparation of the RE-containing Y zeolite of the present invention, and the RE-containing Y zeolite could be used in preparing the catalytic cracking catalyst.

100 g of a NaY zeolite and 2200 g of deionized water were vigorously mixed and stirred, and 20 g of an ammonium sulfate solid was added. The mixture was uniformly stirred and warmed to 80° C., and stirred for 1.5 hour at the constant temperature. After filtering, water washing and drying, 24 mL of a rare earth chloride salt solution with a concentration of 357 g RE2O3/L was added. The mixture was uniformly stirred and warmed to 70° C. The slurry was adjusted with a dilute hydrochloric acid to a pH of 3.5, and stirred for 1.0 hour at the constant temperature.

After filtering, water washing and drying, an external pressure was applied and water was added, then the pressurized hydrothermal calcining treatment was performed at 520° C. under the gauge pressure of 0.4 MPa in the 100% water vapor atmosphere for 1.5 hours to obtain a sample of RE-containing Y zeolite, named as PDY-3.

In the chemical composition of PDY-3, the content of rare earth oxide was 11.4 wt %.

The BJH pore size distribution curve of PDY-3 had similar characteristics to the BJH pore size distribution curve of PDY-1.

PDY-3 the ratio of the peak area for the pore-size distribution at 2-3 nanometers to the peak area of the total pores was 0.23, the ratio of the peak area for the pore-size distribution at 10-30 nanometers to the peak area of the total pores was 0.25.

PDY-3 had an XRD pattern, which had the similar characteristics as the XRD pattern of PAY-1. For PDY-3, the XRD spectrum showed the ratio of the intensity I1 of the peak at $2\theta=11.8\pm0.1°$ to the intensity I2 of the peak at $2\theta=12.3\pm0.1°$ was 5.4.

The unit cell and crystallinity data were shown in the tables below.

Comparative Example D3

Comparative Example D3 illustrated a comparative sample of RE-containing Y zeolite obtained by partial ammonium exchanging and calcining at atmospheric pressure.

It was identical to the process of Example D3 except for the calcining conditions: normal pressure (gauge pressure: 0 MPa).

The obtained RE-containing Y zeolite comparative sample was named as DDY-3.

In the chemical composition of DDY-3, the content of rare earth oxide was 11.4 wt %.

The BJH pore size distribution curve of DDY-3 had similar characteristics to the BJH pore-size distribution curve of DDY-1.

DDY-3 the ratio of the peak area for the pore-size distribution at 2-3 nanometers to the peak area of the total pores was 0, the ratio of the peak area for the pore-size distribution at 10-30 nanometers to the peak area of the total pores was 0.

DDY-3 had an XRD pattern, which had the similar characteristics as the XRD pattern of PAY-1. The XRD spectrum of DDY-3 showed the ratio of the intensity I1 of the peak at $2\theta=11.8\pm0.1°$ to the intensity I2 of the peak at $2\theta=12.3\pm0.1°$ was 4.1.

The unit cell and crystallinity data were shown in the tables below.

Example D4

Example D4 illustrated the preparation of the RE-containing Y zeolite of the present invention, and the RE-containing Y zeolite could be used in preparing the catalytic cracking catalyst.

100 g of a NaY zeolite and 2800 g of deionized water were vigorously mixed and stirred, and 50 g of an ammonium chloride solid was added. The mixture was uniformly stirred and warmed to 60° C., and stirred for 2 hour at the constant temperature. After filtering, water washing and drying, 28 mL of a rare earth chloride salt solution with a concentration of 357 g RE2O3/L was added. The mixture was uniformly stirred and warmed to 80° C. The slurry was adjusted with a dilute hydrochloric acid to a pH of 3.8, and stirred for 1.0 hour at the constant temperature.

After filtering, water washing and drying, an external pressure was applied and water was added, then the pressurized hydrothermal calcining treatment was performed at 580° C. under the gauge pressure of 0.5 MPa in the 100% water vapor atmosphere for 2.0 hours to obtain a sample of RE-containing Y zeolite, named as PDY-4.

In the chemical composition of PDY-4, the content of rare earth oxide was 12.6 wt %.

The BJH pore size distribution curve of PDY-4 had similar characteristics to the BJH pore size distribution curve of PDY-1.

PDY-4 the ratio of the peak area for the pore-size distribution at 2-3 nanometers to the peak area of the total pores was 0.23, the ratio of the peak area for the pore-size distribution at 10-30 nanometers to the peak area of the total pores was 0.21.

PDY-4 had an XRD pattern, which had the similar characteristics as the XRD pattern of PAY-1. The XRD spectrum of PDY-4 showed the ratio of the intensity I1 of the peak at $2\theta=11.8\pm0.1°$ to the intensity I2 of the peak at $2\theta=12.3\pm0.1°$ was 5.2.

The unit cell and crystallinity data were shown in the tables below.

Comparative Example D4

Comparative Example D4 illustrated a comparative sample of RE-containing Y zeolite obtained by partial ammonium exchanging and calcining at atmospheric pressure.

It was identical to the process of Example D4 except for the calcining conditions: normal pressure (gauge pressure: 0 MPa).

The obtained RE-containing Y zeolite comparative sample was named as DDY-4.

In the chemical composition of DDY-4, the content of rare earth oxide was 12.6 wt %.

The BJH pore size distribution curve of DDY-4 had similar characteristics to the BJH pore-size distribution curve of DDY-1.

DDY-4 the ratio of the peak area for the pore-size distribution at 2-3 nanometers to the peak area of the total pores was 0, the ratio of the peak area for the pore-size distribution at 10-30 nanometers to the peak area of the total pores was 0.

DDY-4 had an XRD pattern, which had the similar characteristics as the XRD pattern of PAY-1. The XRD spectrum of DDY-4 showed the ratio of the intensity I1 of the peak at $2\theta=11.8\pm0.1°$ to the intensity I2 of the peak at $2\theta=12.3\pm0.1°$ was 4.2.

The unit cell and crystallinity data were shown in the tables below.

Example D5

Example D5 illustrated the preparation of the RE-containing Y zeolite of the present invention, and the RE-containing Y zeolite could be used in preparing the catalytic cracking catalyst.

100 g of a NaY zeolite and 2000 g of deionized water were vigorously mixed and stirred, and 200 g of an ammonium chloride solid was added. The mixture was uniformly stirred and warmed to 60° C., and stirred for 1 hour at the constant temperature. After filtering, water washing and drying, 32 mL of a rare earth chloride salt solution with a concentration of 357 g RE2O3/L was added. The mixture was uniformly stirred and warmed to 70° C. The slurry was adjusted with a dilute hydrochloric acid to a pH of 4.0, and stirred for 1.0 hour at the constant temperature.

After filtering, water washing and drying, an external pressure was applied and water was added, then the pressurized hydrothermal calcining treatment was performed at 550° C. under the gauge pressure of 0.4 MPa in the 100% water vapor atmosphere for 1.5 hours to obtain a sample of RE-containing Y zeolite, named as PDY-5.

In the chemical composition of PDY-5, the content of rare earth oxide was 13.4 wt %.

The BJH pore size distribution curve of PDY-5 had similar characteristics to the BJH pore size distribution curve of PDY-1.

PDY-5 the ratio of the peak area for the pore-size distribution at 2-3 nanometers to the peak area of the total pores was 0.24, the ratio of the peak area for the pore-size distribution at 10-30 nanometers to the peak area of the total pores was 0.29.

PDY-5 had an XRD pattern, which had the similar characteristics as the XRD pattern of PAY-1. The XRD spectrum of PDY-5 showed the ratio of the intensity I1 of the peak at $2\theta=11.8\pm0.1°$ to the intensity I2 of the peak at $2\theta=12.3\pm0.1°$ was 5.5.

The unit cell and crystallinity data were shown in the tables below.

Comparative Example D5

Comparative Example D5 illustrated a comparative sample of RE-containing Y zeolite obtained by partial ammonium exchanging and calcining at atmospheric pressure.

It was identical to the process of Example D5 except for the calcining conditions: normal pressure (gauge pressure: 0 MPa).

The obtained RE-containing Y zeolite comparative sample was named as DDY-5.

In the chemical composition of DDY-5, the content of rare earth oxide was 13.4 wt %.

The BJH pore size distribution curve of DDY-5 had similar characteristics to the BJH pore-size distribution curve of DDY-1.

DDY-5 the ratio of the peak area for the pore-size distribution at 2-3 nanometers to the peak area of the total pores was 0, the ratio of the peak area for the pore-size distribution at 10-30 nanometers to the peak area of the total pores was 0.

DDY-5 had an XRD pattern, which had the similar characteristics as the XRD pattern of PAY-1. The XRD spectrum of DDY-5 showed the ratio of the intensity I1 of the peak at $2\theta=11.8\pm0.1°$ to the intensity I2 of the peak at $2\theta=12.3\pm0.1°$ was 4.4.

The unit cell and crystallinity data were shown in the tables below.

Example D6

Example D6 illustrated the preparation of the RE-containing Y zeolite of the present invention, and the RE-containing Y zeolite could be used in preparing the catalytic cracking catalyst.

100 g of a NaY zeolite and 1800 g of deionized water were vigorously mixed and stirred, and 50 g of an ammonium sulfate solid was added. The mixture was uniformly stirred and warmed to 70° C., and stirred for 2.0 hour at the constant temperature. After filtering, water washing and drying, 20 mL of a rare earth chloride salt solution with a concentration of 357 g RE2O3/L and 2 g of an ammonium sulfate solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an external pressure was applied and water was added, then the pressurized hydrothermal calcining treatment was performed at 430° C. under the gauge pressure of 0.6 MPa in the 100% water vapor atmosphere for 2.0 hours to obtain a sample of RE-containing Y zeolite, named as PDY-6.

In the chemical composition of PDY-6, the content of rare earth oxide was 10.0 wt %.

The BJH pore size distribution curve of PDY-6 had similar characteristics to the BJH pore size distribution curve of PDY-1.

PDY-6 the ratio of the peak area for the pore-size distribution at 2-3 nanometers to the peak area of the total pores was 0.18, the ratio of the peak area for the pore-size distribution at 10-30 nanometers to the peak area of the total pores was 0.22.

PDY-6 had an XRD pattern, which had the similar characteristics as the XRD pattern of PAY-1. The XRD spectrum of PDY-6 showed the ratio of the intensity I1 of the peak at $2\theta=11.8\pm0.1°$ to the intensity I2 of the peak at $2\theta=12.3\pm0.1°$ was 4.9.

The unit cell and crystallinity data were shown in the tables below.

Comparative Example D6

Comparative Example D6 illustrated a comparative sample of RE-containing Y zeolite obtained by partial ammonium exchanging and calcining at atmospheric pressure.

It was identical to the process of Example D6 except for the calcining conditions: normal pressure (gauge pressure: 0 MPa).

The obtained RE-containing Y zeolite comparative sample was named as DDY-6.

In the chemical composition of DDY-6, the content of rare earth oxide was 10.0 wt %.

The BJH pore size distribution curve of DDY-6 had similar characteristics to the BJH pore-size distribution curve of DDY-1.

DDY-6 the ratio of the peak area for the pore-size distribution at 2-3 nanometers to the peak area of the total pores was 0, the ratio of the peak area for the pore-size distribution at 10-30 nanometers to the peak area of the total pores was 0.

DDY-6 had an XRD pattern, which had the similar characteristics as the XRD pattern of PAY-1. The XRD spectrum of DDY-6 showed the ratio of the intensity I1 of the peak at $2\theta=11.8\pm0.10$ to the intensity I2 of the peak at $2\theta=12.3\pm0.1°$ was 2.8.

The unit cell and crystallinity data were shown in the tables below.

Example D7

Example D7 illustrated the preparation of the RE-containing Y zeolite of the present invention, and the RE-containing Y zeolite could be used in preparing the catalytic cracking catalyst.

100 g of a NaY zeolite and 1800 g of deionized water were vigorously mixed and stirred, and 20 g of an ammonium sulfate solid was added. The mixture was uniformly stirred and warmed to 80° C., and stirred for 2.0 hour at the constant temperature. After filtering, water washing and drying, 20 mL of a rare earth chloride salt solution with a concentration of 357 g RE2O3/L and 2 g of an ammonium sulfate solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an external pressure was applied and water was added, then the pressurized hydrothermal calcining treatment was performed at 400° C. under the gauge pressure of 0.8 MPa in the 100% water vapor atmosphere for 2.0 hours to obtain a sample of RE-containing Y zeolite, named as PDY-7.

In the chemical composition of PDY-7, the content of rare earth oxide was 9.8 wt %.

The BJH pore size distribution curve of PDY-7 had similar characteristics to the BJH pore size distribution curve of PDY-1.

PDY-7 the ratio of the peak area for the pore-size distribution at 2-3 nanometers to the peak area of the total pores was 0.13, the ratio of the peak area for the pore-size distribution at 10-30 nanometers to the peak area of the total pores was 0.21.

PDY-7 had an XRD pattern, which had the similar characteristics as the XRD pattern of PAY-1. The XRD spectrum of PDY-7 showed the ratio of the intensity I1 of the peak at $2\theta=11.8\pm0.1°$ to the intensity I2 of the peak at $2\theta=12.3\pm0.10$ was 4.4.

The unit cell and crystallinity data were shown in the tables below.

Comparative Example D7

Comparative Example D7 illustrated a comparative sample of RE-containing Y zeolite obtained by partial ammonium exchanging and calcining at atmospheric pressure.

It was identical to the process of Example D7 except for the calcining conditions: normal pressure (gauge pressure: 0 MPa).

The obtained RE-containing Y zeolite comparative sample was named as DDY-7.

In the chemical composition of DDY-7, the content of rare earth oxide was 9.8 wt %.

The BJH pore size distribution curve of DDY-7 had similar characteristics to the BJH pore-size distribution curve of DDY-1.

DDY-7 the ratio of the peak area for the pore-size distribution at 2-3 nanometers to the peak area of the total pores was 0, the ratio of the peak area for the pore-size distribution at 10-30 nanometers to the peak area of the total pores was 0.

DDY-7 had an XRD pattern, which had the similar characteristics as the XRD pattern of PAY-1. The XRD spectrum of DDY-7 showed the ratio of the intensity I1 of the peak at $2\theta=11.8\pm0.1°$ to the intensity I2 of the peak at $2\theta=12.3\pm0.1°$ was 3.4.

The unit cell and crystallinity data were shown in the tables below.

Test Example D1

Test example D1 illustrated the hydrothermal stability test of the RE-containing Y zeolite sample(s).

The RE-containing Y zeolite samples PDY-1 to PDY-7 of Example D1 to Example D7, and the comparative samples DDY-1 to DDY-7 of Comparative Examples D1 to Comparative Example D7 were mixed and exchanged with ammonium chloride solution respectively to reduce the Na2O % to less than 0.3 wt %, filtered and dried to obtain fresh samples.

Fresh sample(s) were hydrothermally aged at 800° C. under 100% water vapor for 17 hours to obtain the aged sample(s).

The unit cell and crystallinity data of fresh samples and aged samples were shown in the tables below.

Example B1

Example B1 illustrated the RE-containing Y zeolites obtained by the third process.

100 g of a NaY zeolite and 1800 g of deionized water were vigorously mixed and stirred, and 20 mL of a rare earth chloride salt solution with a concentration of 357 g RE2O3/L and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an external pressure was applied and 7 g of ammonia water was added, then the pressurized hydrothermal calcining treatment was performed at 500° C. under the gauge pressure of 0.3 MPa in the 100% water vapor atmosphere for 2.0 hours to obtain a sample of RE-containing Y zeolite, named as PBY-1.

In the chemical composition of PBY-1, the content of rare earth oxide was 10.1 wt %.

Figure 6:
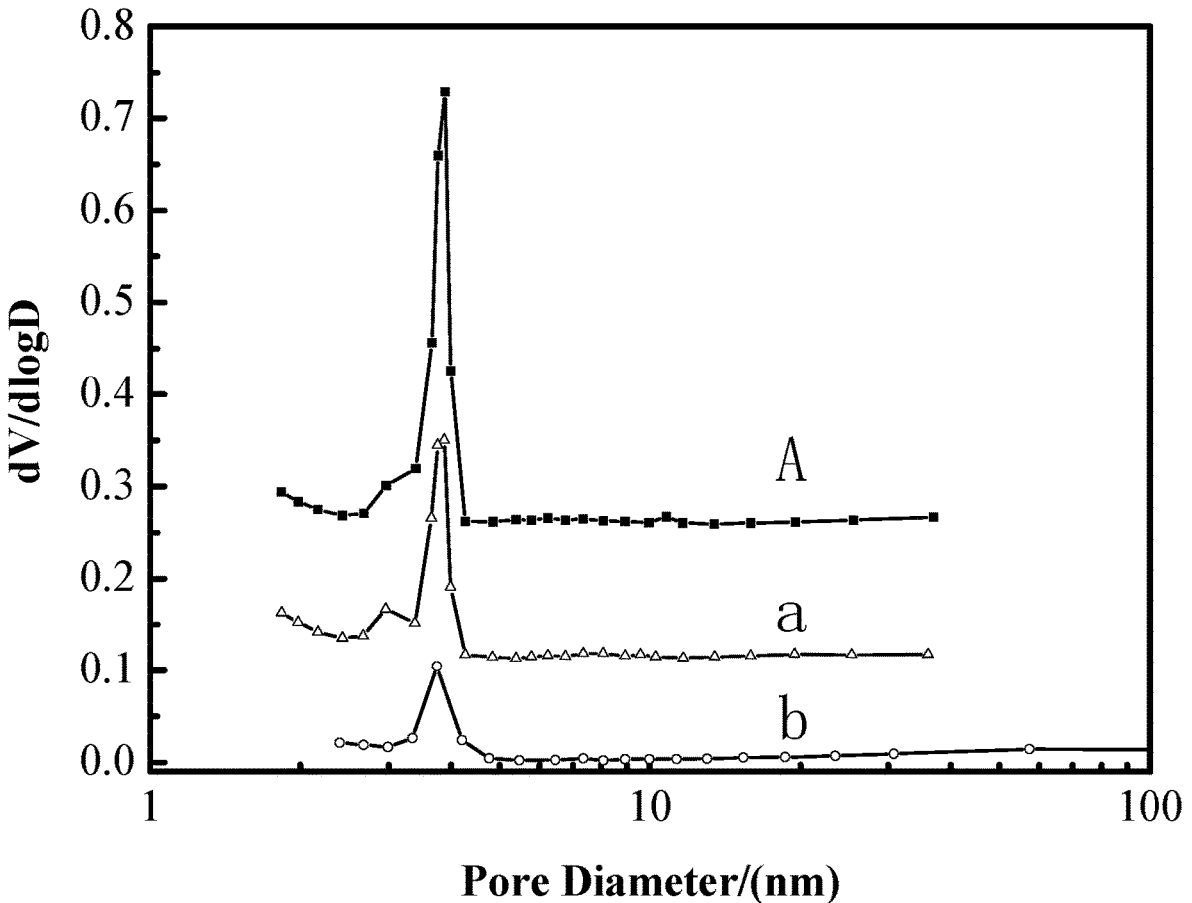
FIG. 6 shows the pore size distribution curves of PBY-1 (curve a), DBY-1.1 (curve b) and PCY-1 (curve A) obtained from the BJH model calculation.

The curve a in FIG. 6 was the pore size distribution curve of PBY-1 obtained based on the BJH model calculation. It could be seen that there were at least two mesopore pore size distributions, comprising one mesopore pore-size distribution at 2-3 nanometers and another mesopore pore-size distribution at 3-4 nanometers.

Figure 7:
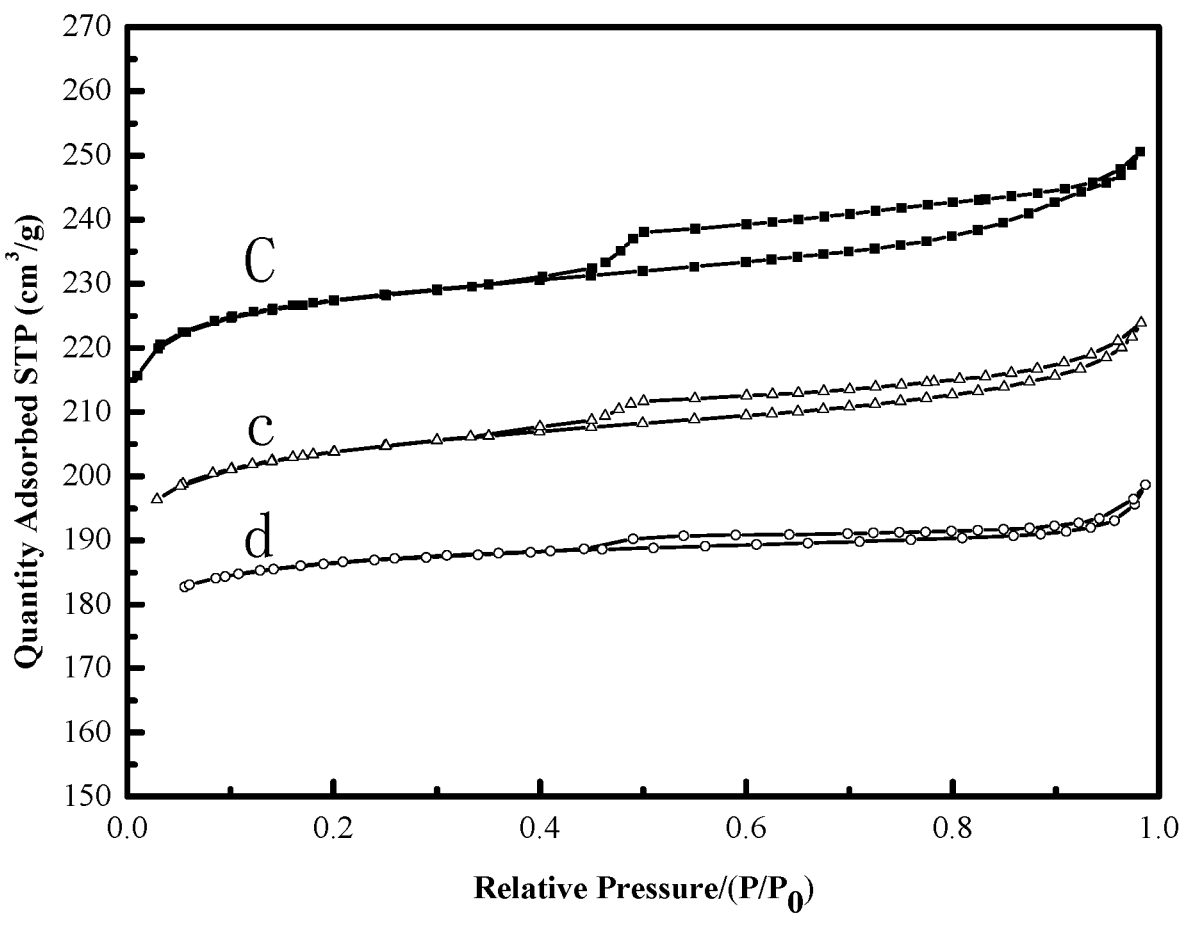
FIG. 7 shows the adsorption-desorption curves of PBY-1 (curve c), DBY-1.1 (curve d) and PCY-1 (curve C).

The curve c in FIG. 7 was the adsorption and desorption curve of sample PBY-1. It could be seen that it has a hysteresis loop with a larger area, indicating that the PBY-1 sample was rich in mesoporous structure.

PBY-1 had an XRD pattern, which had the similar characteristics as the XRD pattern of PAY-1, indicating that it had a pure-phase FAU crystal structure and no impure crystal was formed. XRD characterization parameters and hole parameters were shown in the table below.

| Samples | Fresh Samples | | Aged Samples | | Samples | Fresh Samples | | Aged Samples | |
|---|---|---|---|---|---|---|---|---|---|
| | Unit Cell, nm | Crystallinity/ %(w) | Unit Cell, nm | Crystallinity/ %(w) | | Unit Cell, nm | Crystallinity/ %(w) | Unit Cell, nm | Crystallinity/ %(w) |
| PDY-1 | 2.465 | 55.1 | 2.435 | 23.6 | DDY-1 | 2.464 | 42.8 | 2.429 | 16.9 |
| PDY-2 | 2.465 | 50.2 | 2 432 | 20.4 | DDY-2 | 2.464 | 41.3 | 2.428 | 15.7 |
| PDY-3 | 2.465 | 49.1 | 2.434 | 20.7 | DDY-3 | 2.464 | 40.7 | 2.429 | 16.5 |
| PDY-4 | 2.464 | 48.2 | 2.434 | 21.3 | DDY-4 | 2.463 | 40.5 | 2.429 | 17 |
| PDY-5 | 2.464 | 46.7 | 2.434 | 20.9 | DDY-5 | 2.463 | 39.4 | 2.429 | 17.2 |
| PDY-6 | 2.465 | 53.4 | 2.433 | 19.6 | DDY-6 | 2.463 | 43.8 | 2.428 | 18.1 |
| PDY-7 | 2.465 | 54.9 | 2.434 | 19.4 | DDY-7 | 2.464 | 44.5 | 2.427 | 14.8 |

It could be seen that the RE-containing Y zeolite samples PDY-1 to PDY-7 still had higher crystallinity after being hydrothermally aged for 17 hours at 800° C. in the 100% water vapor, and the crystallinity of each of samples PDY-1 to PDY-7 was obviously higher than that of the comparative sample, which showed that compared with hydrothermally calcining at the normal-pressure, the rare earth-containing Y-Zeolites obtained by the hydrothermal treatment under the atmosphere condition of the present invention had higher hydrothermal stability, and the hydrothermal stability was obviously improved.

Comparative Example B1.1

Comparative Example B1.1 illustrated a comparative sample of RE-containing Y zeolite obtained by hydrothermal calcining at atmospheric pressure without adding ammonia water.

It was identical to the process of Example B1 except for the calcining conditions: normal pressure (gauge pressure: 0 MPa) and no addition of ammonia water.

The obtained RE-containing Y zeolite comparative sample was named as DBY-10.1.

In the chemical composition of DBY-1.1, the content of rare-earth oxide was 10.1 wt %.

The curve b in FIG. 6 was the pore size distribution curve of comparative sample DBY-1 obtained based on the BJH model calculation. It could be seen that there was mainly one mesopore pore size distribution, i,e, a mesopore pore-size distribution at 3-4 nanometer, without showing another mesopore pore-size distribution at 2-3 nanometers.

The curve d in FIG. 7 was the absorption and desorption curve of comparative sample DBY-1.1. The hysteresis loop area was small, indicating that the volume of mesopores was relatively small. DBY-1.1 had an XRD pattern, which had the similar characteristics as the XRD pattern of PAY-1. XRD characterization parameters and hole parameters were shown in the table below.

Comparative Example B1.2

Comparative Example B1.2 illustrated a comparative sample of RE-containing Y zeolite obtained by hydrothermal calcining at atmospheric pressure with adding ammonia water.

It was identical to the process of Example B1 except for the calcining conditions: normal pressure (gauge pressure: 0 MPa).

The obtained RE-containing Y zeolite comparative sample was named as DBY-1.2.

In the chemical composition of DBY-1.2, the content of rare-earth oxide was 10.1 wt %.

The pore size distribution curve obtained from the BJH model calculation of DBY-1.2 was identical to the characteristic of curve b in FIG. 6, and the adsorption-desorption curve was identical to the characteristic of curve d in FIG. 7.

DBY-1.2 had an XRD pattern, which had the similar characteristics as the XRD pattern of PAY-1. XRD characterization parameters and hole parameters were shown in the table below.

Example C1

Example C1 illustrated the RE-containing Y zeolites obtained by the fourth process.

100 g of a NaY zeolite and 1800 g of deionized water were vigorously mixed and stirred, and 20 mL of a rare earth chloride salt solution with a concentration of 357 g RE2O3/L and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, 7 g of ammonia water was loaded through impregnation, after drying, then the pressurized hydrothermal calcining treatment was performed at 500° C. under the gauge pressure of 0.3 MPa in the 100% water vapor atmosphere for 2.0 hours to obtain a sample of RE-containing Y zeolite, named as PCY-1.

In the chemical composition of PCY-1, the content of rare earth oxide was 10.1 wt %.

The curve A in FIG. 6 was the pore size distribution curve of the sample PCY-1 obtained based on the BJH model calculation. It could be seen that there were at least two mesopore pore size distributions, respectively at 2-3 nanometers and at 3-4 nanometers.

The curve C in FIG. 7 was the adsorption and desorption curve of the sample PCY-1. It could be seen that the adsorption and desorption curve of the sample PCY-1 had a hysteresis loop with a larger area, indicating that the PCY-1 sample was rich in mesoporous structure.

The sample PCY-1 had an XRD pattern, which had the similar characteristics as the XRD pattern of PAY-1, indicating that it had a pure-phase FAU crystal structure and no impure crystal was formed. XRD characterization parameters and hole parameters were shown in the table below.

Comparative Example C1

Comparative example C1 illustrated a comparative sample of RE-containing Y zeolite obtained by loading ammonia water through impregnation, and hydrothermally calcining at normal pressure.

It was identical to the process of Example C1 except for the calcining conditions: normal pressure (gauge pressure: 0 MPa).

The obtained RE-containing Y zeolite comparative sample was named as DCY-1.

In the chemical composition of DCY-1, the content of rare earth oxide was 10.1 wt %.

The pore size distribution curve obtained from the BJH model calculation of DCY-1 was identical to the characteristic of curve b in FIG. 6, and the adsorption-desorption curve was identical to the characteristic of curve d in FIG. 7.

DCY-1 had an XRD pattern, which had the similar characteristics as the XRD pattern of PAY-1. XRD characterization parameters and hole parameters were shown in the table below.

Example B2

Example B2 illustrated the RE-containing Y zeolites obtained by the third process.

100 g of a NaY zeolite and 1000 g of deionized water were vigorously mixed and stirred, and 16 mL of a rare earth chloride salt solution with a concentration of 357 g RE2O3/L and 8 g of an ammonium chloride solid were added. The mixture was uniformly stirred and warmed to 60° C. The slurry was adjusted with a dilute hydrochloric acid to a pH of 4.0, and stirred for 1.5 hour at the constant temperature.

After filtering, water washing and drying, an external pressure was applied and an aqueous ammonium chloride solution containing 10 g of ammonium chloride was added, then the pressurized hydrothermal calcining treatment was performed at 430° C. under the gauge pressure of 0.8 MPa in the 100% water vapor atmosphere for 0.5 hours to obtain a sample of RE-containing Y zeolite, named as PBY-2.

In the chemical composition of PBY-2, the content of rare earth oxide was 8.2 wt/o.

The pore size distribution curve obtained from the BJH model calculation of PBY-2 was identical to the characteristics of curve a in FIG. 6, and the adsorption-desorption curve was identical to the characteristic of curve c in FIG. 7.

PBY-2 had an XRD pattern, which had the similar characteristics as the XRD pattern of PAY-1. XRD characterization parameters and hole parameters were shown in the table below.

Comparative Example B2.1

Comparative Example B2.1 illustrated a comparative sample of RE-containing Y zeolite obtained by hydrothermal calcining at atmospheric pressure without adding ammonium chloride.

It was identical to the process of Example B2 except for the calcining conditions: normal pressure (gauge pressure: 0 MPa) and no addition of ammonium chloride.

The obtained RE-containing Y zeolite comparative sample was named as DBY-2.1.

In the chemical composition of DBY-2.1, the content of rare-earth oxide was 8.2 wt %.

The pore size distribution curve obtained from the BJH model calculation of DBY-2.1 was identical to the characteristic of curve b in FIG. 6, and the adsorption-desorption curve was identical to the characteristic of curve d in FIG. 7.

DBY-2.1 had an XRD pattern, which had the similar characteristics as the XRD pattern of PAY-1. XRD characterization parameters and hole parameters were shown in the table below.

Comparative Example B2.2

Comparative Example B2.2 illustrated a comparative sample of RE-containing Y zeolite obtained by hydrothermal calcining at atmospheric pressure with adding ammonium chloride.

It was identical to the process of Example B2 except for the calcining conditions: normal pressure (gauge pressure: 0 MPa).

The obtained RE-containing Y zeolite comparative sample was named as DBY-2.2.

In the chemical composition of DBY-2.2, the content of rare-earth oxide was 8.2 wt %.

The pore size distribution curve obtained from the BJH model calculation of DBY-2.2 was identical to the characteristic of curve b in FIG. 6, and the adsorption-desorption curve was identical to the characteristic of curve d in FIG. 7.

DBY-2.2 had an XRD pattern, which had the similar characteristics as the XRD pattern of PAY-1. XRD characterization parameters and hole parameters were shown in the table below.

Example C2

Example C2 illustrated the RE-containing Y zeolites obtained by the fourth process.

100 g of a NaY zeolite and 1000 g of deionized water were vigorously mixed and stirred, and 16 mL of a rare earth chloride salt solution with a concentration of 357 g RE2O3/L and 8 g of an ammonium chloride solid were added. The mixture was uniformly stirred and warmed to 60° C. The slurry was adjusted with a dilute hydrochloric acid to a pH of 4.0, and stirred for 1.5 hour at the constant temperature.

After filtering, water washing and drying, 7 g of ammonium chloride was loaded through impregnation, after drying, then the pressurized hydrothermal calcining treatment was performed at 430° C. under the gauge pressure of 0.8 MPa in the 100% water vapor atmosphere for 0.5 hours to obtain a sample of RE-containing Y zeolite, named as PCY-2.

In the chemical composition of PCY-2, the content of rare earth oxide was 8.2 wt %.

The pore size distribution curve obtained from the BJH model calculation of PCY-2 was identical to the characteristics of curve A in FIG. 6, and the adsorption-desorption curve was identical to the characteristic of curve C in FIG. 7.

PCY-2 had an XRD pattern, which had the similar characteristics as the XRD pattern of PAY-1. XRD characterization parameters and hole parameters were shown in the table below.

Comparative Example C2

Comparative example C2 illustrated a comparative sample of RE-containing Y zeolite obtained by loading ammonium chloride through impregnation, and hydrothermally calcining at normal pressure.

It was identical to the process of Example C2 except for the calcining conditions: normal pressure (gauge pressure: 0 MPa).

The obtained RE-containing Y zeolite comparative sample was named as DCY-2.

In the chemical composition of DCY-2, the content of rare earth oxide was 8.2 wt %.

The pore size distribution curve obtained from the BJH model calculation of DCY-2 was identical to the characteristic of curve b in FIG. 6, and the adsorption-desorption curve was identical to the characteristic of curve d in FIG. 7.

DCY-2 had an XRD pattern, which had the similar characteristics as the XRD pattern of PAY-1. XRD characterization parameters and hole parameters were shown in the table below.

Example B3

Example B3 illustrated the RE-containing Y zeolites obtained by the third process.

100 g of a NaY zeolite and 2200 g of deionized water were vigorously mixed and stirred, and 24 mL of a rare earth chloride salt solution with a concentration of 357 g RE2O3/L was added. The mixture was uniformly stirred and warmed to 70° C. The slurry was adjusted with a dilute hydrochloric acid to a pH of 3.5, and stirred for 1.0 hour at the constant temperature.

After filtering, water washing and drying, an aqueous solution containing 6 wt/o of ammonium bicarbonate was added, then the pressurized hydrothermal calcining treatment was performed at 520° C. under the gauge pressure of 0.4 MPa in the 100% water vapor atmosphere for 1.5 hours to obtain a sample of RE-containing Y zeolite, named as PBY-3.

In the chemical composition of PBY-3, the content of rare earth oxide was 11.4 wt %.

The pore size distribution curve obtained from the BJH model calculation of PBY-3 was identical to the characteristics of curve a in FIG. 6, and the adsorption-desorption curve was identical to the characteristic of curve c in FIG. 7.

PBY-3 had an XRD pattern, which had the similar characteristics as the XRD pattern of PAY-1. XRD characterization parameters and hole parameters were shown in the table below.

Comparative Example B3.1

Comparative Example B3.1 illustrated a comparative sample of RE-containing Y zeolite obtained by hydrothermal calcining at atmospheric pressure without adding ammonium bicarbonate.

It was identical to the process of Example B3 except for the calcining conditions: normal pressure (gauge pressure: 0 MPa) and no addition of ammonium bicarbonate.

The obtained RE-containing Y zeolite comparative sample was named as DBY-3.1.

In the chemical composition of DBY-3.1, the content of rare-earth oxide was 11.4 wt %.

The pore size distribution curve obtained from the BJH model calculation of DBY-3.1 was identical to the characteristic of curve b in FIG. 6, and the adsorption-desorption curve was identical to the characteristic of curve d in FIG. 7.

DBY-3.1 had an XRD pattern, which had the similar characteristics as the XRD pattern of PAY-1. XRD characterization parameters and hole parameters were shown in the table below.

Comparative Example B3.2

Comparative Example B3.2 illustrated a comparative sample of RE-containing Y zeolite obtained by hydrothermal calcining at atmospheric pressure without adding ammonium bicarbonate.

It was identical to the process of Example B3 except for the calcining conditions: normal pressure (gauge pressure: 0 MPa).

The obtained RE-containing Y zeolite comparative sample was named as DBY-3.2.

In the chemical composition of DBY-3.2, the content of rare-earth oxide was 11.4 wt %.

The pore size distribution curve obtained from the BJH model calculation of DBY-3.2 was identical to the characteristic of curve b in FIG. 6, and the adsorption-desorption curve was identical to the characteristic of curve d in FIG. 7.

DBY-3.2 had an XRD pattern, which had the similar characteristics as the XRD pattern of PAY-1. XRD characterization parameters and hole parameters were shown in the table below.

Example C3

Example C3 illustrated the RE-containing Y zeolites obtained by the fourth process.

100 g of a NaY zeolite and 2200 g of deionized water were vigorously mixed and stirred, and 24 mL of a rare earth chloride salt solution with a concentration of 357 g RE2O3/L was added. The mixture was uniformly stirred and warmed to 70° C. The slurry was adjusted with a dilute hydrochloric acid to a pH of 3.5, and stirred for 1.0 hour at the constant temperature.

After filtering, water washing and drying, 12 g of ammonium bicarbonate was loaded through impregnation, after drying, then the pressurized hydrothermal calcining treatment was performed at 520° C. under the gauge pressure of 0.4 MPa in the 100% water vapor atmosphere for 1.5 hours to obtain a sample of RE-containing Y zeolite, named as PCY-3.

In the chemical composition of PCY-3, the content of rare earth oxide was 11.4 wt %.

The pore size distribution curve obtained from the BJH model calculation of PCY-3 was identical to the characteristics of curve A in FIG. 6, and the adsorption-desorption curve was identical to the characteristic of curve C in FIG. 7.

PCY-3 had an XRD pattern, which had the similar characteristics as the XRD pattern of PAY-1. XRD characterization parameters and hole parameters were shown in the table below.

Comparative Example C3

Comparative example C3 illustrated a comparative sample of RE-containing Y zeolite obtained by loading ammonium bicarbonate through impregnation, and hydrothermally calcining at normal pressure.

It was identical to the process of Example C3 except for the calcining conditions: normal pressure (gauge pressure: 0 MPa).

The obtained RE-containing Y zeolite comparative sample was named as DCY-3.

In the chemical composition of DCY-3, the content of rare earth oxide was 11.4 wt %.

The pore size distribution curve obtained from the BJH model calculation of DCY-3 was identical to the characteristic of curve b in FIG. 6, and the adsorption-desorption curve was identical to the characteristic of curve d in FIG. 7.

DCY-3 had an XRD pattern, which had the similar characteristics as the XRD pattern of PAY-1. XRD characterization parameters and hole parameters were shown in the table below.

Example B4

Example B4 illustrated the RE-containing Y zeolites obtained by the third process.

100 g of a NaY zeolite and 2800 g of deionized water were vigorously mixed and stirred, and 28 mL of a rare earth chloride salt solution with a concentration of 357 g RE2O3/L was added. The mixture was uniformly stirred and warmed to 80° C. The slurry was adjusted with a dilute hydrochloric acid to a pH of 3.8, and stirred for 1.0 hour at the constant temperature.

After filtering, water washing and drying, an aqueous solution containing 9 wt % of sodium carbonate was added, then the pressurized hydrothermal calcining treatment was performed at 580° C. under the gauge pressure of 0.5 MPa in the 100% water vapor atmosphere for 2.0 hours to obtain a sample of RE-containing Y zeolite, named as PBY-4.

In the chemical composition of PBY-4, the content of rare earth oxide was 12.6 wt %.

The pore size distribution curve obtained from the BJH model calculation of PBY-4 was identical to the characteristics of curve a in FIG. 6, and the adsorption-desorption curve was identical to the characteristic of curve c in FIG. 7.

PBY-4 had an XRD pattern, which had the similar characteristics as the XRD pattern of PAY-1. XRD characterization parameters and hole parameters were shown in the table below.

Comparative Example B4.1

Comparative Example B4.1 illustrated a comparative sample of RE-containing Y zeolite obtained by hydrothermal calcining at atmospheric pressure without adding sodium carbonate.

It was identical to the process of Example B4 except for the calcining conditions: normal pressure (gauge pressure: 0 MPa) and no addition of sodium carbonate.

The obtained RE-containing Y zeolite comparative sample was named as DBY-4.1.

In the chemical composition of DBY-4.1, the content of rare-earth oxide was 12.6 wt %.

The pore size distribution curve obtained from the BJH model calculation of DBY-4.1 was identical to the characteristic of curve b in FIG. 6, and the adsorption-desorption curve was identical to the characteristic of curve d in FIG. 7.

DBY-4.1 had an XRD pattern, which had the similar characteristics as the XRD pattern of PAY-1. XRD characterization parameters and hole parameters were shown in the table below.

Comparative Example B4.2

Comparative Example B4.2 illustrated a comparative sample of RE-containing Y zeolite obtained by hydrothermal calcining at atmospheric pressure with adding sodium carbonate.

It was identical to the process of Example B4 except for the calcining conditions: normal pressure (gauge pressure: 0 MPa).

The obtained RE-containing Y zeolite comparative sample was named as DBY-4.2.

In the chemical composition of DBY-4.2, the content of rare-earth oxide was 12.6 wt %.

The pore size distribution curve obtained from the BJH model calculation of DBY-4.2 was identical to the characteristic of curve b in FIG. 6, and the adsorption-desorption curve was identical to the characteristic of curve d in FIG. 7.

DBY-4.2 had an XRD pattern, which had the similar characteristics as the XRD pattern of PAY-1. XRD characterization parameters and hole parameters were shown in the table below.

Example C4

Example C4 illustrated the RE-containing Y zeolites obtained by the fourth process.

100 g of a NaY zeolite and 2800 g of deionized water were vigorously mixed and stirred, and 28 mL of a rare earth chloride salt solution with a concentration of 357 g RE2O3/L was added. The mixture was uniformly stirred and warmed to 80° C. The slurry was adjusted with a dilute hydrochloric acid to a pH of 3.8, and stirred for 1.0 hour at the constant temperature.

After filtering, water washing and drying, 9 g of sodium carbonate was loaded through impregnation, after drying, then the pressurized hydrothermal calcining treatment was performed at 580° C. under the gauge pressure of 0.5 MPa in the 100% water vapor atmosphere for 2.0 hours to obtain a sample of RE-containing Y zeolite, named as PCY-4.

In the chemical composition of PCY-4, the content of rare earth oxide was 12.6 wt %.

The pore size distribution curve obtained from the BJH model calculation of PCY-4 was identical to the characteristics of curve A in FIG. 6, and the adsorption-desorption curve was identical to the characteristic of curve C in FIG. 7.

PCY-4 had an XRD pattern, which had the similar characteristics as the XRD pattern of PAY-1. XRD characterization parameters and hole parameters were shown in the table below.

Comparative Example C4

Comparative example C4 illustrated a comparative sample of RE-containing Y zeolite obtained by loading sodium carbonate through impregnation, and hydrothermally calcining at normal pressure.

It was identical to the process of Example C4 except for the calcining conditions: normal pressure (gauge pressure: 0 MPa).

The obtained RE-containing Y zeolite comparative sample was named as DCY-4.

In the chemical composition of DCY-4, the content of rare earth oxide was 12.6 wt %.

The pore size distribution curve obtained from the BJH model calculation of DCY-4 was identical to the characteristic of curve b in FIG. 6, and the adsorption-desorption curve was identical to the characteristic of curve d in FIG. 7.

DCY-4 had an XRD pattern, which had the similar characteristics as the XRD pattern of PAY-1. XRD characterization parameters and hole parameters were shown in the table below.

Example B5

Example B5 illustrated the RE-containing Y zeolites obtained by the third process.

100 g of a NaY zeolite and 2000 g of deionized water were vigorously mixed and stirred, and 32 mL of a rare earth chloride salt solution with a concentration of 357 g RE2O3/L was added. The mixture was uniformly stirred and warmed to 70° C. The slurry was adjusted with a dilute hydrochloric acid to a pH of 4.0, and stirred for 1.0 hour at the constant temperature.

After filtering, water washing and drying, a buffer solution of ammonium chloride and ammonia water containing 10 g of ammonium chloride was added, then the pressurized hydrothermal calcining treatment was performed at 550° C. under the gauge pressure of 0.4 MPa in the 100% water vapor atmosphere for 1.5 hours to obtain a sample of RE-containing Y zeolite, named as PBY-5-1.

In the chemical composition of PBY-5, the content of rare earth oxide was 13.4 wt %.

The pore size distribution curve obtained from the BJH model calculation of PBY-5 was identical to the characteristics of curve a in FIG. 6, and the adsorption-desorption curve was identical to the characteristic of curve c in FIG. 7.

PBY-5 had an XRD pattern, which had the similar characteristics as the XRD pattern of PAY-1. XRD characterization parameters and hole parameters were shown in the table below.

Comparative Example B5.1

Comparative Example B5.1 illustrated a comparative sample of RE-containing Y zeolite obtained by hydrothermal calcining at atmospheric pressure without adding the buffer solution of ammonium chloride and ammonia water.

It was identical to the process of Example B5 except for the calcining conditions: normal pressure (gauge pressure: 0 MPa) and no addition of the buffer solution of ammonium chloride and ammonia water.

The obtained RE-containing Y zeolite comparative sample was named as DBY-5.1.

In the chemical composition of DBY-5.1, the content of rare-earth oxide was 13.4 wt %.

The pore size distribution curve obtained from the BJH model calculation of DBY-5.1 was identical to the characteristic of curve b in FIG. 6, and the adsorption-desorption curve was identical to the characteristic of curve d in FIG. 7.

DBY-5.1 had an XRD pattern, which had the similar characteristics as the XRD pattern of PAY-1. XRD characterization parameters and hole parameters were shown in the table below.

Comparative Example B5.2

Comparative Example B5.2 illustrated a comparative sample of RE-containing Y zeolite obtained by hydrothermal calcining at atmospheric pressure without adding the buffer solution of ammonium chloride and ammonia water.

It was identical to the process of Example B5 except for the calcining conditions: normal pressure (gauge pressure: 0 MPa).

The obtained RE-containing Y zeolite comparative sample was named as DBY-5.2.

In the chemical composition of DBY-5.2, the content of rare-earth oxide was 13.4 wt %.

The pore size distribution curve obtained from the BJH model calculation of DBY-5.2 was identical to the characteristic of curve b in FIG. 6, and the adsorption-desorption curve was identical to the characteristic of curve d in FIG. 7.

DBY-5.2 had an XRD pattern, which had the similar characteristics as the XRD pattern of PAY-1. XRD characterization parameters and hole parameters were shown in the table below.

Example C5

Example C5 illustrated the RE-containing Y zeolites obtained by the fourth process.

100 g of a NaY zeolite and 2000 g of deionized water were vigorously mixed and stirred, and 32 mL of a rare earth chloride salt solution with a concentration of 357 g RE2O3/L was added. The mixture was uniformly stirred and warmed to 70° C. The slurry was adjusted with a dilute hydrochloric acid to a pH of 4.0, and stirred for 1.0 hour at the constant temperature.

After filtering, water washing and drying, 10 g of a buffer solution of ammonium chloride and ammonia water was loaded through impregnation, after drying, then the pressurized hydrothermal calcining treatment was performed at 550° C. under the gauge pressure of 0.4 MPa in the 100% water vapor atmosphere for 1.5 hours to obtain a sample of RE-containing Y zeolite, named as PCY-5.

In the chemical composition of PCY-5, the content of rare earth oxide was 13.4 wt %.

The pore size distribution curve obtained from the BJH model calculation of PCY-5 was identical to the characteristics of curve A in FIG. 6, and the adsorption-desorption curve was identical to the characteristic of curve C in FIG. 7.

PCY-5 had an XRD pattern, which had the similar characteristics as the XRD pattern of PAY-1. XRD characterization parameters and hole parameters were shown in the table below.

Comparative Example C5

Comparative example C5 illustrated a comparative sample of RE-containing Y zeolite obtained by loading a buffer solution of ammonium chloride and ammonia water through impregnation, and hydrothermally calcining at normal pressure.

It was identical to the process of Example C5 except for the calcining conditions: normal pressure (gauge pressure: 0 MPa).

The obtained RE-containing Y zeolite comparative sample was named as DCY-5.

In the chemical composition of DCY-5, the content of rare earth oxide was 13.4 wt %.

The pore size distribution curve obtained from the BJH model calculation of DCY-5 was identical to the characteristic of curve b in FIG. 6, and the adsorption-desorption curve was identical to the characteristic of curve d in FIG. 7.

DCY-5 had an XRD pattern, which had the similar characteristics as the XRD pattern of PAY-1. XRD characterization parameters and hole parameters were shown in the table below.

Example B6

Example B6 illustrated the RE-containing Y zeolites obtained by the third process.

100 g of a NaY zeolite and 1800 g of deionized water were vigorously mixed and stirred, and 20 mL of a rare earth chloride salt solution with a concentration of 357 g RE2O3/L and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an aqueous hydrochloric acid solution (6 wt %) was added, then the pressurized hydrothermal calcining treatment was performed at 430° C. under the gauge pressure of 0.6 MPa in the 100% water vapor atmosphere for 2.0 hours to obtain a sample of RE-containing Y zeolite, named as PBY-6.

In the chemical composition of PBY-6, the content of rare earth oxide was 10.0 wt %.

The pore size distribution curve obtained from the BJH model calculation of PBY-6 was identical to the characteristics of curve a in FIG. 6, and the adsorption-desorption curve was identical to the characteristic of curve c in FIG. 7.

PBY-6 had an XRD pattern, which had the similar characteristics as the XRD pattern of PAY-1. XRD characterization parameters and hole parameters were shown in the table below.

Comparative Example B6.1

Comparative Example B6.1 illustrated a comparative sample of RE-containing Y zeolite obtained by hydrothermal calcining at atmospheric pressure without adding hydrochloric acid.

It was identical to the process of Example B6 except for the calcining conditions: normal pressure (gauge pressure: 0 MPa) and no addition of hydrochloric acid.

The obtained RE-containing Y zeolite comparative sample was named as DBY-6.1.

In the chemical composition of DBY-6.1, the content of rare-earth oxide was 10.0 wt %.

The pore size distribution curve obtained from the BJH model calculation of DBY-6.1 was identical to the characteristic of curve b in FIG. 6, and the adsorption-desorption curve was identical to the characteristic of curve d in FIG. 7.

DBY-6.1 had an XRD pattern, which had the similar characteristics as the XRD pattern of PAY-1. XRD characterization parameters and hole parameters were shown in the table below.

Comparative Example B6.2

Comparative Example B6.2 illustrated a comparative sample of RE-containing Y zeolite obtained by hydrothermal calcining at atmospheric pressure with adding hydrochloric acid.

It was identical to the process of Example B6 except for the calcining conditions: normal pressure (gauge pressure: 0 MPa).

The obtained RE-containing Y zeolite comparative sample was named as DBY-6.2.

In the chemical composition of DBY-6.2, the content of rare-earth oxide was 10.0 wt %.

The pore size distribution curve obtained from the BJH model calculation of DBY-6.2 was identical to the characteristic of curve b in FIG. 6, and the adsorption-desorption curve was identical to the characteristic of curve d in FIG. 7.

DBY-6.2 had an XRD pattern, which had the similar characteristics as the XRD pattern of PAY-1. XRD characterization parameters and hole parameters were shown in table below.

Example C6

Example C6 illustrated the RE-containing Y zeolites obtained by the fourth process.

100 g of a NaY zeolite and 1800 g of deionized water were vigorously mixed and stirred, and 20 mL of a rare earth chloride salt solution with a concentration of 357 g $RE_2O_3/L$ and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, 2 g of hydrochloric acid solution was loaded through impregnation, after drying, then the pressurized hydrothermal calcining treatment was performed at 430° C. under the gauge pressure of 0.6 MPa in the 100% water vapor atmosphere for 2.0 hours to obtain a sample of RE-containing Y zeolite, named as PCY-6.

In the chemical composition of PCY-6, the content of rare earth oxide was 10.0 wt %.

The pore size distribution curve obtained from the BJH model calculation of PCY-6 was identical to the characteristics of curve A in FIG. 6, and the adsorption-desorption curve was identical to the characteristic of curve C in FIG. 7.

PCY-6 had an XRD pattern, which had the similar characteristics as the XRD pattern of PAY-1. XRD characterization parameters and hole parameters were shown in the table below.

Comparative Example C6

Comparative example C6 illustrated a comparative sample of RE-containing Y zeolite obtained by loading hydrochloric acid through impregnation, and hydrothermally calcining at normal pressure.

It was identical to the process of Example C6 except for the calcining conditions: normal pressure (gauge pressure: 0 MPa).

The obtained RE-containing Y zeolite comparative sample was named as DCY-6.

In the chemical composition of DCY-6, the content of rare earth oxide was 10.0 wt %.

The pore size distribution curve obtained from the BJH model calculation of DCY-6 was identical to the characteristic of curve b in FIG. 6, and the adsorption-desorption curve was identical to the characteristic of curve d in FIG. 7.

DCY-6 had an XRD pattern, which had the similar characteristics as the XRD pattern of PAY-1. XRD characterization parameters and hole parameters were shown in the table below.

Example B7

Example B7 illustrated the RE-containing Y zeolites obtained by the third process.

100 g of a NaY zeolite and 1800 g of deionized water were vigorously mixed and stirred, and 20 mL of a rare earth chloride salt solution with a concentration of 357 g $RE_2O_3/L$ and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an aqueous sodium hydroxide solution (6 wt %) was added, then the pressurized hydrothermal calcining treatment was performed at 400° C. under the gauge pressure of 0.8 MPa in the 100% water vapor atmosphere for 2.0 hours to obtain a sample of RE-containing Y zeolite, named as PBY-7.

In the chemical composition of PBY-7, the content of rare earth oxide was 9.8 wt %.

The pore size distribution curve obtained from the BJH model calculation of PBY-7 was identical to the characteristics of curve a in FIG. 6, and the adsorption-desorption curve was identical to the characteristic of curve c in FIG. 7.

PBY-7 had an XRD pattern, which had the similar characteristics as the XRD pattern of PAY-1. XRD characterization parameters and hole parameters were shown in the table below.

Comparative Example B7.1

Comparative Example B7.1 illustrated a comparative sample of RE-containing Y zeolite obtained by hydrothermal calcining at atmospheric pressure without adding a solid sodium hydroxide.

It was identical to the process of Example B7 except for the calcining conditions: normal pressure (gauge pressure: 0 MPa) and no addition of solid sodium hydroxide.

The obtained RE-containing Y zeolite comparative sample was named as DBY-7.1.

In the chemical composition of DBY-7.1, the content of rare-earth oxide was 9.8 wt %.

The pore size distribution curve obtained from the BJH model calculation of DBY-7.1 was identical to the characteristic of curve b in FIG. 6, and the adsorption-desorption curve was identical to the characteristic of curve d in FIG. 7.

DBY-7.1 had an XRD pattern, which had the similar characteristics as the XRD pattern of PAY-1. XRD characterization parameters and hole parameters were shown in the table below.

Comparative Example B7.2

Comparative Example B7.2 illustrated a comparative sample of RE-containing Y zeolite obtained by hydrothermal calcining at atmospheric pressure with adding a solid sodium hydroxide.

It was identical to the process of Example B7 except for the calcining conditions: normal pressure (gauge pressure: 0 MPa).

The obtained RE-containing Y zeolite comparative sample was named as DBY-7.2.

In the chemical composition of DBY-7.2, the content of rare-earth oxide was 9.8 wt %.

The pore size distribution curve obtained from the BJH model calculation of DBY-7.2 was identical to the characteristic of curve b in FIG. 6, and the adsorption-desorption curve was identical to the characteristic of curve d in FIG. 7.

DBY-7.2 had an XRD pattern, which had the similar characteristics as the XRD pattern of PAY-1. XRD characterization parameters and hole parameters were shown in the table below.

Example C7

Example C7 illustrated the RE-containing Y zeolites obtained by the fourth process.

100 g of a NaY zeolite and 1800 g of deionized water were vigorously mixed and stirred, and 20 mL of a rare earth chloride salt solution with a concentration of 357 g RE2O3/L and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, 3 g of sodium hydroxide solid was loaded through impregnation, after drying, then the pressurized hydrothermal calcining treatment was performed at 400° C. under the gauge pressure of 0.8 MPa in the 100% water vapor atmosphere for 2.0 hours to obtain a sample of RE-containing Y zeolite, named as PCY-7.

In the chemical composition of PCY-7, the content of rare earth oxide was 9.8 wt %.

The pore size distribution curve obtained from the BJH model calculation of PCY-7 was identical to the characteristics of curve A in FIG. 6, and the adsorption-desorption curve was identical to the characteristic of curve C in FIG. 7.

PCY-7 had an XRD pattern, which had the similar characteristics as the XRD pattern of PAY-1. XRD characterization parameters and hole parameters were shown in the table below.

Comparative Example C7

Comparative example C7 illustrated a comparative sample of RE-containing Y zeolite obtained by loading sodium hydroxide through impregnation, and hydrothermally calcining at normal pressure.

It was identical to the process of Example C7 except for the calcining conditions: normal pressure (gauge pressure: 0 MPa).

The obtained RE-containing Y zeolite comparative sample was named as DCY-7.

In the chemical composition of DCY-7, the content of rare earth oxide was 9.8 wt %.

The pore size distribution curve obtained from the BJH model calculation of DCY-7 was identical to the characteristic of curve b in FIG. 6, and the adsorption-desorption curve was identical to the characteristic of curve d in FIG. 7.

DCY-7 had an XRD pattern, which had the similar characteristics as the XRD pattern of PAY-1. XRD characterization parameters and hole parameters were shown in the table below.

| Example | Sample | Unit cell/ nm | Crystallinity/ %(w) | BET surface area m²/g | Mesopore area m²/g | Micropore area m²/g | Total pore volume cc/g | Micropore volume cc/g | Mesopore volume cc/g | $I_1/I_2$ |
|---|---|---|---|---|---|---|---|---|---|---|
| Example B1 | PBY-1 | 2.465 | 52.2 | 625 | 28 | 597 | 0.315 | 0.278 | 0.037 | 6.2 |
| Example C1 | PCY-1 | 2.465 | 49.6 | 598 | 38 | 560 | 0.317 | 0.26 | 0.057 | 6.5 |
| Comparative Example B1.1 | DBY-1.1 | 2.464 | 42.6 | 629 | 15 | 614 | 0.309 | 0.292 | 0.017 | 3.4 |
| Comparative Example B1.2 | DBY-1.2 | 2.462 | 40.1 | 592 | 18 | 574 | 0.299 | 0.281 | 0.018 | 3.5 |
| Comparative Example C1 | DCY-1 | 2.463 | 41 | 591 | 21 | 570 | 0.3 | 0.279 | 0.021 | 3.9 |
| Example B2 | PBY-2 | 2.464 | 44.8 | 575 | 26 | 549 | 0.29 | 0.256 | 0.034 | 5.7 |
| Example C2 | PCY-2 | 2.463 | 41.4 | 568 | 30 | 538 | 0.287 | 0.254 | 0.033 | 5 |
| Comparative Example B2.1 | DBY-2.1 | 2.463 | 43.7 | 570 | 18 | 552 | 0.282 | 0.256 | 0.026 | 2.8 |
| Comparative Example B2.2 | DBY-2.2 | 2.461 | 40.1 | 560 | 20 | 540 | 0.278 | 0.254 | 0.024 | 3.5 |
| Comparative Example C2 | DCY-2 | 2.461 | 39.5 | 554 | 20 | 534 | 0.276 | 0.253 | 0.023 | 3.7 |
| Example B3 | PBY-3 | 2.464 | 45.8 | 611 | 25 | 586 | 0.308 | 0.272 | 0.036 | 5.8 |
| Example C3 | PCY-3 | 2.463 | 43 | 602 | 31 | 571 | 0.303 | 0.269 | 0.034 | 4.9 |
| Comparative Example B3.1 | DBY-3.1 | 2.463 | 47.6 | 597 | 18 | 579 | 0.302 | 0.269 | 0.033 | 3.7 |
| Comparative Example B3.2 | DBY-3.2 | 2.462 | 42.8 | 601 | 21 | 580 | 0.3 | 0.273 | 0.027 | 4.6 |
| Comparative Example C3 | DCY-3 | 2.462 | 40.7 | 594 | 20 | 574 | 0.297 | 0.264 | 0.033 | 4.2 |

-continued

| Example | Sample | Unit cell/ nm | Crystallinity/ %(w) | BET surface area m$^2$/g | Mesopore area m$^2$/g | Micropore area m$^2$/g | Total pore volume cc/g | Micropore volume cc/g | Mesopore volume cc/g | I$_1$/I$_2$ |
|---|---|---|---|---|---|---|---|---|---|---|
| Example B4 | PBY-4 | 2.463 | 43.4 | 591 | 24 | 567 | 0.3 | 0.264 | 0.036 | 5.6 |
| Example C4 | PCY-4 | 2.463 | 45.5 | 599 | 28 | 571 | 0.3 | 0.268 | 0.032 | 5.6 |
| Comparative Example B4.1 | DBY-4.1 | 2.462 | 40.9 | 580 | 15 | 565 | 0.287 | 0.262 | 0.025 | 3.9 |
| Comparative Example B4.2 | DBY-4.2 | 2.458 | 39.4 | 572 | 18 | 554 | 0.284 | 0.258 | 0.026 | 4.4 |
| Comparative Example C4 | DCY-4 | 2.457 | 38.6 | 563 | 17 | 546 | 0.271 | 0.251 | 0.02 | 4.5 |
| Example B5 | PBY-5 | 2.464 | 42.8 | 589 | 25 | 564 | 0.297 | 0.263 | 0.034 | 5.3 |
| Example C5 | PCY-5 | 2.463 | 42.4 | 585 | 32 | 553 | 0.295 | 0.247 | 0.044 | 5.2 |
| Comparative Example B5.1 | DBY-5.1 | 2.463 | 39.6 | 574 | 16 | 558 | 0.283 | 0.26 | 0.023 | 4.3 |
| Comparative Example B5.2 | DBY-5.2 | 2.461 | 39.8 | 578 | 18 | 560 | 0.286 | 0.259 | 0.027 | 4.4 |
| Comparative Example C5 | DCY-5 | 2.459 | 37.9 | 569 | 15 | 554 | 0.276 | 0.252 | 0.024 | 4.2 |
| Example B6 | PBY-6 | 2.463 | 43.1 | 572 | 30 | 542 | 0.287 | 0.256 | 0.031 | 5.4 |
| Example C6 | PCY-6 | 2.463 | 41.4 | 568 | 30 | 538 | 0.287 | 0.254 | 0.033 | 5 |
| Comparative Example B6.1 | DBY-6.1 | 2.463 | 43.2 | 561 | 20 | 541 | 0.271 | 0.252 | 0.019 | 2.7 |
| Comparative Example B6.2 | DBY-6.2 | 2.462 | 39.6 | 558 | 19 | 539 | 0.265 | 0.248 | 0.017 | 4.1 |
| Comparative Example C6 | DCY-6 | 2.463 | 40.4 | 602 | 18 | 584 | 0.302 | 0.281 | 0.021 | 3.7 |
| Example B7 | PBY-7 | 2.464 | 42.4 | 574 | 32 | 542 | 0.292 | 0.255 | 0.037 | 4.9 |
| Example C7 | PCY-7 | 2.463 | 42.9 | 572 | 28 | 544 | 0.287 | 0.256 | 0.031 | 5.3 |
| Comparative Example B7.1 | DBY-7.1 | 2.462 | 39.9 | 560 | 20 | 540 | 0.28 | 0.253 | 0.027 | 3.2 |
| Comparative Example B7.2 | DBY-7.2 | 2.462 | 38.4 | 557 | 19 | 538 | 0.276 | 0.249 | 0.027 | 3.8 |
| Comparative Example C7 | DCY-7 | 2.461 | 39 | 553 | 17 | 536 | 0.264 | 0.242 | 0.022 | 3.6 |

It could be seen from the table data that the mesopore area and mesopore volume of the rare earth-containing Y zeolite prepared by the process of the present invention were significantly higher than those of the sample prepared in the comparative example. The degree of crystallinity indicated that pressurized hydrothermal calcining with adjusted atmosphere could significantly increase the abundance of Y zeolite mesopores and form a certain degree of zeolite mesopores.

Example E

Example E illustrated the preparation of the RE-containing Y zeolite of the present invention, and the RE-containing Y zeolite could be used in preparing the catalytic cracking catalyst.

100 g of a NaY zeolite and 1800 g of deionized water were vigorously mixed and stirred, and 10 g of an ammonium chloride solid was added. The mixture was uniformly stirred and warmed to 70° C., and stirred for 2.0 hour at the constant temperature. After filtering, water washing and drying, 20 mL of a rare earth chloride salt solution with a concentration of 357 g RE2O3/L and 2 g of an ammonium chloride solid were added. The mixture was uniformly stirred and warmed to 70° C. The slurry was adjusted with a dilute hydrochloric acid to a pH of 4.5, and stirred for 1.0 hour at the constant temperature.

After filtering, water washing and drying, an external pressure was applied and 7 g ammonia water was added, then the pressurized hydrothermal calcining treatment was performed at 500° C. under the gauge pressure of 0.3 MPa in the 100% water vapor atmosphere for 2.0 hours to obtain a sample of RE-containing Y zeolite, named as PEY-1.

In the chemical composition of PEY-1, the content of rare earth oxide was 10.1 wt %.

Based on the BJH model calculation, the pore size distribution curve of PEY-1 was obtained, wherein there were at least three mesopore pore-size distributions, respectively, three prominent mesopore distributions at 2-3 nm, 3-4 nm, and 10-30 nm.

For PEY-1, the ratio of the peak area for the pore-size distribution at 2-3 nanometers to the peak area of the total pores was 0.25, and the ratio of the peak area for the pore-size distribution at 10-30 nanometers to the peak area of the total pores was 0.3.

PEY-1 had an XRD pattern, which had the similar characteristics as the XRD pattern of PAY-1. The XRD pattern of PEY-1 showed the ratio of the intensity I1 of the peak at 2θ=11.8±0.1° to the intensity I2 of the peak at 2θ=12.3±0.1° was 6.3.

The following examples illustrated the catalytic cracking catalyst provided by the present invention.

The properties of the raw materials used were as follows:

Kaolin (Suzhou China Kaolin Company, solid content 75 wt %),

Aluminum sol (Qilu Catalyst Branch, alumina content is 21.5 wt %),

Peptized pseudo-boehmite (solid content 10 wt %).

Wu-mixed triple oil was used in the catalyst performance test, and its main properties were as follows:

| Item | VGO |
|---|---|
| Density (29.3K), g/cm$^3$ | 0.904 |
| Viscosity (373K), mPa · s | 9.96 |
| Residual Carbon, wt % | 3.0 |
| C, wt % | 85.98 |
| H, wt % | 12.86 |
| S, wt % | 0.55 |
| N, wt % | 0.18 |
| Saturated hydrocarbons, wt % | 56.56 |
| Aromatic Hydrocarbon, wt % | 24.75 |
| Resin, wt % | 18.75 |
| Asphaltene, wt % | 0.44 |
| Fe, μg/g | 5.3 |
| Ni, μg/g | 5.0 |
| V, μg/g | 0.8 |
| Cu, μg/g | 0.04 |
| Na, μg/g | 1.2 |

Example A8 to Example A14

Pseudo-boehmite and deionized water were vigorously mixed and stirred, and a 36 wt % hydrochloric acid was added to the obtained slurry to peptize, and the acid-aluminum ratio (the weight ratio of the 36 wt % hydrochloric acid to the pseudo-boehmite on a dry basis) was 0.20, the mixture was warmed to 65° C. and acidified for 1 hour, the kaolin slurry and alumina sol on a dry basis were added respectively, and the mixture was stirred for 20 minutes, and then the RE-containing Y zeolite samples PAY-1 to PAY-7 on a dry basis were respectively added thereto, stirred for 30 minutes to obtain slurries with solid content of 30 wt %, spray-dried to prepare microsphere catalysts.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt %, and then deionized water was used to wash and filter several times, placed in a 120° C. constant temperature oven for drying treatment for 12 hours, the obtained catalysts were respectively marked as AC-1 to AC-7. The specific formulations of the catalysts on a dry basis were shown in the following table.

Comparative Example A8 to Comparative Example A14

The catalysts were prepared according to the process of Example A8, except that the RE-containing Y zeolite of Example A8 was replaced with the RE-containing Y zeolite comparative samples DAY-1 to DAY-7 prepared in Comparative Example A1 to Comparative Example A7. The prepared comparative catalysts were marked as DAC-1 to DAC-7, and the specific formulations of the comparative catalysts were shown in the following table.

| Example | Catalyst | RE-containing Y zeolite Name | wt % | Kao-lin wt % | Peptized pseudo-boehmite wt % | Alumina sol wt % |
|---|---|---|---|---|---|---|
| A8 | AC-1 | PAY-1 | 33 | 42 | 15 | 10 |
| A9 | AC-2 | PAY-2 | 33 | 42 | 15 | 10 |
| A10 | AC-3 | PAY-3 | 33 | 42 | 15 | 10 |
| A11 | AC-4 | PAY-4 | 33 | 42 | 15 | 10 |
| A12 | AC-5 | PAY-5 | 33 | 42 | 15 | 10 |
| A13 | AC-6 | PAY-6 | 30 | 42 | 15 | 13 |
| A14 | AC-7 | PAY-7 | 33 | 42 | 15 | 10 |
| Comparative Example A8 | DAC-1 | DAY-1 | 33 | 42 | 15 | 10 |
| Comparative Example A9 | DAC-2 | DAY-2 | 33 | 42 | 15 | 10 |
| Comparative Example A10 | DAC-3 | DAY-3 | 33 | 42 | 15 | 10 |
| Comparative Example A11 | DAC-4 | DAY-4 | 33 | 42 | 15 | 10 |
| Comparative Example A12 | DAC-5 | DAY-5 | 33 | 42 | 15 | 10 |
| Comparative Example A13 | DAC-6 | DAY-6 | 30 | 42 | 15 | 13 |
| Comparative Example A14 | DAC-7 | DAY-7 | 33 | 42 | 15 | 10 |

Test Example A2

Test example A2 illustrated the technical effect of the catalytic cracking catalyst of the present invention.

The above-mentioned catalyst samples AC-1 to AC-7 and the comparative catalyst samples DAC-1 to DAC-7 were subjected to hydrothermal aging at 800° C. in the 100% water vapor for 17 hours and then heavy oil micro-activity evaluation.

The conditions for heavy oil micro-activity evaluation: the catalyst loading was 5 grams, the feedstock oil was Wu-mixed triple oil, the oil intake was 1.384 grams, the reaction temperature was 500° C., and the regeneration temperature was 600° C.

The evaluation results were shown in the table below. The catalytic cracking catalyst of the present invention had excellent heavy oil conversion ability and higher gasoline yield.

| Catalyst | Dry gas, wt % | Liquefied gas, wt % | Gasoline, wt % | Diesel, wt % | Slurry oil, wt % | Coke/ conversion | Conversion, wt % |
|---|---|---|---|---|---|---|---|
| AC-1 | 1.31 | 8.04 | 51.4 | 18.98 | 10.07 | 0.14 | 70.95 |
| AC-2 | 1.16 | 9.98 | 49.05 | 19.14 | 10.18 | 0.15 | 69.67 |
| AC-3 | 1.21 | 9.22 | 50.7 | 17.95 | 10.43 | 0.14 | 70.03 |
| AC-4 | 1.24 | 8.36 | 48.93 | 19.66 | 10.77 | 0.14 | 69.57 |
| AC-5 | 1.34 | 8.17 | 46.73 | 18.84 | 14.16 | 0.15 | 66 |
| AC-6 | 1.23 | 5.99 | 46.69 | 19.71 | 16.48 | 0.15 | 63.81 |
| AC-7 | 1.28 | 8.81 | 45.79 | 20.68 | 13.53 | 0.15 | 65.79 |
| DAC-1 | 1.26 | 7.44 | 47.53 | 19.69 | 12.92 | 0.16 | 66.39 |
| DAC-2 | 1.2 | 9.21 | 45.68 | 19.76 | 13.02 | 0.16 | 65.87 |
| DAC-3 | 1.3 | 8.76 | 46.98 | 18.64 | 12.65 | 0.15 | 67.43 |
| DAC-4 | 1.28 | 9.01 | 45.79 | 19.05 | 12.93 | 0.15 | 67.12 |

-continued

| Catalyst | Dry gas, wt % | Liquefied gas, wt % | Gasoline, wt % | Diesel, wt % | Slurry oil, wt % | Coke/conversion | Conversion, wt % |
|---|---|---|---|---|---|---|---|
| DAC-5 | 1.29 | 7.54 | 44.65 | 18.04 | 16.54 | 0.16 | 63.34 |
| DAC-6 | 1.3 | 6.46 | 44.91 | 20.56 | 17.01 | 0.16 | 62.43 |
| DAC-7 | 1.31 | 8.23 | 42.98 | 21.34 | 15.45 | 0.16 | 62.06 |

Example D8 to Example D14

Pseudo-boehmite and deionized water were vigorously mixed and stirred, and a 36 wt % hydrochloric acid was added to the obtained slurry to peptize, and the acid-aluminum ratio (the weight ratio of the 36 wt % hydrochloric acid to the pseudo-boehmite on a dry basis) was 0.20, the mixture was warmed to 65° C. and acidified for 1 hour, the kaolin slurry and alumina sol on a dry basis were added respectively, and the mixture was stirred for 20 minutes, and then the RE-containing Y zeolite samples PDY-1 to PDY-7 on a dry basis were respectively added thereto, stirred for 30 minutes to obtain slurries with solid content of 30 wt %, spray-dried to prepare microsphere catalysts.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt %, and then deionized water was used to wash and filter several times, placed in a 120° C. constant temperature oven for drying treatment for 12 hours, the obtained catalysts were respectively marked as DC-1 to DC-7. The specific formulations of the catalysts on a dry basis were shown in the following table.

Comparative Example D8 to Comparative Example D14

The catalysts were prepared according to the process of Example D8, except that the RE-containing Y zeolite of Example D8 was replaced with the RE-containing Y zeolite comparative samples DDY-1 to DDY-7 prepared in Comparative Example D1 to Comparative Example D7. The prepared comparative catalysts were marked as DDC-1 to DDC-7.

The specific formulations in a dry basis of the catalysts were shown in the following table.

| Example No. | Catalyst No. | RE-containing Y zeolite Name | wt % | Kaolin wt % | Peptized pseudo-boehmite wt % | Alumina sol wt % |
|---|---|---|---|---|---|---|
| Example D8 | DC-1 | PDY-1 | 33 | 42 | 15 | 10 |
| Comparative Example D8 | DDC-1 | PDY-2 | 33 | 42 | 15 | 10 |

-continued

| Example No. | Catalyst No. | RE-containing Y zeolite Name | wt % | Kaolin wt % | Peptized pseudo-boehmite wt % | Alumina sol wt % |
|---|---|---|---|---|---|---|
| Example D9 | DC-2 | PDY-3 | 33 | 42 | 15 | 10 |
| Comparative Example D9 | DDC-2 | PDY-4 | 33 | 42 | 15 | 10 |
| Example D10 | DC-3 | PDY-5 | 33 | 42 | 15 | 10 |
| Comparative Example D10 | DDC-3 | PDY-6 | 33 | 42 | 15 | 10 |
| Example D11 | DC-4 | PDY-7 | 33 | 42 | 15 | 10 |
| Comparative Example D11 | DDC-4 | DDY-1 | 33 | 42 | 15 | 10 |
| Example D12 | DC-5 | DDY-2 | 33 | 42 | 15 | 10 |
| Comparative Example D12 | DDC-5 | DDY-3 | 33 | 42 | 15 | 10 |
| Example D13 | DC-6 | DDY-4 | 30 | 42 | 15 | 13 |
| Comparative Example D13 | DDC-6 | DDY-5 | 30 | 42 | 15 | 13 |
| Example D14 | DC-7 | DDY-6 | 33 | 42 | 15 | 10 |
| Comparative Example D14 | DDC-7 | DDY-7 | 33 | 42 | 15 | 10 |

Test Example D

Test example D2 illustrated the technical effect of the catalytic cracking catalyst of the present invention.

The above-mentioned catalyst samples DC-1 to DC-7 and the comparative catalyst samples DDC-1 to DDC-7 were subjected to hydrothermal aging at 800° C. in the 100% water vapor for 17 hours and then heavy oil micro-activity evaluation.

The conditions for heavy oil micro-activity evaluation: the catalyst loading was 5 grams, the feedstock oil was Wu-mixed triple oil, the oil intake was 1.384 grams, the reaction temperature was 500° C., and the regeneration temperature was 600° C.

The evaluation results were shown in the table below. The catalytic cracking catalyst of the present invention had excellent heavy oil conversion ability and higher gasoline yield.

| Catalyst | Dry gas, wt % | Liquefied gas, wt % | Gasoline, wt % | Diesel, wt % | Slurry oil, wt % | Coke/conversion | Conversion, wt % |
|---|---|---|---|---|---|---|---|
| DC-1 | 1.41 | 10.15 | 50.34 | 18.64 | 8.09 | 0.15 | 73.27 |
| DDC-1 | 1.35 | 8.06 | 47.82 | 19.87 | 12.10 | 0.16 | 67.42 |
| DC-2 | 1.26 | 10.26 | 49.67 | 19.14 | 9.67 | 0.15 | 70.26 |
| DDC-2 | 1.31 | 9.02 | 47.33 | 19.54 | 11.89 | 0.16 | 66.51 |
| DC-3 | 1.32 | 9.65 | 50.24 | 18.13 | 9.67 | 0.15 | 71.24 |
| DDC-3 | 1.29 | 9.21 | 47.62 | 18.98 | 11.67 | 0.16 | 65.97 |
| DC-4 | 1.28 | 8.67 | 49.62 | 19.35 | 10.12 | 0.15 | 70.35 |
| DDC-4 | 1.30 | 9.03 | 46.79 | 19.96 | 12.01 | 0.17 | 65.48 |
| DC-5 | 1.36 | 8.45 | 47.26 | 18.75 | 13.34 | 0.16 | 67.36 |

-continued

| Catalyst | Dry gas, wt % | Liquefied gas, wt % | Gasoline, wt % | Diesel, wt % | Slurry oil, wt % | Coke/ conversion | Conversion, wt % |
|---|---|---|---|---|---|---|---|
| DDC-5 | 1.32 | 9.14 | 44.68 | 19.25 | 15.02 | 0.17 | 64.51 |
| DC-6 | 1.34 | 6.57 | 47.13 | 19.45 | 15.64 | 0.16 | 66.13 |
| DDC-6 | 1.31 | 6.64 | 45.67 | 19.14 | 16.03 | 0.16 | 63.69 |
| DC-7 | 1.34 | 8.98 | 46.68 | 20.01 | 12.46 | 0.15 | 67.03 |
| DDC-7 | 1.31 | 9.03 | 43.95 | 20.89 | 14.35 | 0.16 | 64.68 |

Example B8 and Example C8

Example B8 and Example C8 Example B8 and Example C8 illustrated the preparation of the cracking catalyst of the present invention.

Pseudo-boehmite and deionized water were vigorously mixed and stirred, and a 36 wt % hydrochloric acid was added to the obtained slurry to peptize, and the acid-aluminum ratio (the weight ratio of the 36 wt % hydrochloric acid to the pseudo-boehmite on a dry basis) was 0.20, the mixture was warmed to 65° C. and acidified for 1 hour, the kaolin slurry and alumina sol on a dry basis were added respectively, and the mixture was stirred for 20 minutes, and then the RE-containing Y zeolite samples (Example B1, Example C1) on a dry basis were respectively added thereto, stirred for 30 minutes to obtain slurries with solid content of 30 wt %, spray-dried to prepare microsphere catalysts.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt %, and then deionized water was used to wash and filter several times, placed in a 120° C. constant temperature oven for drying treatment for 12 hours, the obtained catalysts were respectively marked as BC-1 and CC-1. The specific formulations of the catalysts on a dry basis were shown in the following table.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt %, and then deionized water was used to wash and filter several times, placed in a 120° C. constant temperature oven for drying treatment for 12 hours, the obtained catalysts were respectively marked as BC-1 and CC-1. The specific formulations of the catalysts on a dry basis were shown in the following table

Comparative Example B8.1, Comparative Example B8.2, Comparative Example C8

The catalysts were prepared according to the process of Example B8, except that the rare earth-containing Y zeolite of Example B1 was replaced with the rare-earth-containing Y zeolites prepared by Comparative Example B1.1, Comparative Example B1.2, and Comparative Example C1, comparative samples DBY-1.1, DBY-1.2, DCY-1, the prepared comparative catalysts were respectively referred to as DBC-1.1, DBC-1.2, DCC-1, and the specific formulations of the comparative catalysts on a dry basis were shown in the following table.

Test

The cracking catalysts BC-1, CC-1, the comparative cracking catalysts DBC-1.1, DBC-1.2, and DCC-1 were respectively subjected to hydrothermal aging at 800° C. in the 100% water vapor for 17 hours and then heavy oil micro-activity evaluation.

The conditions for heavy oil micro-activity evaluation: the catalyst loading was 5 grams, the feedstock oil was Wu-mixed triple oil, the oil intake was 1.384 grams, the reaction temperature was 500° C., and the regeneration temperature was 600° C.

The evaluation results were shown in the table below.

Example B9 and Example C9

Example B9 and Example C9 illustrated the preparation of the cracking catalyst of the present invention.

Pseudo-boehmite and deionized water were vigorously mixed and stirred, and a 36 wt % hydrochloric acid was added to the obtained slurry to peptize, and the acid-aluminum ratio (the weight ratio of the 36 wt % hydrochloric acid to the pseudo-boehmite on a dry basis) was 0.20, the mixture was warmed to 65° C. and acidified for 1 hour, the kaolin slurry and alumina sol on a dry basis were added respectively, and the mixture was stirred for 20 minutes, and then the RE-containing Y zeolite samples (Example B2, Example C2) on a dry basis were respectively added thereto, stirred for 30 minutes to obtain slurries with solid content of 30 wt %, spray-dried to prepare microsphere catalysts.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt %, and then deionized water was used to wash and filter several times, placed in a 120° C. constant temperature oven for drying treatment for 12 hours, the obtained catalysts were respectively marked as BC-2 and CC-2. The specific formulations of the catalysts on a dry basis were shown in the following table.

Comparative Example B9.1, Comparative Example B9.2, Comparative Example C9

The catalysts were prepared according to the process of Example B9, except that the rare earth-containing Y zeolite of Example B2 was replaced with the rare-earth-containing Y zeolites prepared by Comparative Example B2.1, Comparative Example B2.2, and Comparative Example C2, comparative samples DBY-2.1, DBY-2.2, DCY-2, the prepared comparative catalysts were respectively referred to as DBC-2.1, DBC-2.2, DCC-2, and the specific formulations of the comparative catalysts on a dry basis were shown in the following table.

Test

The cracking catalysts BC-2, CC-2, the comparative cracking catalysts DBC-2.1, DBC-2.2, and DCC-2 were respectively subjected to hydrothermal aging at 800° C. in the 100% water vapor for 17 hours and then heavy oil micro-activity evaluation.

The conditions for heavy oil micro-activity evaluation: the catalyst loading was 5 grams, the feedstock oil was Wu-mixed triple oil, the oil intake was 1.384 grams, the reaction temperature was 500° C., and the regeneration temperature was 600° C.

The evaluation results were shown in the table below.

Example B10 and Example C10

Example B10 and Example C10 illustrated the preparation of the cracking catalyst of the present invention.

Pseudo-boehmite and deionized water were vigorously mixed and stirred, and a 36 wt % hydrochloric acid was added to the obtained slurry to peptize, and the acid-aluminum ratio (the weight ratio of the 36 wt % hydrochloric acid to the pseudo-boehmite on a dry basis) was 0.20, the mixture was warmed to 65° C. and acidified for 1 hour, the kaolin slurry and alumina sol on a dry basis were added respectively, and the mixture was stirred for 20 minutes, and then the RE-containing Y zeolite samples (Example B3, Example C3) on a dry basis were respectively added thereto, stirred for 30 minutes to obtain slurries with solid content of 30 wt %, spray-dried to prepare microsphere catalysts.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt %, and then deionized water was used to wash and filter several times, placed in a 120° C. constant temperature oven for drying treatment for 12 hours, the obtained catalysts were respectively marked as BC-3 and CC-3. The specific formulations of the catalysts on a dry basis were shown in the following table.

Comparative Example B10.1, Comparative Example B10.2, Comparative Example C10

The catalysts were prepared according to the process of Example B10, except that the rare earth-containing Y zeolite of Example B3 was replaced with the rare-earth-containing Y zeolites prepared by Comparative Example B3.1, Comparative Example B3.2, and Comparative Example C3, comparative samples DBY-3.1, DBY-3.2, DCY-3, the prepared comparative catalysts were respectively referred to as DBC-3.1, DBC-3.2, DCC-3, and the specific formulations of the comparative catalysts on a dry basis were shown in the following table.
Test The cracking catalysts BC-3, CC-3, the comparative cracking catalysts DBC-3.1, DBC-3.2, and DCC-3 were respectively subjected to hydrothermal aging at 800° C. in the 100% water vapor for 17 hours and then heavy oil micro-activity evaluation.

The conditions for heavy oil micro-activity evaluation: the catalyst loading was 5 grams, the feedstock oil was Wu-mixed triple oil, the oil intake was 1.384 grams, the reaction temperature was 500° C., and the regeneration temperature was 600° C.

The evaluation results were shown in the table below.

Example B11 and Example C11

Example B11 and Example C11 illustrated the preparation of the cracking catalyst of the present invention.

Pseudo-boehmite and deionized water were vigorously mixed and stirred, and a 36 wt % hydrochloric acid was added to the obtained slurry to peptize, and the acid-aluminum ratio (the weight ratio of the 36 wt % hydrochloric acid to the pseudo-boehmite on a dry basis) was 0.20, the mixture was warmed to 65° C. and acidified for 1 hour, the kaolin slurry and alumina sol on a dry basis were added respectively, and the mixture was stirred for 20 minutes, and then the RE-containing Y zeolite samples (Example B4, Example C4) on a dry basis were respectively added thereto, stirred for 30 minutes to obtain slurries with solid content of 30 wt %, spray-dried to prepare microsphere catalysts.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt %, and then deionized water was used to wash and filter several times, placed in a 120° C. constant temperature oven for drying treatment for 12 hours, the obtained catalysts were respectively marked as BC-4 and CC-4. The specific formulations of the catalysts on a dry basis were shown in the following table.

Comparative Example B11.1, Comparative Example B11.2, Comparative Example C11

The catalysts were prepared according to the process of Example B11, except that the rare earth-containing Y zeolite of Example B4 was replaced with the rare-earth-containing Y zeolites prepared by Comparative Example B4.1, Comparative Example B4.2, and Comparative Example C4, comparative samples DBY-4.1, DBY-4.2, DCY-4, the prepared comparative catalysts were respectively referred to as DBC-4.1, DBC-4.2, DCC-4, and the specific formulations of the comparative catalysts on a dry basis were shown in the following table.
Test The cracking catalysts BC-4, CC-4, the comparative cracking catalysts DBC-4.1, DBC-4.2, and DCC-4 were respectively subjected to hydrothermal aging at 800° C. in the 100% water vapor for 17 hours and then heavy oil micro-activity evaluation.

The conditions for heavy oil micro-activity evaluation: the catalyst loading was 5 grams, the feedstock oil was Wu-mixed triple oil, the oil intake was 1.384 grams, the reaction temperature was 500° C., and the regeneration temperature was 600° C.

The evaluation results were shown in the table below.

Example B12 and Example C12

Example B12 and Example C12 illustrated the preparation of the cracking catalyst of the present invention.

Pseudo-boehmite and deionized water were vigorously mixed and stirred, and a 36 wt/o hydrochloric acid was added to the obtained slurry to peptize, and the acid-aluminum ratio (the weight ratio of the 36 wt % hydrochloric acid to the pseudo-boehmite on a dry basis) was 0.20, the mixture was warmed to 65° C. and acidified for 1 hour, the kaolin slurry and alumina sol on a dry basis were added respectively, and the mixture was stirred for 20 minutes, and then the RE-containing Y zeolite samples (Example B5, Example C5) on a dry basis were respectively added thereto, stirred for 30 minutes to obtain slurries with solid content of 30 wt %, spray-dried to prepare microsphere catalysts.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt %, and then deionized water was used to wash and filter several times, placed in a 120° C. constant temperature oven for drying treatment for 12 hours, the obtained catalysts were respectively marked as BC-5 and CC-5. The specific formulations of the catalysts on a dry basis were shown in the following table.

Comparative Example B12.1, Comparative Example B12.2, Comparative Example C12

The catalysts were prepared according to the process of Example B12, except that the rare earth-containing Y zeolite of Example B5 was replaced with the rare-earth-containing Y zeolites prepared by Comparative Example B5.1, Comparative Example B5.2, and Comparative Example C5, comparative samples DBY-5.1, DBY-5.2, DCY-5, the prepared comparative catalysts were respectively referred to as DBC-5.1, DBC-5.2, DCC-5, and the specific formulations of the comparative catalysts on a dry basis were shown in the following table.

Test

The cracking catalysts BC-5, CC-5, the comparative cracking catalysts DBC-5.1, DBC-5.2, and DCC-5 were respectively subjected to hydrothermal aging at 800° C. in the 100% water vapor for 17 hours and then heavy oil micro-activity evaluation.

The conditions for heavy oil micro-activity evaluation: the catalyst loading was 5 grams, the feedstock oil was Wu-mixed triple oil, the oil intake was 1.384 grams, the reaction temperature was 500° C., and the regeneration temperature was 600° C.

The evaluation results were shown in the table below.

Example B13 and Example C13

Example B13 and Example C13 illustrated the preparation of the cracking catalyst of the present invention.

Pseudo-boehmite and deionized water were vigorously mixed and stirred, and a 36 wt % hydrochloric acid was added to the obtained slurry to peptize, and the acid-aluminum ratio (the weight ratio of the 36 wt % hydrochloric acid to the pseudo-boehmite on a dry basis) was 0.20, the mixture was warmed to 65° C. and acidified for 1 hour, the kaolin slurry and alumina sol on a dry basis were added respectively, and the mixture was stirred for 20 minutes, and then the RE-containing Y zeolite samples (Example B6, Example C6) on a dry basis were respectively added thereto, stirred for 30 minutes to obtain slurries with solid content of 30 wt %, spray-dried to prepare microsphere catalysts.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt %, and then deionized water was used to wash and filter several times, placed in a 120° C. constant temperature oven for drying treatment for 12 hours, the obtained catalysts were respectively marked as BC-6 and CC-6. The specific formulations of the catalysts on a dry basis were shown in the following table.

Comparative Example B13.1, Comparative Example B13.2, Comparative Example C13

The catalysts were prepared according to the process of Example B13, except that the rare earth-containing Y zeolite of Example B6 was replaced with the rare-earth-containing Y zeolites prepared by Comparative Example B6.1, Comparative Example B6.2, and Comparative Example C6, comparative samples DBY-6.1, DBY-6.2, DCY-6, the prepared comparative catalysts were respectively referred to as DBC-6.1, DBC-6.2, DCC-6, and the specific formulations of the comparative catalysts on a dry basis were shown in the following table.

Test

The cracking catalysts BC-6, CC-6, the comparative cracking catalysts DBC-6.1, DBC-6.2, and DCC-6 were respectively subjected to hydrothermal aging at 800° C. in the 100% water vapor for 17 hours and then heavy oil micro-activity evaluation.

The conditions for heavy oil micro-activity evaluation: the catalyst loading was 5 grams, the feedstock oil was Wu-mixed triple oil, the oil intake was 1.384 grams, the reaction temperature was 500° C., and the regeneration temperature was 600° C.

The evaluation results were shown in the table below.

Example B14 and Example C14

Example B14 and Example C14 illustrated the preparation of the cracking catalyst of the present invention.

Pseudo-boehmite and deionized water were vigorously mixed and stirred, and a 36 wt % hydrochloric acid was added to the obtained slurry to peptize, and the acid-aluminum ratio (the weight ratio of the 36 wt % hydrochloric acid to the pseudo-boehmite on a dry basis) was 0.20, the mixture was warmed to 65° C. and acidified for 1 hour, the kaolin slurry and alumina sol on a dry basis were added respectively, and the mixture was stirred for 20 minutes, and then the RE-containing Y zeolite samples (Example B7, Example C7) on a dry basis were respectively added thereto, stirred for 30 minutes to obtain slurries with solid content of 30 wt %, spray-dried to prepare microsphere catalysts.

Then the microsphere catalysts were calcined at 500° C. for 1 hour, and then washed with ammonium chloride aqueous solution at 60° C. (ammonium chloride:microsphere catalyst:water=0.2:1:10) until the sodium oxide content was less than 0.30 wt/o, and then deionized water was used to wash and filter several times, placed in a 120° C. constant temperature oven for drying treatment for 12 hours, the obtained catalysts were respectively marked as BC-7 and CC-7. The specific formulations of the catalysts on a dry basis were shown in the following table.

Comparative Example B14.1, Comparative Example B14.2, Comparative Example C14

The catalysts were prepared according to the process of Example B14, except that the rare earth-containing Y zeolite of Example B7 was replaced with the rare-earth-containing Y zeolites prepared by Comparative Example B7.1, Comparative Example B7.2, and Comparative Example C7, comparative samples DBY-7.1, DBY-7.2, DCY-7, the prepared comparative catalysts were respectively referred to as DBC-7.1, DBC-7.2, DCC-7, and the specific formulations of the comparative catalysts on a dry basis were shown in the following table.

Test

The cracking catalysts BC-7, CC-7, the comparative cracking catalysts DBC-7.1, DBC-7.2, and DCC-7 were respectively subjected to hydrothermal aging at 800° C. in the 100% water vapor for 17 hours and then heavy oil micro-activity evaluation.

The conditions for heavy oil micro-activity evaluation: the catalyst loading was 5 grams, the feedstock oil was Wu-mixed triple oil, the oil intake was 1.384 grams, the reaction temperature was 500° C., and the regeneration temperature was 600° C.

The evaluation results were shown in the table below.

It could be seen from the table that the catalyst prepared by the present invention had excellent heavy oil conversion ability and higher gasoline yield. For example, compared to DBC-1.1, the BC-1 sample of the present invention had been hydrothermally aged at 800° C. in 100% water vapor for 17 hours, showing an excellent heavy oil cracking activity, and the conversion rate was increased by 6.22%, the gasoline yield was increased by 5.15%, and the coke/conversion rate was decreased by 0.01.

66

The invention claimed is:

1. A rare earth-containing Y zeolite, having at least two mesopore pore-size distributions at 2-3 nanometers and 3-4 nanometers, wherein the mesopore volume of the rare earth-containing Y zeolite is 0.031 cc/g to 0.057 cc/g, and wherein in a BJH pore-size distribution curve of the rare earth-containing Y zeolite, the ratio of the peak area for the pore-size distribution at 2-3 nanometers to the peak area for the pore-size distribution at 3-4 nanometers is 0.05-0.4.

| Catalyst Example No. | Catalyst No. | Catalyst Composition(Wt %) | | | | Heavy Oil Micro Activity Experimental Result | | | | | | |
|---|---|---|---|---|---|---|---|---|---|---|---|---|
| | | REY Zeolite | Kaolin | Peptized Pseudo-Boehmite | Alumina Sol | Dry Gas Wt % | Liquefied Gas Wt % | Gasoline Wt % | Diesel Wt % | Slurry Oil Wt % | Coke/ Conversion | Conversion, Wt % |
| Example B8 | BC-1 | 33 | 42 | 15 | 10 | 1.37 | 10.85 | 52.68 | 18.14 | 8.64 | 0.15 | 72.61 |
| Example C8 | CC-1 | 33 | 42 | 15 | 10 | 1.52 | 10.67 | 52.73 | 16.51 | 7.82 | 0.14 | 73.67 |
| Comparative Example B8.1 | DBC-1.1 | 33 | 42 | 15 | 10 | 1.26 | 7.44 | 47.53 | 19.69 | 12.92 | 0.16 | 66.39 |
| Comparative Example B8.2 | DBC-1.2 | 33 | 42 | 15 | 10 | 1.31 | 7.98 | 47.99 | 18.87 | 12.01 | 0.16 | 66.97 |
| Comparative Example C8 | DCC-1 | 33 | 42 | 15 | 10 | 1.34 | 8.67 | 48.24 | 18.13 | 11.46 | 0.16 | 67.03 |
| Example B9 | BC-2 | 33 | 42 | 15 | 10 | 1.28 | 10.23 | 49.35 | 18.79 | 9.45 | 0.15 | 69.98 |
| Example C9 | CC-2 | 33 | 42 | 15 | 10 | 1.32 | 9.96 | 49.69 | 18.01 | 9.26 | 0.15 | 70.56 |
| Comparative Example B9.1 | DBC-2.1 | 33 | 42 | 15 | 10 | 1.2 | 9.21 | 45.68 | 19.76 | 13.02 | 0.16 | 65.87 |
| Comparative Example B9.2 | DBC-2.2 | 33 | 42 | 15 | 10 | 1.36 | 9.02 | 47.24 | 19.35 | 11.24 | 0.16 | 67.86 |
| Comparative Example C9 | DCC-2 | 33 | 42 | 15 | 10 | 1.33 | 9.76 | 47.76 | 18.35 | 11.04 | 0.16 | 68.27 |
| Example B10 | BC-3 | 33 | 42 | 15 | 10 | 1.3 | 9.62 | 51.35 | 17.38 | 9.68 | 0.15 | 70.87 |
| Example C10 | CC-3 | 33 | 42 | 15 | 10 | 1.3 | 9.89 | 51.96 | 16.78 | 9.43 | 0.15 | 71.12 |
| Comparative Example B10.1 | DBC-3.1 | 33 | 42 | 15 | 10 | 1.3 | 8.76 | 46.98 | 18.64 | 12.65 | 0.15 | 67.43 |
| Comparative Example B10.2 | DBC-3.2 | 33 | 42 | 15 | 10 | 1.35 | 9.24 | 48.94 | 18.1 | 11.32 | 0.16 | 68.74 |
| Comparative Example C10 | DCC-3 | 33 | 42 | 15 | 10 | 1.29 | 9.32 | 49.32 | 17.54 | 10.87 | 0.16 | 69.02 |
| Example B11 | BC-4 | 33 | 42 | 15 | 10 | 1.29 | 8.98 | 49.67 | 18.32 | 9.89 | 0.15 | 70.25 |
| Example C11 | CC-4 | 33 | 42 | 15 | 10 | 1.32 | 9.42 | 50.23 | 17.61 | 9.54 | 0.15 | 70.65 |
| Comparative Example B11.1 | DBC-4.1 | 33 | 42 | 15 | 10 | 1.28 | 9.01 | 45.79 | 19.05 | 12.93 | 0.15 | 67.12 |
| Comparative Example B11.2 | DBC-4.2 | 33 | 42 | 15 | 10 | 1.32 | 8.31 | 48.02 | 19.23 | 11.43 | 0.16 | 68.02 |
| Comparative Example C11 | DCC-4 | 33 | 42 | 15 | 10 | 1.33 | 8.87 | 48.34 | 18.79 | 11.05 | 0.16 | 68.35 |
| Example B12 | BC-5 | 33 | 42 | 15 | 10 | 1.32 | 8.78 | 47.36 | 18.12 | 13.02 | 0.15 | 67.23 |
| Example C12 | CC-5 | 33 | 42 | 15 | 10 | 1.3 | 9.12 | 48.23 | 17.14 | 12.31 | 0.15 | 68.21 |
| Comparative Example B12.1 | DBC-5.1 | 33 | 42 | 15 | 10 | 1.29 | 7.54 | 44.65 | 18.04 | 16.54 | 0.16 | 63.34 |
| Comparative Example B12.2 | DBC-5.2 | 33 | 42 | 15 | 10 | 1.3 | 8.56 | 45.56 | 19.04 | 14.89 | 0.16 | 65.12 |
| Comparative Example C12 | DCC-5 | 33 | 42 | 15 | 10 | 1.26 | 8.78 | 46.01 | 18.47 | 14.34 | 0.16 | 65.56 |
| Example B13 | BC-6 | 30 | 42 | 15 | 13 | 1.27 | 6.72 | 47.03 | 18.21 | 15.26 | 0.15 | 65.23 |
| Example C13 | CC-6 | 30 | 42 | 15 | 13 | 1.29 | 7.63 | 47.45 | 17.42 | 14.51 | 0.15 | 66.24 |
| Comparative Example B 13.1 | DBC-6.1 | 30 | 42 | 15 | 13 | 1.3 | 6.46 | 44.91 | 20.56 | 17.01 | 0.16 | 62.43 |
| Comparative Example B13.2 | DBC-6.2 | 30 | 42 | 15 | 13 | 1.3 | 7.45 | 47.06 | 17.25 | 11.73 | 0.16 | 67.01 |
| Comparative Example C13 | DCC-6 | 30 | 42 | 15 | 13 | 1.3 | 7.45 | 47.06 | 17.25 | 11.73 | 0.16 | 67.01 |
| Example B14 | BC-7 | 33 | 42 | 15 | 10 | 1.32 | 9.03 | 46.04 | 19.86 | 12.79 | 0.15 | 67.06 |
| Example C14 | CC-7 | 33 | 42 | 15 | 10 | 1.31 | 9.35 | 46.54 | 19.13 | 12.01 | 0.15 | 67.75 |
| Comparative Example B14.1 | DBC-7.1 | 33 | 42 | 15 | 10 | 1.31 | 8.23 | 42.98 | 21.34 | 15.45 | 0.16 | 62.06 |
| Comparative Example B14.2 | DBC-7.2 | 33 | 42 | 15 | 10 | 1.3 | 8.89 | 43.59 | 20.65 | 15.01 | 0.16 | 65.13 |
| Comparative Example C14 | DCC-7 | 33 | 42 | 15 | 10 | 1.29 | 9.13 | 44.11 | 20.1 | 14.29 | 0.16 | 65.42 |

2. The rare earth-containing Y zeolite of claim 1, wherein the ratio of the peak area for the pore-size distribution at 2-3 nanometers to the peak area for the pore-size distribution at 3-4 nanometers is 0.1-0.4.

3. The rare earth-containing Y zeolite according to claim 1, comprising a rare-earth content as rare-earth oxide of 2-18 wt %, and having a unit cell constant of 2.440-2.470 nm, and a crystallinity of 30-60%.

4. The rare earth-containing Y zeolite according to claim 1, wherein the rare earth-containing Y zeolite has a ratio of the intensity I1 of the peak at $2\theta=11.8\pm0.1°$ to the intensity I2 of the peak at $2\theta=12.3\pm0.1°$ in an X-ray diffraction pattern of $\geq4.0$.

5. The rare earth-containing Y zeolite according to claim 1, wherein in the BJH pore-size distribution curve of the rare earth-containing Y zeolite, a mesopore pore-size distribution at 10-30 nanometers is present, wherein the ratio of the peak area for the pore-size distribution at 2-3 nanometers to the peak area of the total pores is greater than 0.1, and the ratio of the peak area for the pore-size distribution at 10-30 nanometers to the peak area of the total pores is greater than 0.2.

6. The rare earth-containing Y zeolite according to claim 1, wherein: in the BJH pore-size distribution curve of the rare earth-containing Y zeolite, a mesopore pore-size distribution at 10-30 nanometers is present, the ratio of the peak area for the pore-size distribution at 2-3 nanometers to the peak area of the total pores is greater than 0.12, and the ratio of the peak area for the pore-size distribution at 10-30 nanometers to the peak area of the total pores is greater than 0.22.

7. The rare earth-containing Y zeolite according to claim 1, wherein: in the BJH pore-size distribution curve of the rare earth-containing Y zeolite, a mesopore pore-size distribution at 10-30 nanometers is present, the ratio of the peak area for the pore-size distribution at 2-3 nanometers to the peak area of the total pores is 0.18-0.26, and the ratio of the peak area for the pore-size distribution at 10-30 nanometers to the peak area of the total pores is 0.27-0.32.

8. A process for preparing the rare earth-containing Y zeolite according to claim 1, comprising:

hydrothermally calcining a rare earth-containing NaY zeolite in an atmosphere under an external pressure and in the presence of an aqueous solution comprising an acidic substance or alkaline substance to obtain the rare earth-containing Y zeolite, wherein the external pressure is of 0.01-1.0 MPa gauge pressure, and the atmosphere contains 1-100% water vapor; or contacting the rare earth-containing NaY zeolite with the acidic substance or the alkaline substance to produce an acidic substance or alkaline substance containing rare earth-containing NaY zeolite, and then hydrothermally calcining under the external pressure and in the presence of water, wherein the external pressure is of 0.01-1.0 MPa gauge pressure, and the atmosphere contains 1-100% water vapor.

9. The process according to claim 8, wherein said rare earth-containing NaY zeolite is obtained by contacting a NaY zeolite with a rare-earth salt solution or a mixed solution of the rare-earth salt solution and an ammonium salt.

10. The process according to claim 8, further comprising preparing the rare earth-containing NaY zeolite according to a process comprising:

S1: partially ammonium-exchanging of a NaY zeolite with an ammonium salt to remove 10-80% sodium ions, filtering, washing, and drying to obtain a NH$_4$NaY zeolite; and S2: contacting the NH$_4$NaY zeolite obtained from S1 with a rare-earth salt solution or a mixed solution of the rare-earth salt solution and an ammonium salt, and then filtering, water washing and drying to produce the rare earth-containing NaY zeolite.

11. The process according to claim 10, wherein S2 is carried out at pH=3.0 to 5.0, at the weight ratio of water/zeolite of 5 to 30, and at room temperature to 100° C., optionally, the contacting time is at least 0.3 hour.

12. The process according to claim 9, wherein the rare-earth salt solution is an aqueous chloride solution containing one or more selected from lanthanum, cerium, praseodymium, and neodymium ions.

13. The process according to claim 9, wherein the ammonium salt is selected from ammonium chloride, ammonium nitrate, ammonium carbonate and ammonium bicarbonate and any mixture thereof.

14. The process according to claim 8, wherein the external pressure is 0.1 to 0.8 MPa gauge pressure, and the atmosphere contains 30% to 100% water vapor.

15. The process according to claim 8, wherein the step of hydrothermal calcining is performed at 300-800° C.

16. The process according to claim 8, wherein the acidic substance is selected from ammonium chloride, ammonium sulfate, ammonium carbonate, ammonium bicarbonate, ammonium phosphate, ammonium dihydrogen phosphate, diammonium phosphate, hydrochloric acid, sulfuric acid, nitric acid, and mixtures thereof; and the alkaline substance is selected from ammonia water, buffer solution of ammonia water and ammonium chloride, sodium hydroxide, sodium metalluminate, sodium carbonate, sodium bicarbonate, and mixtures thereof.

17. The process according to claim 8, wherein the mass concentration of the aqueous solution containing the acidic substance or the alkaline substance is 0.1-20%.

18. A catalytic cracking catalyst, wherein the catalytic cracking catalyst contains 20-60 wt % of the rare earth-containing Y zeolite according to claim 1, 10-30 wt % of inorganic oxide binder and 30-50 wt % of natural mineral.

19. The catalytic cracking catalyst according to claim 18, wherein said natural mineral is at least one selected from kaolin, halloysite, montmorillonite, diatomite, attapulgite, sepiolite, keramite, hydrotalcite, bentonite and rectorite, and the inorganic oxide binder is at least one selected from silica sol, alumina sol, peptized pseudo-boehmite, silica alumina sol and phosphorus-containing alumina sol.

* * * * *